US006839686B1

(12) United States Patent
Galant

(10) Patent No.: US 6,839,686 B1
(45) Date of Patent: Jan. 4, 2005

(54) METHOD AND SYSTEM FOR PROVIDING FINANCIAL INFORMATION AND EVALUATING SECURITIES OF A FINANCIAL DEBT INSTRUMENT

(75) Inventor: Paul S. Galant, New York, NY (US)

(73) Assignee: DLJ Long Term Investment Corporation, Chicago, IL (US)

( * ) Notice: Subject to any disclaimer, the term of this patent is extended or adjusted under 35 U.S.C. 154(b) by 0 days.

(21) Appl. No.: 09/280,083

(22) Filed: Mar. 29, 1999

(51) Int. Cl.[7] .................................................. G06F 17/60
(52) U.S. Cl. ............................................ 705/36; 705/35
(58) Field of Search ................................ 705/4, 36, 35, 705/37, 30, 31, 400

(56) References Cited

U.S. PATENT DOCUMENTS

| | | | | |
|---|---|---|---|---|
| 4,953,085 A | | 8/1990 | Atkins | 364/408 |
| 5,101,353 A | | 3/1992 | Lupien et al. | 364/408 |
| 5,148,365 A | | 9/1992 | Dembo | 364/402 |
| 5,502,637 A | | 3/1996 | Beaulieu et al. | 364/408 |
| 5,557,517 A | | 9/1996 | Daughterty, III | 364/408 |
| 5,692,233 A | | 11/1997 | Garman | 705/36 |
| 5,729,700 A | | 3/1998 | Melnikoff | 395/236 |
| 5,752,237 A | | 5/1998 | Cherny | 705/4 |
| 5,761,442 A | | 6/1998 | Barr et al. | 395/236 |
| 5,784,696 A | | 7/1998 | Melnikoff | 705/36 |
| 5,799,287 A | | 8/1998 | Dembo | 705/36 |
| 5,806,048 A | | 9/1998 | Kiron et al. | 705/36 |
| 5,806,049 A | | 9/1998 | Petruzzi | 705/36 |
| 5,812,987 A | | 9/1998 | Luskin et al. | 705/36 |
| 5,812,988 A | | 9/1998 | Sandretto | 705/36 |
| 5,819,237 A | | 10/1998 | Garman | 705/36 |
| 5,852,808 A | | 12/1998 | Cherny | 705/4 |
| 5,864,871 A | | 1/1999 | Kitain et al. | 707/104 |
| 5,946,666 A | * | 8/1999 | Nevo et al. | 705/36 |
| 5,946,667 A | * | 8/1999 | Tull, Jr. et al. | 705/36 |
| 6,061,662 A | * | 5/2000 | Makivic | 705/36 |
| 6,393,409 B2 | * | 5/2002 | Young et al. | 705/37 |
| 6,510,419 B1 | * | 1/2003 | Gatto | 705/36 |
| 6,560,580 B1 | * | 5/2003 | Fraser et al. | 705/37 |

FOREIGN PATENT DOCUMENTS

DE 35/39545 * 1/1985

OTHER PUBLICATIONS

"Evaluating Virtual Options", Mar. 2001, Cox School of Business, College of Business Administration, University of North Texas.*

"Advances System Expose Elusive Rate Risks", Bank Technology News, p1, Jan., 1993.*

"Scrolling News", Inside market Data, v9, n18, pN/A, Jun. 6, 1994.*

"Pprcess CMO Calculations on Supercomputer", Investment Management Technology, v1, n15n, pN/A, Apr. 17, 1992.*

"New Projects Unveiled at A.D Little Conference", tRading sYSTEMS tECHNOLOGY, V2, N18, pN/A.*

* cited by examiner

*Primary Examiner*—Jeffrey Pwu
(74) *Attorney, Agent, or Firm*—McDermott Will & Emery LLP

(57) ABSTRACT

An apparatus, method and data structure for procuring and analyzing information, particularly information regarding the financial markets. The system provides a comprehensive combination of financial information in a format that facilitates analysis and decision-making.

7 Claims, 42 Drawing Sheets

| | Coupon | Maturity | Issue Date | Price | Chg | Yield | Chg(bps) | Update Time |
|---|---|---|---|---|---|---|---|---|
| | 0.000 | 03/25/99 | 12/24/98 | 3.992 - 3.982 | -0.405 | 4.459 - 4.449 | +0.0 | 05:58PM |
| | 0.000 | 04/01/99 | 12/31/98 | 4.517 - 4.508 | 0.012 | 4.584 - 4.574 | +1.2 | 05:58PM |
| | 0.000 | 04/08/99 | 01/07/99 | 4.422 - 4.412 | -0.027 | 4.492 - 4.481 | -2.8 | 05:58PM |
| | 0.000 | 05/06/99 | 02/04/99 | 4.398 - 4.387 | 0.008 | 4.482 - 4.471 | +0.8 | 05:58PM |
| | 0.000 | 05/13/99 | 02/11/99 | 4.432 - 4.422 | 0.047 | 4.521 - 4.511 | +4.8 | 05:58PM |
| | 0.000 | 05/20/99 | 02/18/99 | 4.422 - 4.412 | 0.028 | 4.515 - 4.505 | +2.8 | 05:58PM |
| | 0.000 | 05/27/99 | 02/25/99 | 4.438 - 4.427 | 0.017 | 4.534 - 4.524 | +1.7 | 05:58PM |
| | 0.000 | 06/03/99 | 12/03/98 | 4.372 - 4.362 | -0.012 | 4.471 - 4.461 | -1.4 | 05:58PM |
| | 0.000 | 06/10/99 | 03/11/99 | 4.362 - 4.352 | -0.017 | 4.477 - 4.467 | -1.9 | 05:58PM |
| | 0.000 | 06/17/99 | 03/18/99 | 4.352 - 4.342 | -0.028 | 4.470 - 4.460 | -3.0 | 05:58PM |
| 3M | 0.000 | 06/24/99 | 03/25/99 | 4.378 - 4.367 | 0.002 | 4.500 - 4.490 | +0.2 | 05:56PM |
| | 0.000 | 07/01/99 | 12/31/98 | 4.347 - 4.338 | 0.027 | 4.461 - 4.450 | +2.8 | 05:58PM |
| | 0.000 | 07/08/99 | 01/07/99 | 4.338 - 4.327 | 0.008 | 4.454 - 4.444 | +0.7 | 05:17PM |
| | 0.000 | 07/15/99 | 01/14/99 | 4.295 - 4.285 | 0.020 | 4.414 - 4.403 | +2.1 | 05:58PM |
| | 0.000 | 08/19/99 | 02/18/99 | 4.402 - 4.392 | 0.005 | 4.545 - 4.535 | +0.4 | 05:17PM |
| | 0.000 | 08/26/99 | 02/25/99 | 4.372 - 4.362 | 0.017 | 4.518 - 4.507 | +1.8 | 05:17PM |
| | 0.000 | 09/02/99 | 03/04/99 | 4.385 - 4.375 | 0.025 | 4.547 - 4.537 | +2.6 | 05:17PM |
| | 0.000 | 09/09/99 | 03/11/99 | 4.387 - 4.378 | 0.002 | 4.554 - 4.543 | +0.2 | 05:17PM |
| | 0.000 | 09/16/99 | 03/18/99 | 4.438 - 4.427 | 0.025 | 4.611 - 4.600 | +2.6 | 05:17PM |
| 6M | 0.000 | 09/23/99 | 03/25/99 | 4.372 - 4.362 | 0.012 | 4.546 - 4.535 | +1.3 | 05:56PM |
| | 0.000 | 10/14/99 | 10/15/98 | 4.418 - 4.407 | 0.008 | 4.583 - 4.572 | +0.8 | 05:58PM |
| | 0.000 | 11/12/99 | 11/12/98 | 4.440 - 4.430 | 0.015 | 4.612 - 4.601 | +1.6 | 05:58PM |
| | 0.000 | 12/09/99 | 12/10/98 | 4.430 - 4.420 | 0.005 | 4.608 - 4.597 | +0.5 | 05:58PM |
| | 0.000 | 01/06/00 | 01/07/99 | 4.405 - 4.395 | -0.002 | 4.590 - 4.580 | -0.3 | 05:17PM |

160

NYSE (more)

| | Last Trade Price | Net Change | Percent Change | Volume | Last Trade Time |
|---|---|---|---|---|---|
| AMERICA ONLINE(AOL) | 117 3/8 | -3 5/8 | -3.00% | 32,568,500 | 04:39PM |
| COMPAQ COMPUTER(CPQ) | 31 9/16 | +0 15/16 | +3.06% | 19,620,600 | 04:30PM |
| BELLSOUTH CORP(BLS) | 41 | -1 3/4 | -4.09% | 11,186,700 | 04:25PM |
| AT & T(T) | 80 13/16 | +3 3/16 | +4.11% | 9,018,400 | 04:23PM |
| LUCENT TECH(LU) | 98 1/2 | -1 11/16 | -1.68% | 8,897,700 | 04:18PM |
| CITIGROUP(C) | 60 1/8 | -1 | -1.64% | 7,892,300 | 04:00PM |
| SEAGATE TECH(SEG) | 26 | -2 1/8 | -7.56% | 7,803,300 | 04:04PM |
| MICRON TECH(MU) | 53 1/4 | +2 5/8 | +5.19% | 6,414,700 | 04:35PM |
| WALT DISNEY CO(DIS) | 33 3/16 | +0 | +0.00% | 6,025,400 | 04:14PM |
| INTL BUS MACHINE(IBM) | 169 1/2 | +4 1/8 | +2.49% | 5,910,500 | 04:30PM |

160

NASDAQ (more)

| | Last Trade Price | Net Change | Percent Change | Volume | Last Trade Time |
|---|---|---|---|---|---|
| DELL COMPUTER(DELL) | 38 1/2 | +2 13/16 | +7.88% | 50,536,400 | 04:01PM |
| MICROSOFT CP(MSFT) | 171 1/4 | +4 11/16 | +2.81% | 20,647,200 | 04:01PM |
| INTEL CORP(INTC) | 119 1/4 | +4 11/16 | +4.09% | 16,041,000 | 04:01PM |
| ORACLE CORP(ORCL) | 25 15/16 | -0 1/8 | -0.48% | 14,328,500 | 04:01PM |
| THREE COM CP(COMS) | 24 7/16 | +0 13/16 | +3.44% | 13,863,200 | 04:01PM |
| LM ERICS TEL(ERICY) | 21 1/16 | -1 1/4 | -5.60% | 13,759,600 | 04:01PM |
| MCI WORLDCOM(WCOM) | 88 3/8 | +2 3/8 | +2.76% | 11,988,700 | 04:01PM |
| CISCO SYSTEMS(CSCO) | 104 7/16 | +4 1/8 | +4.11% | 11,414,100 | 04:01PM |
| SUMMIT TECH(BEAM) | 8 15/16 | +3 3/8 | +60.67% | 8,119,300 | 04:01PM |
| FORE SYSTEMS(FORE) | 18 1/8 | -1 1/4 | -6.45% | 8,111,000 | 04:01PM |

| NYSE (more) | | | | | |
|---|---|---|---|---|---|
| | Last Trade Price | Net Change | Percent Change | Volume | Last Trade Time |
| KNOLL INC(KNL) | 24 1/4 | +9 | +59.02% | 2,862,900 | 04:00PM |
| ARTRA GROUP INC(ATA) | 7 3/4 | +1 13/16 | +30.53% | 581,300 | 04:00PM |
| REVLON INC(REV) | 22 1/4 | +5 3/16 | +30.40% | 4,494,200 | 04:22PM |
| GENERAL DATACOMM(GDC) | 2 7/8 | +0 1/2 | +21.05% | 156,400 | 04:08PM |
| NAVISTAR INTL(NAV) | 42 3/16 | +6 1/16 | +16.78% | 1,039,100 | 04:23PM |
| DYNEGY INC(DYN) | 15 | +2 1/16 | +15.94% | 272,900 | 04:04PM |
| CINCINNATI BELL(CSN) | 23 7/16 | +3 | +14.68% | 1,039,400 | 04:02PM |
| VESTA INSURANCE(VTA) | 4 15/16 | +0 5/8 | +14.49% | .360,200 | 04:01PM |
| BURLINGTON IND(BUR) | 7 | +0 7/8 | +14.29% | 1,347,100 | 04:04PM |
| FURON CO(FCY) | 13 3/8 | +1 5/8 | +13.83% | 157,100 | 03:49PM |

160

| NASDAQ (more) | | | | | |
|---|---|---|---|---|---|
| | Last Trade Price | Net Change | Percent Change | Volume | Last Trade Time |
| MININGCO.COM(MINE) | 47 1/2 | +22 1/2 | +90.00% | 7,704,300 | 04:01PM |
| ACE*COMM CORP(ACEC) | 3 11/16 | +1 11/16 | +84.38% | 453,800 | 03:59PM |
| SUMMIT TECH(BEAM) | 8 15/16 | +3 3/8 | +60.67% | 8,121,100 | 04:01PM |
| INTERCARDIA(ITRC) | 8 | +2 1/2 | +45.45% | 3,100 | 03:41PM |
| PHARMANETICS(PHAR) | 3 3/4 | +1 1/8 | +42.86% | 226,900 | 03:54PM |
| CYTYC CORP(CYTC) | 14 7/8 | +4 7/16 | +42.51% | 1,528,900 | 04:00PM |
| ESQUIRE COMM(ESQS) | 5 3/4 | +1 5/8 | +39.39% | 72,600 | 03:49PM |
| N AMER TECH GP(NATK) | 2 7/16 | +0 11/16 | +39.29% | 8,500 | 01:33PM |
| BOTTOMLINE TECH(EPAY) | 71 1/2 | +19 | +36.19% | 5,181,800 | 04:01PM |
| OLYMPIC CASCADE(NATS) | 3 15/32 | +0 29/32 | +35.37% | 22,600 | 03:55PM |

| NYSE (more) | | | | | |
|---|---|---|---|---|---|
| | Last Trade Price | Net Change | Percent Change | Volume | Last Trade Time |
| ALLIED PROD CORP(ADP) | 2 15/16 | -0 9/16 | -16.07% | 712,800 | 03:52PM |
| HARNISCHFEGER CP(HPH) | 5 1/4 | -0 15/16 | -15.15% | 409,000 | 04:00PM |
| BENTON OIL(BNO) | 3 5/8 | -0 7/16 | -10.77% | 148,800 | 04:01PM |
| MAGELLAN HLTH(MGL) | 4 3/4 | -0 9/16 | -10.59% | 242,800 | 04:02PM |
| DELTA WOODSIDE(DLW) | 5 7/16 | -0 5/8 | -10.31% | 23,000 | 03:48PM |
| BEIJING YANHUA(BYH) | 4 3/16 | -0 7/16 | -9.46% | 19,500 | 03:09PM |
| JENNY CRAIG INC(JC) | 3 3/4 | -0 3/8 | -9.09% | 200,100 | 03:53PM |
| HARTMARX CORP(HMX) | 4 7/16 | -0 7/16 | -8.97% | 97,600 | 04:00PM |
| BOYDS COLLECTION(FOB) | 16 1/2 | -1 9/16 | -8.65% | 448,600 | 04:03PM |
| MDC HOLDINGS INC(MDC) | 13 3/4 | -1 1/4 | -8.33% | 42,400 | 04:00PM |

160

| NASDAQ (more) | | | | | |
|---|---|---|---|---|---|
| | Last Trade Price | Net Change | Percent Change | Volume | Last Trade Time |
| SMALLWORLDW ADR(SWLDY) | 5 15/16 | -4 3/16 | -41.36% | 671,900 | 04:00PM |
| ALTIVA FINL CP(ATVAD) | 3 1/2 | -1 1/2 | -30.00% | 7,200 | 03:09PM |
| READ RITE CP(RDRT) | 6 1/8 | -1 5/8 | -20.97% | 6,087,100 | 04:00PM |
| GEOSCIENCE CORP(GSCI) | 6 1/8 | -1 9/16 | -20.33% | 268,000 | 03:57PM |
| LEAP GROUP INC(LEAP) | 2 7/8 | -0 23/32 | -20.00% | 1,062,000 | 03:59PM |
| FSI INTL INC(FSII) | 5 7/8 | -1 5/16 | -18.26% | 2,304,000 | 04:00PM |
| SM & A CORP(WINS) | 10 1/8 | -2 1/4 | -18.18% | 26,600 | 03:59PM |
| SOCRATES TECH(SOCT) | 2 1/8 | -0 15/32 | -18.07% | 164,000 | 03:59PM |
| HOLLIS EDEN PH(HEPH) | 18 3/4 | -4 1/8 | -18.03% | 1,084,200 | 04:01PM |
| KIRLIN HOLDING(KILN) | 3 1/2 | -0 3/4 | -17.65% | 2,800 | 02:37PM |

| NYSE (more) | Last Trade Price | Net Change | Percent Change | Volume | Last Trade Time |
|---|---|---|---|---|---|
| WASH POST CL B(WPO) | 532 15/16 | +10 15/16 | +2.10% | 5,700 | 04:03PM |
| KNOLL INC(KNL) | 24 1/4 | +9 | +59.02% | 2,862,900 | 04:00PM |
| MONTANA POWER CO(MTP) | 79 3/8 | +7 5/8 | +10.63% | 832,300 | 04:26PM |
| LEXMARK INTL(LXK) | 91 5/8 | +6 1/16 | +7.09% | 686,500 | 04:01PM |
| NAVISTAR INTL(NAV) | 42 3/16 | +6 1/16 | +16.78% | 1,039,100 | 04:23PM |
| CONSOL GRAPHICS(COX) | 52 1/8 | +5 5/8 | +12.10% | 228,100 | 04:00PM |
| TELECOM ITALIA(TI) | 103 1/16 | +5 1/2 | +5.64% | 71,700 | 04:03PM |
| REVLON INC(REV) | 22 1/4 | +5 3/16 | +30.40% | 4,494,200 | 04:22PM |
| QUAKER OATS CO(OAT) | 59 5/16 | +5 1/16 | +9.33% | 995,800 | 04:01PM |
| SAFEGUARD SCIEN(SFE) | 62 1/2 | +5 | +8.70% | 1,125,500 | 04:00PM |

160

| NASDAQ (more) | Last Trade Price | Net Change | Percent Change | Volume | Last Trade Time |
|---|---|---|---|---|---|
| MININGCO.COM(MINE) | 47 1/2 | +22 1/2 | +90.00% | 7,704,300 | 04:01PM |
| BOTTOMLINE TECH(EPAY) | 71 1/2 | +19 | +36.19% | 5,181,800 | 04:01PM |
| DOUBLECLICK INC(DCLK) | 179 7/8 | +12 7/8 | +7.71% | 3,011,800 | 04:00PM |
| CMGI INC(CMGI) | 176 3/8 | +12 3/8 | +7.55% | 3,823,100 | 04:00PM |
| ABOVENET COMMS(ABOV) | 77 15/16 | +10 3/8 | +15.36% | 1,830,000 | 04:00PM |
| SYNETIC INC(SNTCG) | 105 | +8 | +8.25% | 190 | 03:56PM |
| FULLER H B CO(FULL) | 55 7/8 | +7 7/8 | +16.41% | 133,500 | 04:00PM |
| VERTICALNET INC(VERT) | 88 | +7 1/16 | +8.73% | 396,800 | 03:59PM |
| REDWOOD EMPIRE(REBC) | 29 | +6 7/8 | +31.07% | 65,400 | 03:59PM |
| ONYX SOFTWARE(ONXS) | 30 | +6 13/16 | +29.38% | 1,600,500 | 04:00PM |

| NYSE (more) | Last Trade Price | Net Change | Percent Change | Volume | Last Trade Time |
|---|---|---|---|---|---|
| BERKSHIRE CL A(BRKA) | 73500 | -200 | -0.27% | 340 | 03:59PM |
| BERKSHIRE CL B(BRKB) | 2432 | -18 | -0.73% | 10,966 | 04:03PM |
| AMER EXPRESS CO(AXP) | 117 1/8 | -4 3/16 | -3.45% | 1,819,400 | 04:16PM |
| ELAN CORP PLC(ELN) | 69 15/16 | -3 13/16 | -5.17% | 1,498,400 | 04:01PM |
| CENTURY TEL ENTR(CTL) | 68 5/16 | -3 11/16 | -5.12% | 5,232,300 | 04:22PM |
| AMERICA ONLINE(AOL) | 117 3/8 | -3 5/8 | -3.00% | 32,568,500 | 04:39PM |
| TIMES MIRROR(TME) | 97 1/2 | -3 1/2 | -3.47% | 500 | 01:30PM |
| CIRC CITY STORES(CC) | 72 1/8 | -3 7/16 | -4.55% | 1,407,500 | 04:25PM |
| EQUITABLE CO INC(EQ) | 65 | -3 5/16 | -4.85% | 550,800 | 04:01PM |
| LINENS N THINGS(LIN) | 41 | -2 15/16 | -6.69% | 429,700 | 04:00PM |

160

| NASDAQ (more) | Last Trade Price | Net Change | Percent Change | Volume | Last Trade Time |
|---|---|---|---|---|---|
| GLOBAL TELESYS(GTSG) | 55 5/8 | -7 5/8 | -12.06% | 1,265,700 | 03:59PM |
| SEPRACOR INC(SEPR) | 113 3/8 | -6 5/8 | -5.52% | 877,300 | 04:00PM |
| AUTOWEB.COM(AWEB) | 33 11/16 | -6 5/16 | -15.78% | 7,769,000 | 04:00PM |
| BROADVISION(BVSN) | 57 1/8 | -5 3/4 | -9.15% | 1,038,400 | 04:00PM |
| NETWORK SOLUT(NSOL) | 110 | -5 3/4 | -4.97% | 3,575,500 | 04:01PM |
| ARM HOLDINGS(ARMHY) | 131 | -5 11/16 | -4.16% | 4,700 | 03:52PM |
| BAKER J NOTES(JBAKG) | 66 | -5 | -7.04% | 4 | 11:30AM |
| NEW ERA NETWKS(NEON) | 52 | -4 7/8 | -8.57% | 1,180,700 | 04:00PM |
| KAMAN CORP DEB(KAMNG) | 95 | -4 7/8 | -4.88% | 10 | 02:42PM |
| PERCLOSE INC(PERC) | 41 5/8 | -4 7/16 | -9.63% | 613,800 | 03:59PM |

FIG. 20

| 3 Month (%) | 6 Month (%) | 1 Year (%) | 2 Year (%) | 3 Year (%) | 5 Year (%) | 7 Year (%) | 10 Year (%) | 30 Year (%) |
|---|---|---|---|---|---|---|---|---|
| 4.651 | 4.695 | 4.823 | 5.081 | 5.166 | 5.205 | 5.310 | 5.179 | 5.575 |
| 5.220 | 5.200 | 5.410 | 5.620 | 5.650 | 5.660 | 5.740 | 5.680 | 5.960 |
| 8.200 | 8.420 | 8.680 | 9.480 | 9.740 | 10.090 | 10.320 | 10.360 | 10.430 |

| | 2Y | 3Y | 5Y | 7Y | 10Y | 30Y |
|---|---|---|---|---|---|---|
| 2Y | | 14.6 | 9.8 | 36.7 | 22.3 | 69.8 |
| 3Y | | | -4.8 | 22.1 | 7.7 | 55.2 |
| 5Y | | | | 26.9 | 12.5 | 60.0 |
| 7Y | | | | | -14.4 | 33.1 |
| 10Y | | | | | | 47.5 |
| 30Y | | | | | | |

Figure 24:
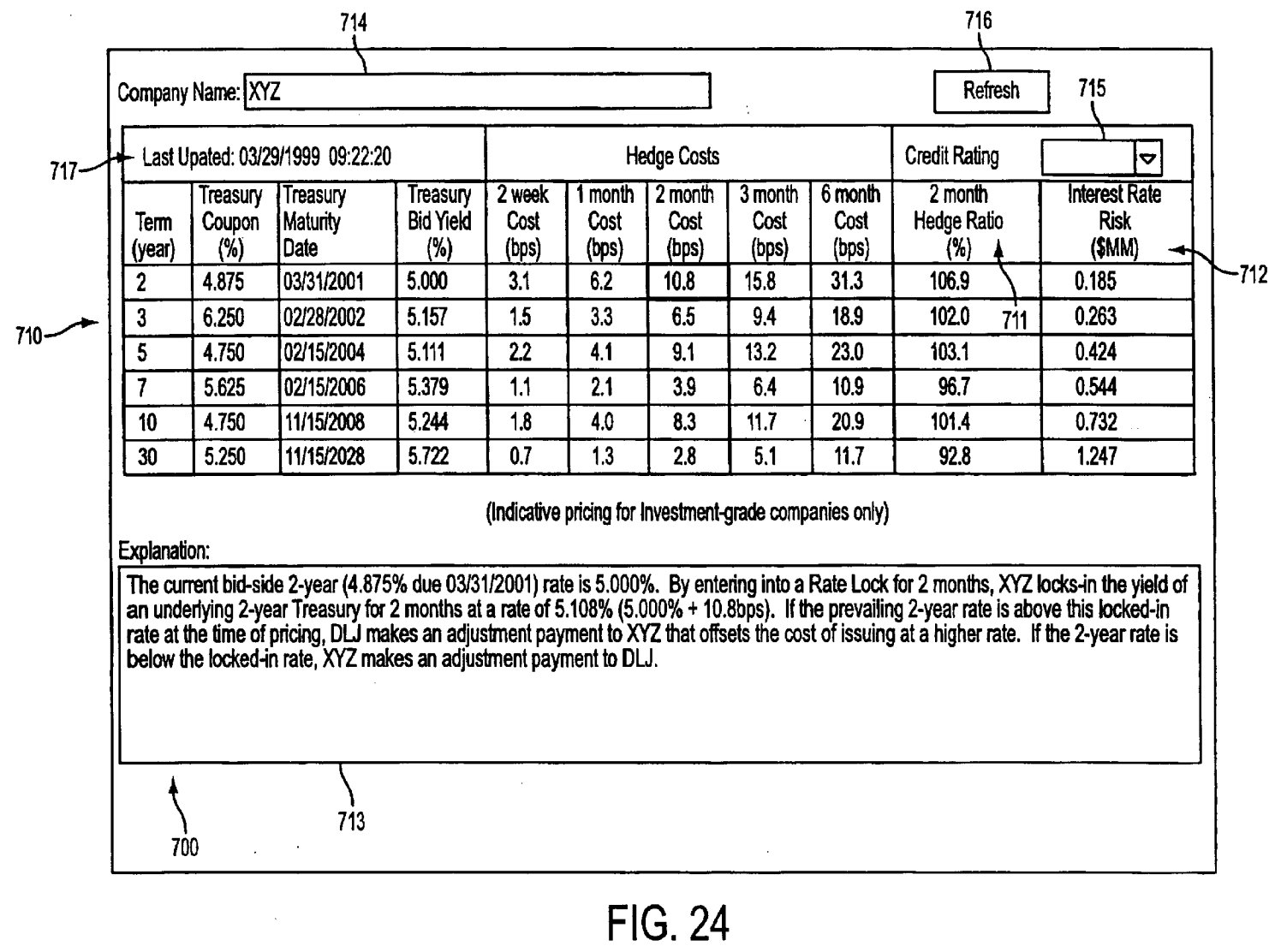

714 716 715

Company Name: XYZ  [Refresh]

717 — Last Updated: 03/29/1999 09:22:20

710

| Last Updated: 03/29/1999 09:22:20 | | | | Hedge Costs | | | | | Credit Rating | |
|---|---|---|---|---|---|---|---|---|---|---|
| Term (year) | Treasury Coupon (%) | Treasury Maturity Date | Treasury Bid Yield (%) | 2 week Cost (bps) | 1 month Cost (bps) | 2 month Cost (bps) | 3 month Cost (bps) | 6 month Cost (bps) | 2 month Hedge Ratio (%) | Interest Rate Risk ($MM) |
| 2 | 4.875 | 03/31/2001 | 5.000 | 3.1 | 6.2 | 10.8 | 15.8 | 31.3 | 106.9 | 0.185 |
| 3 | 6.250 | 02/28/2002 | 5.157 | 1.5 | 3.3 | 6.5 | 9.4 | 18.9 | 102.0 | 0.263 |
| 5 | 4.750 | 02/15/2004 | 5.111 | 2.2 | 4.1 | 9.1 | 13.2 | 23.0 | 103.1 | 0.424 |
| 7 | 5.625 | 02/15/2006 | 5.379 | 1.1 | 2.1 | 3.9 | 6.4 | 10.9 | 96.7 | 0.544 |
| 10 | 4.750 | 11/15/2008 | 5.244 | 1.8 | 4.0 | 8.3 | 11.7 | 20.9 | 101.4 | 0.732 |
| 30 | 5.250 | 11/15/2028 | 5.722 | 0.7 | 1.3 | 2.8 | 5.1 | 11.7 | 92.8 | 1.247 |

711 712

(Indicative pricing for Investment-grade companies only)

Explanation:

The current bid-side 2-year (4.875% due 03/31/2001) rate is 5.000%. By entering into a Rate Lock for 2 months, XYZ locks-in the yield of an underlying 2-year Treasury for 2 months at a rate of 5.108% (5.000% + 10.8bps). If the prevailing 2-year rate is above this locked-in rate at the time of pricing, DLJ makes an adjustment payment to XYZ that offsets the cost of issuing at a higher rate. If the 2-year rate is below the locked-in rate, XYZ makes an adjustment payment to DLJ.

| Term | Trsy | Spread | Yield |
|---|---|---|---|
| 0.25 | 5.037 | 45.0 | 5.487 |
| 0.50 | 5.171 | 45.0 | 5.621 |
| 1.00 | 5.228 | 45.0 | 5.678 |
| 2.00 | 5.309 | 50.0 | 5.809 |
| 3.00 | 5.382 | 60.0 | 5.982 |
| 5.00 | 5.309 | 75.0 | 6.059 |
| 7.00 | 5.380 | 85.0 | 6.230 |
| 10.00 | 5.376 | 100.0 | 6.376 |
| 12.00 | 5.376 | 110.0 | 6.476 |
| 15.00 | 5.376 | 125.0 | 6.626 |
| 20.00 | 5.574 | 115.0 | 6.724 |
| 30.00 | 5.574 | 130.0 | 6.874 |
| 40.00 | 5.574 | 140.0 | 6.974 |
| 50.00 | 5.574 | 140.0 | 6.974 |
| 100.00 | 5.574 | 140.0 | 6.974 |

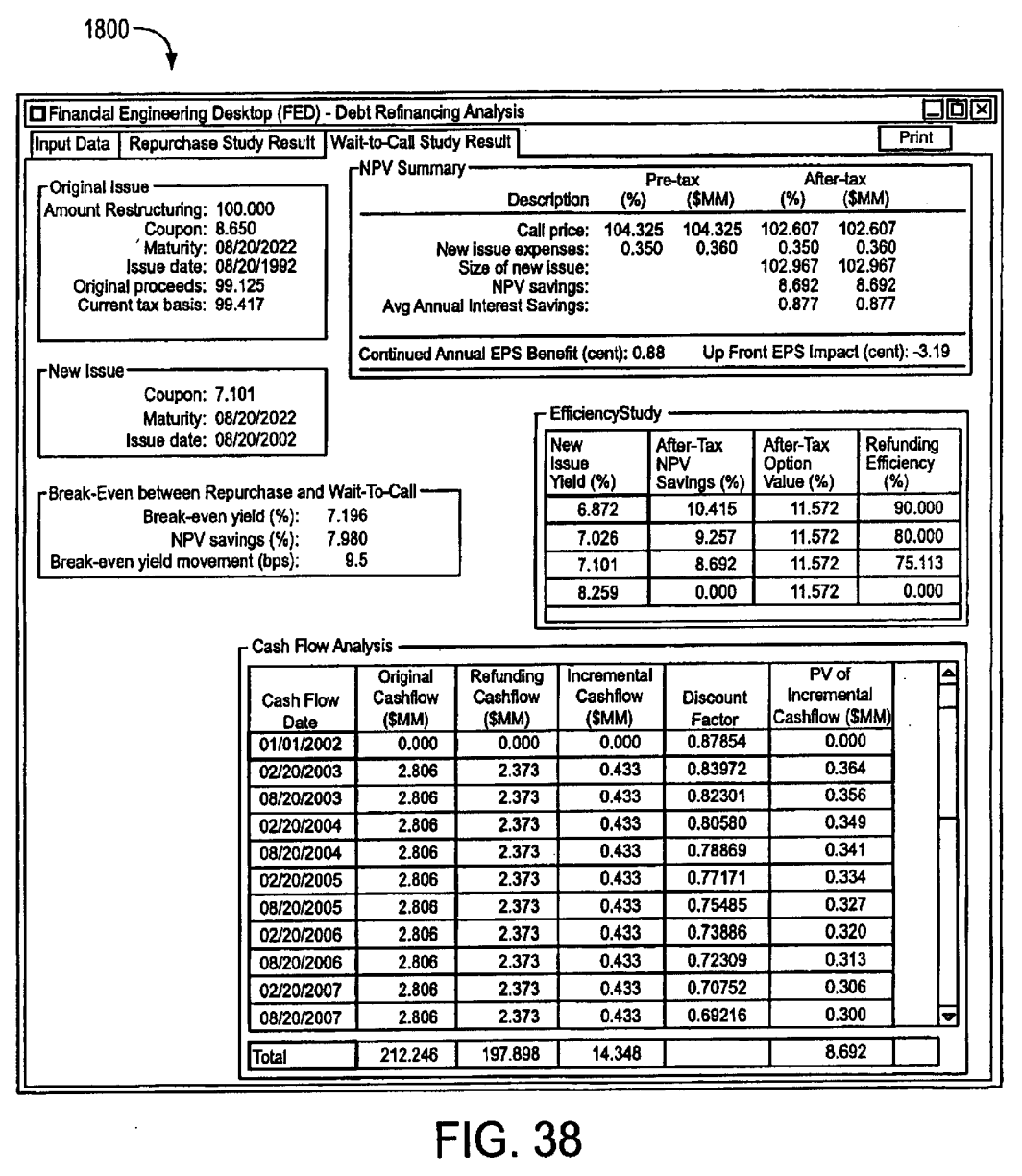

1800

Financial Engineering Desktop (FED) - Debt Refinancing Analysis

Input Data | Repurchase Study Result | Wait-to-Call Study Result | Print

Original Issue

Amount Restructuring: 100.000
Coupon: 8.650
Maturity: 08/20/2022
Issue date: 08/20/1992
Original proceeds: 99.125
Current tax basis: 99.417

NPV Summary

| Description | Pre-tax (%) | Pre-tax ($MM) | After-tax (%) | After-tax ($MM) |
|---|---|---|---|---|
| Call price: | 104.325 | 104.325 | 102.607 | 102.607 |
| New issue expenses: | 0.350 | 0.360 | 0.350 | 0.360 |
| Size of new issue: | | | 102.967 | 102.967 |
| NPV savings: | | | 8.692 | 8.692 |
| Avg Annual Interest Savings: | | | 0.877 | 0.877 |

Continued Annual EPS Benefit (cent): 0.88 Up Front EPS Impact (cent): -3.19

New Issue

Coupon: 7.101
Maturity: 08/20/2022
Issue date: 08/20/2002

Break-Even between Repurchase and Wait-To-Call

Break-even yield (%): 7.196
NPV savings (%): 7.980
Break-even yield movement (bps): 9.5

EfficiencyStudy

| New Issue Yield (%) | After-Tax NPV Savings (%) | After-Tax Option Value (%) | Refunding Efficiency (%) |
|---|---|---|---|
| 6.872 | 10.415 | 11.572 | 90.000 |
| 7.026 | 9.257 | 11.572 | 80.000 |
| 7.101 | 8.692 | 11.572 | 75.113 |
| 8.259 | 0.000 | 11.572 | 0.000 |

Cash Flow Analysis

| Cash Flow Date | Original Cashflow ($MM) | Refunding Cashflow ($MM) | Incremental Cashflow ($MM) | Discount Factor | PV of Incremental Cashflow ($MM) |
|---|---|---|---|---|---|
| 01/01/2002 | 0.000 | 0.000 | 0.000 | 0.87854 | 0.000 |
| 02/20/2003 | 2.806 | 2.373 | 0.433 | 0.83972 | 0.364 |
| 08/20/2003 | 2.806 | 2.373 | 0.433 | 0.82301 | 0.356 |
| 02/20/2004 | 2.806 | 2.373 | 0.433 | 0.80580 | 0.349 |
| 08/20/2004 | 2.806 | 2.373 | 0.433 | 0.78869 | 0.341 |
| 02/20/2005 | 2.806 | 2.373 | 0.433 | 0.77171 | 0.334 |
| 08/20/2005 | 2.806 | 2.373 | 0.433 | 0.75485 | 0.327 |
| 02/20/2006 | 2.806 | 2.373 | 0.433 | 0.73886 | 0.320 |
| 08/20/2006 | 2.806 | 2.373 | 0.433 | 0.72309 | 0.313 |
| 02/20/2007 | 2.806 | 2.373 | 0.433 | 0.70752 | 0.306 |
| 08/20/2007 | 2.806 | 2.373 | 0.433 | 0.69216 | 0.300 |
| Total | 212.246 | 197.898 | 14.348 | | 8.692 |

FIG. 38

METHOD AND SYSTEM FOR PROVIDING FINANCIAL INFORMATION AND EVALUATING SECURITIES OF A FINANCIAL DEBT INSTRUMENT

BACKGROUND OF THE INVENTION

The invention relates in general to an apparatus, method and data structure for providing financial information, including investment information, to assist in the evaluation of securities. More particularly, the invention relates to an apparatus, method and data structure for analyzing a variety of debt and equity instruments.

In the past, bond-pricing and rating information on a specific bond issue was obtained through personal contacts and various services. This process is cumbersome and time intensive as no single contact could provide comprehensive information, thus a complete market evaluation was impossible to achieve.

Several patents have been issued in the financial field. For example, U.S. Pat. Nos. 5,812,987 (to Luskin et al.), 5,812,988 (to Sandretto), 5,502,637 (to Beaulieu et al.), and 5,864,871 (to Kitain et al.), each of which is herein incorporated by reference in its entirety, relate to investments. None of these references, however, provides the data acquisition, analytical tools, and data record manipulation of the present invention.

The foregoing demonstrates that there is a need for an invention which allows one to efficiently obtain and analyze investment information.

SUMMARY OF THE INVENTION

The invention satisfies the need and avoids the drawbacks of the prior art by providing an apparatus, method and data structure that set forth an interactive venue for the procurement and analysis of a comprehensive aggregate of information relating to the financial markets. Access to this system greatly reduces the time and costs associated with the process of identifying specific analysts and services, obtaining and compiling investment information, analyzing the information, and providing financial advice. As such, the invention provides an easy and reliable tool that combines a user-friendly interface with powerful databases and state of the art analytics to identify financial opportunities in the Capital Markets.

In one aspect, the invention provides a full-featured system and method that can be used to create value, leading to transaction advantages in the Debt Capital Markets. The invention simplifies the process of analyzing the markets by making the most relevant information available in an easy-to-use, integrated manner. The primary users of the invention are those who perform the analysis leading to liability management, new issuance, or hedging decisions and include bankers, traders, research analysts and salespeople.

According to another aspect of the invention, an apparatus for and a method of communicating financial information are set forth. The apparatus and method may include the structure for and steps of evaluating securities using a computer connected to a plurality of databases including searching the plurality of databases to identify information relating to a plurality of companies as specified by a user of the computer, transmitting the identified information to the computer via a data network, and manipulating the transmitted information to provide a table of financial information. The method and apparatus also include determining the duration, option adjusted spread, average life, option value and theoretical value of debt issues. The method and apparatus also target investors based on past preference or current ownership of a particularly structured security. Further, the method and apparatus facilitate the identification of arbitrage opportunities. The method and apparatus additionally provide for the analysis of a group of securities regarding intrinsic and incremental value, average portfolio coupon, average portfolio maturity, portfolio option value, theoretical portfolio value, and portfolio efficiency. The method and apparatus also compare duration/cost relationships of a number of securities to evaluate the preferred security features. The method and apparatus include evaluating hedging decisions by evaluating the costs associated with rising interest rates and hedging. Additionally, the method and apparatus include storing information relating to a plurality of securities on a plurality of databases. The invention may also permit a user the option of creating a debt or equity portfolio—specific to the user's needs—from a database of financial information.

In another aspect of the invention an apparatus for evaluating securities for duration, option adjusted spread, average life, and option value and theoretical value is disclosed that includes a data network, a plurality of databases operably connected to the data network, and a computer operably connected to the plurality of databases via the data network.

In a further aspect of the invention, an apparatus for evaluating securities for duration, option adjusted spread, average life, and option value and theoretical value includes means for transmitting information; means for storing company information; whereby the means for storing is operably connected to the means for transmitting; and means for computing is operably connected to the means for storing via the means for transmitting information. The means for searching the means for storing may identify company information as specified by a user. The identified information may be sent from the means for storing to a storage area of the means for computing via the means for transmitting. The means for manipulating the transmitted information may provide a table of financial information, which facilitates the evaluation of securities.

In another aspect of the invention, a system for communicating financial information contains a computer-readable memory for storing data for access by an application program and includes a data structure stored in the computer-readable memory. The data structure may include information used by the application program and may contain a plurality of price fields, option adjusted spread fields, volatility fields, and initial coupon fields, wherein the fields have values and the application program calculates the values of one of the plurality of fields based upon the values of the other three of the plurality of fields. The data structure may also include a plurality of settlement date fields.

In another aspect of the invention, a system for communicating financial information contains a computer-readable memory for storing data for access by an application program and includes a data structure stored in the computer-readable memory. The data structure may include information used by the application program and may contain a plurality of treasury yield fields and corporate yield fields, wherein the application program calculates the corporate yield fields based upon the plurality of treasury yield and spread fields. The data structure may also include parallel shift fields, pivoting shift fields, and two-point tilting fields.

In another aspect of the invention, the data structure may also contain a plurality of term fields, treasury yield fields, and spread fields, wherein the application program calculates cost of funds fields based upon the plurality of term, treasury yield and spread fields.

BRIEF DESCRIPTION OF THE DRAWINGS

FIG. 16 illustrates a portion of a window displaying equity high volume issues for the major exchanges.

FIG. 17 illustrates a portion of a window displaying top percentage gainers for the major exchanges.

FIG. 18 illustrates a portion of a window displaying top percentage losers for the major exchanges.

FIG. 19 illustrates a portion of a window displaying top net gainers for the major exchanges.

FIG. 20 illustrates a portion of a window displaying top net losers for the major exchanges.

FIG. 24 illustrates calculations associated with hedging opportunities according to the principles of the invention.

FIG. 38 illustrates the wait-to-call study result according to the principles of the invention.

DETAILED DESCRIPTION

Figure 1:
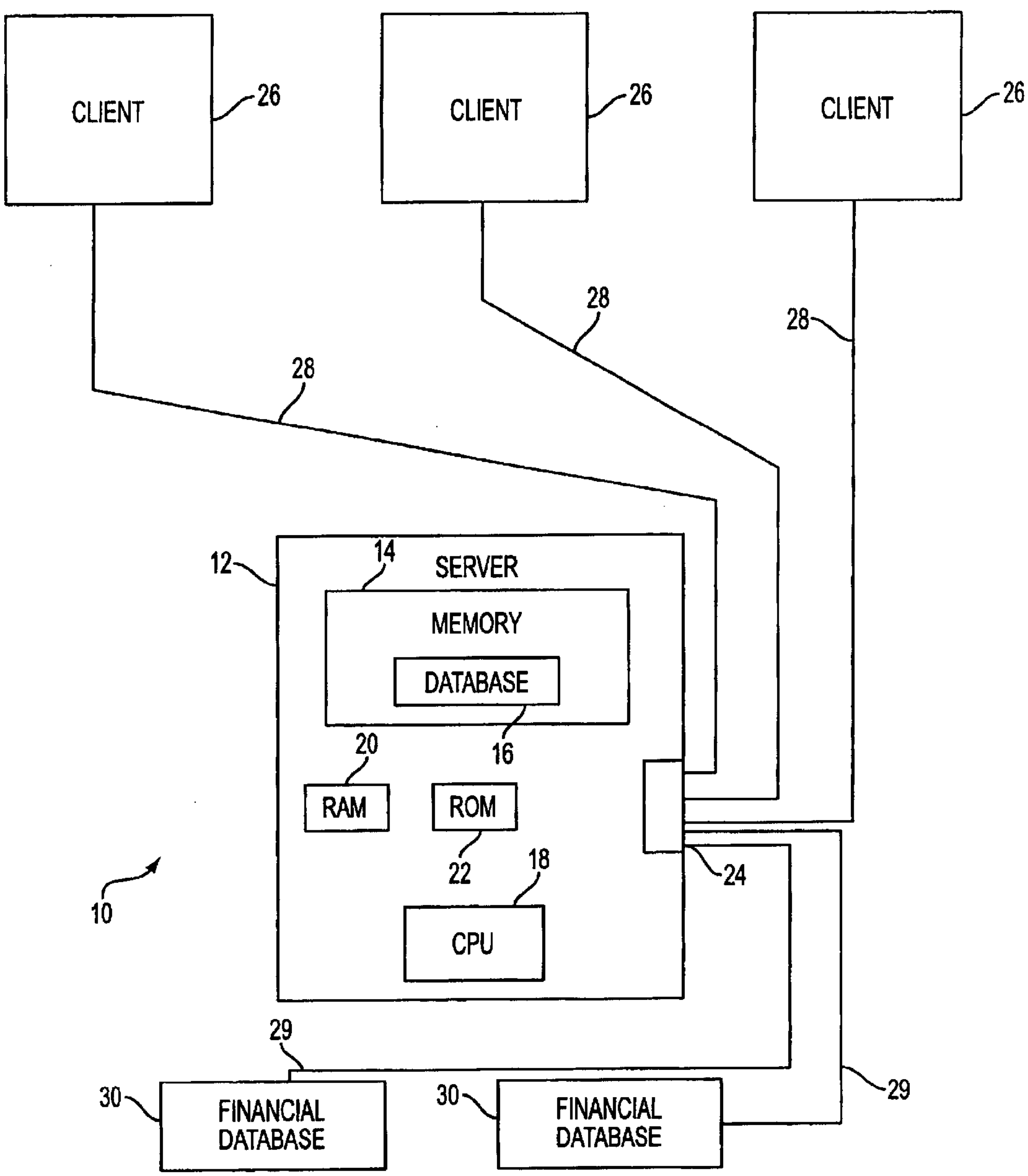
FIG. 1 illustrates a client-server-financial database network for a preferred embodiment of the invention.

FIG. 1 shows a system 10 for communicating financial information according to one aspect of the invention. The system 10 depicted in FIG. 1 includes a server 12 having a memory 14, and a database 16 defined in the memory 14. The server 12 may be an ALPHA server, a minicomputer, a microcomputer, a UNIX machine, a mainframe computer, a personal computer with an Intel Pentium processor, a Macintosh personal computer, or any other suitable computer. The memory 14 is preferably non-volatile (e.g., CD-ROM, hard disk, tape drive, etc.). The server 12 has a central processing unit (CPU) 18, input devices such as a keyboard and mouse (not shown), output devices such as a monitor and printer (not shown), random access memory (RAM) 20, read-only memory (ROM) 22, serial and parallel ports (not shown), and communication hardware 24. There may also be additional memory (not shown) remote from the server 12 and connected to the server 12 via one of the aforementioned serial or parallel ports. The communication hardware 24 may connect the server 12 to the Internet. In a preferred embodiment, the server 12 is a World Wide Web server connected to the Internet. Preferably, the server 12 has an operating system that is capable of multiple users and multi-tasking, such as UNIX, Windows NT, or LINUX. FIG. 1 also demonstrates the inclusion of one or more client machines 26 and one or more financial databases 30 which communicate with the server 12. FIG. 1 does not disclose the specific interconnections between and among the various components in the server 12 as this information is well known.

The client machines 26 may be connected to the server 12 by communication links 28, and the financial databases 30 may be connected to the server 12 by communication links 29. The communication links 28, 29 between the server 12 and the client machines 26 and between the server and the financial databases 30, respectively, may include a large variety of connections, including a telephone link, a hard-wired connection, a satellite link or other wireless connection, an Internet connection, a local area network (LAN), a wide area network (WAN), any combination of the preceding, or any other suitable type of connection. Multiple client machines 26 may communicate simultaneously with the server 12, and each connection may be by a different type of link (e.g., one connection may be by telephone while another may be by the Internet). Similarly, multiple financial databases 30 may communicate simultaneously with the server 12, and each connection may be a different type of link as discussed above. As discussed above, the server 12 connects to communication links 28, 29 via communication hardware 24.

The server 12 may communicate—via communication link 29—with a particular financial database 30 by a variety of communication protocols, including file transfer protocol (FTP), electronic mail (e-mail), transfer control protocol/Internet protocol (TCP/IP), ASCII, X-MODEM, Y-MODEM, KERMIT, any combination of the preceding protocols, or any other suitable type of protocol. The server 12 may gather information from a financial database 30 automatically (e.g., at regularly scheduled intervals), only in response to data requested from a client machine 26, or both automatically and in response to a request from a client machine 26. Depending on the nature of the information provided by a particular financial database 30, the connection between the server 12 and the particular financial database 30 may be "live" at all times or may be established intermittently.

After a link is established between the server 12 and a client machine 26, communication may take place via a variety of communication protocols, as described above with respect to communication between the server 12 and a financial database 30. The software running on a client machine 26 that accesses information on the server 12 may be a known Internet browser such as Netscape Navigator or Internet Explorer or may be any other type of software suitable for transmitting information to and receiving information from the server 12.

In a preferred embodiment, the server 12 is an ALPHA server. With this platform, CPUs, memory, networking capabilities, storage, and software may be modified as appropriate to meet specific requirements. One preferred platform is an ALPHA 2000 4/275, which features 128 MB of memory, a CD-ROM drive, a 4.3 GB redundant array of independent disks (RAID), an 8 GB tape backup, and a 100 base-T network interface. The selection of a suitable server requires consideration of CPU speed as well as disk subsystem performance and network bandwidth. For example, a disk with a 7200 RPM rotational speed may be a suitable disk subsystem. Once the RAID is selected (RAID 0, 1, 2, 3, 4, or 5), the size of the database and its projected growth must be analyzed as part of the known design considerations.

The database 16 on the server 12 may be of any suitable type. One type of server commonly used for large database applications is Oracle. Oracle is an extremely powerful and flexible relational database system. Procedural Language/Standard Query Language (PL/SQL) is a sophisticated programming language used to access the Oracle database from various environments. The Oracle database combines the power and flexibility of SQL (a fourth generation language (4GL)) with the procedural constructs of a third generation language (3GL). PL/SQL is integrated with the database server, so that the PL/SQL code may be processed quickly and efficiently. Another important tool that PL/SQL provides is designed for data manipulation both internally (i.e., within Oracle) and externally in applications.

PL/SQL extends regular SQL by adding constructs found in other procedural languages. Another advantage of PL/SQL is that several SQL statements may be bundled together into one PL/SQL block and sent to the server as a single unit. This results in considerably lowered network traffic and a much faster application.

Another preferred database that may be employed is Oracle8i. The Oracle8i database is useful for Internet applications and manages the content, data and files typically managed by an operating system. Oracle8i has a Java Virtual Machine, a native Java compiler, and a feature called Internet File System (iFS), which provides the ability to store, query, and manage a wide range of relational and non-relational data within the database. iFS, written in Java, allows users to store 164 data types, including spreadsheets, word processing documents, Web pages and e-mail, within the database and retrieve them either in native file format or in HyperText Markup Language (HTML) through a browser. iFS indexes each file automatically and gives users enhanced security, database search capabilities, backup and recovery.

Other features in Oracle8i include WebDB, a environment run through a browser that enables developers to dynamically generate Web content and pages; SQLJ, a programming syntax that embeds SQL database statements into client or server Java code; and interMedia, a system for managing rich data types used over the Web. Of course, other database systems may be utilized according to the invention.

Figure 2A:
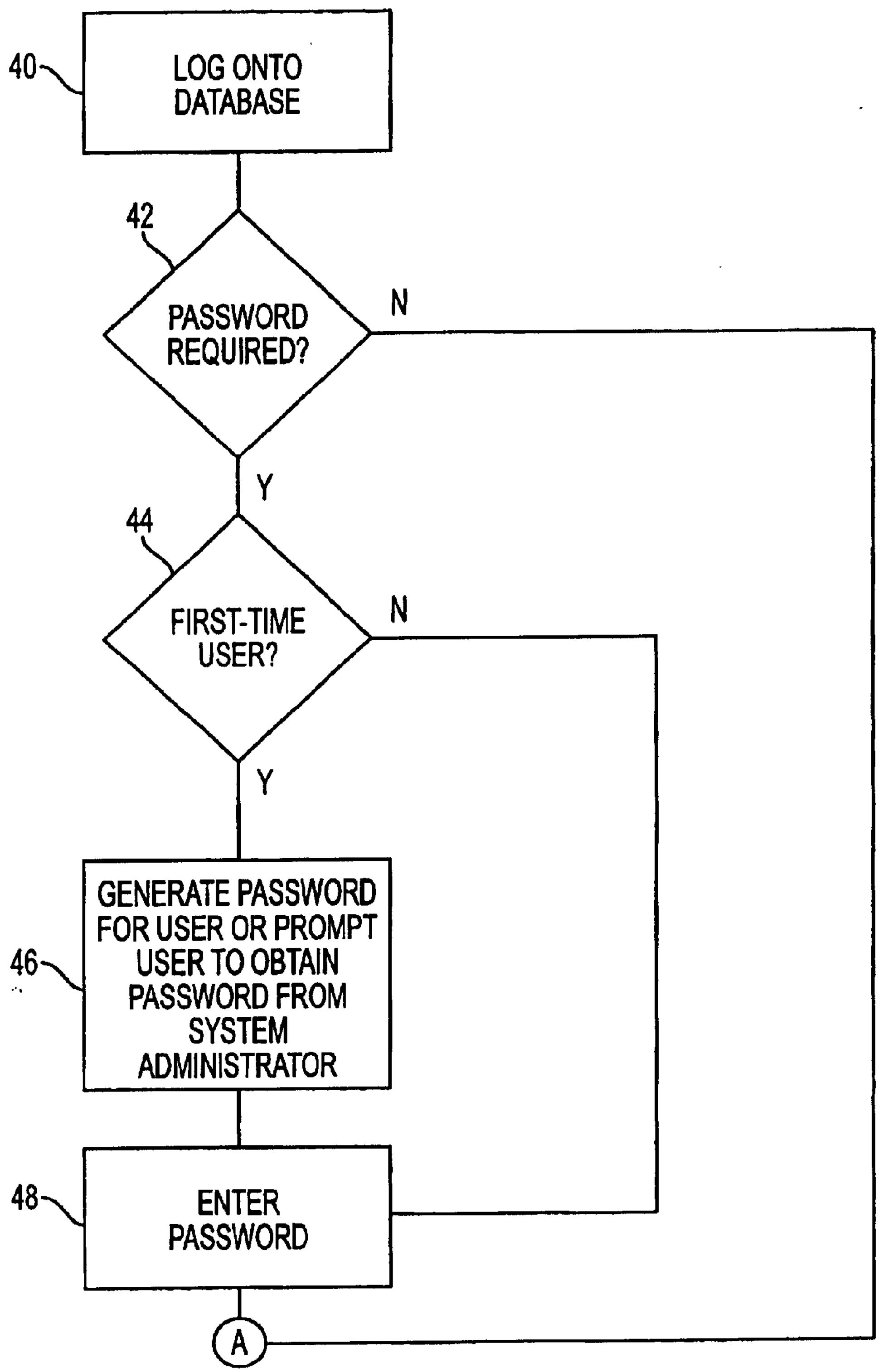
FIGS. 2A and 2B illustrate a flow of data entry and transmission for a preferred embodiment of the invention.
Figure 2B:
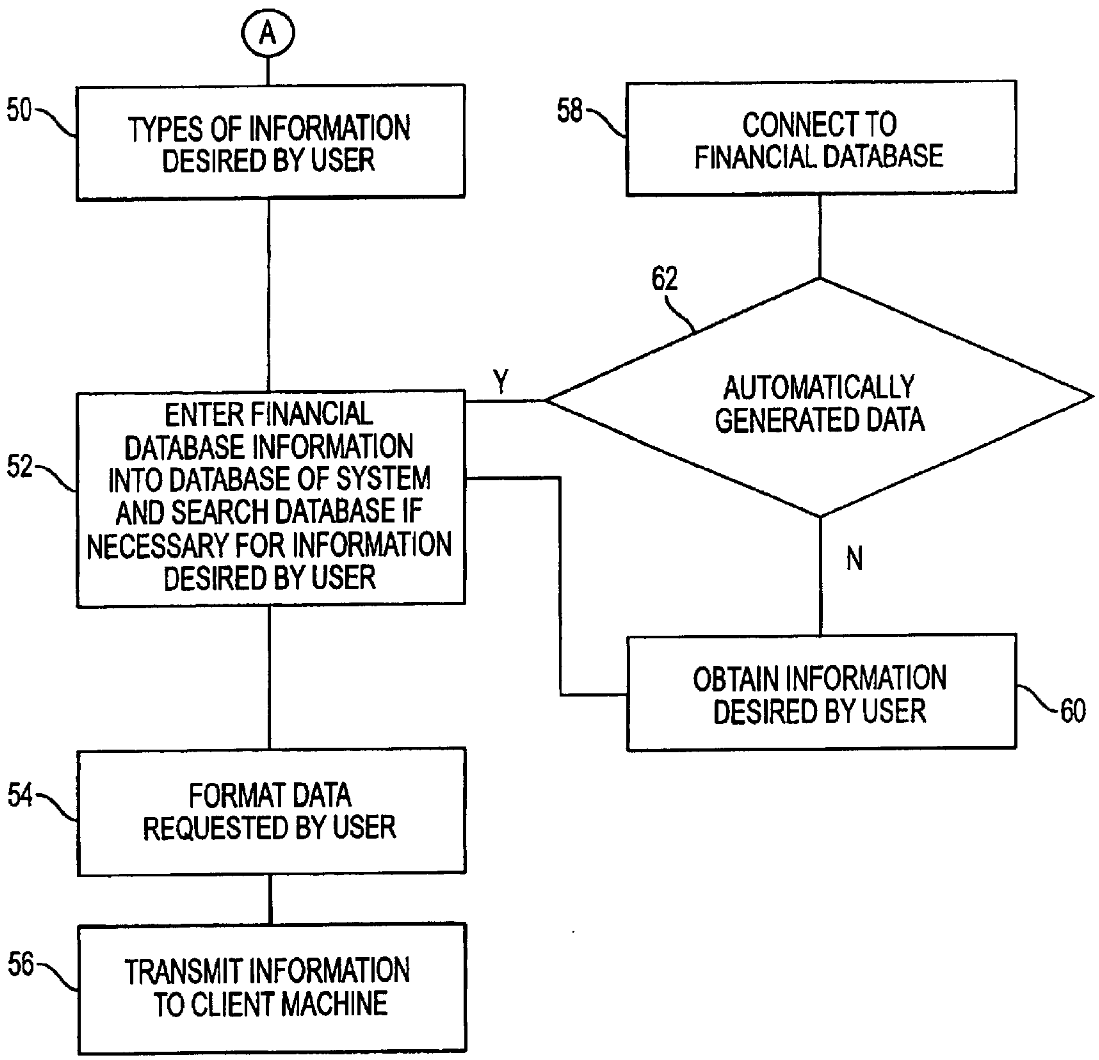

In a preferred embodiment, as seen in FIGS. 1, 2A, and 2B, a user uses a client machine 26 to connect to the server 12 via a communication link 28. The user may then log onto the database 16, as seen at step 40. Optionally, a password may be required of the user, as seen at step 42. If a password is required and the user has not used the system previously, as seen at step 44, the user is given a password by the server 12 or is prompted by the system 10 to obtain a password from an administrator of the server 12, as seen at step 46. Next, the user must enter the previously obtained password, as seen at step 48. FIG. 2A does not illustrate additional steps for repeating the requests for a password and a sales associate number if the contractor enters incorrect data, as these additional steps are known. A contractor who has used the system previously has the option of editing or deleting the contractor's record (not shown).

After logging onto the server 12, a user may enter pertinent information into the database 16 concerning the type or types of information desired, as seen at step 50. A wide variety of data may be entered at step 50 and is not limited to requests concerning various securities.

The server 12 may be connected to one or more financial databases 30, as is seen at step 58. If the data are of a type that is not automatically generated (step 62), the server 12 may request information indicating the information requested by the user and entered into the database 16. This is seen at step 60. If the information from the financial databases 30 is of the type that may be automatically provided to the database 16, step 60 is skipped as is indicated by step 62.

Once the information from one more financial databases 30 is entered into the database 16, a search may be performed using server 12 to identify information requested by a user. This search is seen at step 52 and need only be performed for data automatically generated by one or more financial databases.

The server 12 may then format the requested information appropriately, as is seen at step 54. Once the information is formatted, it may then be transmitted to a user at a client machine 26, as seen in step 56.

Figure 3:
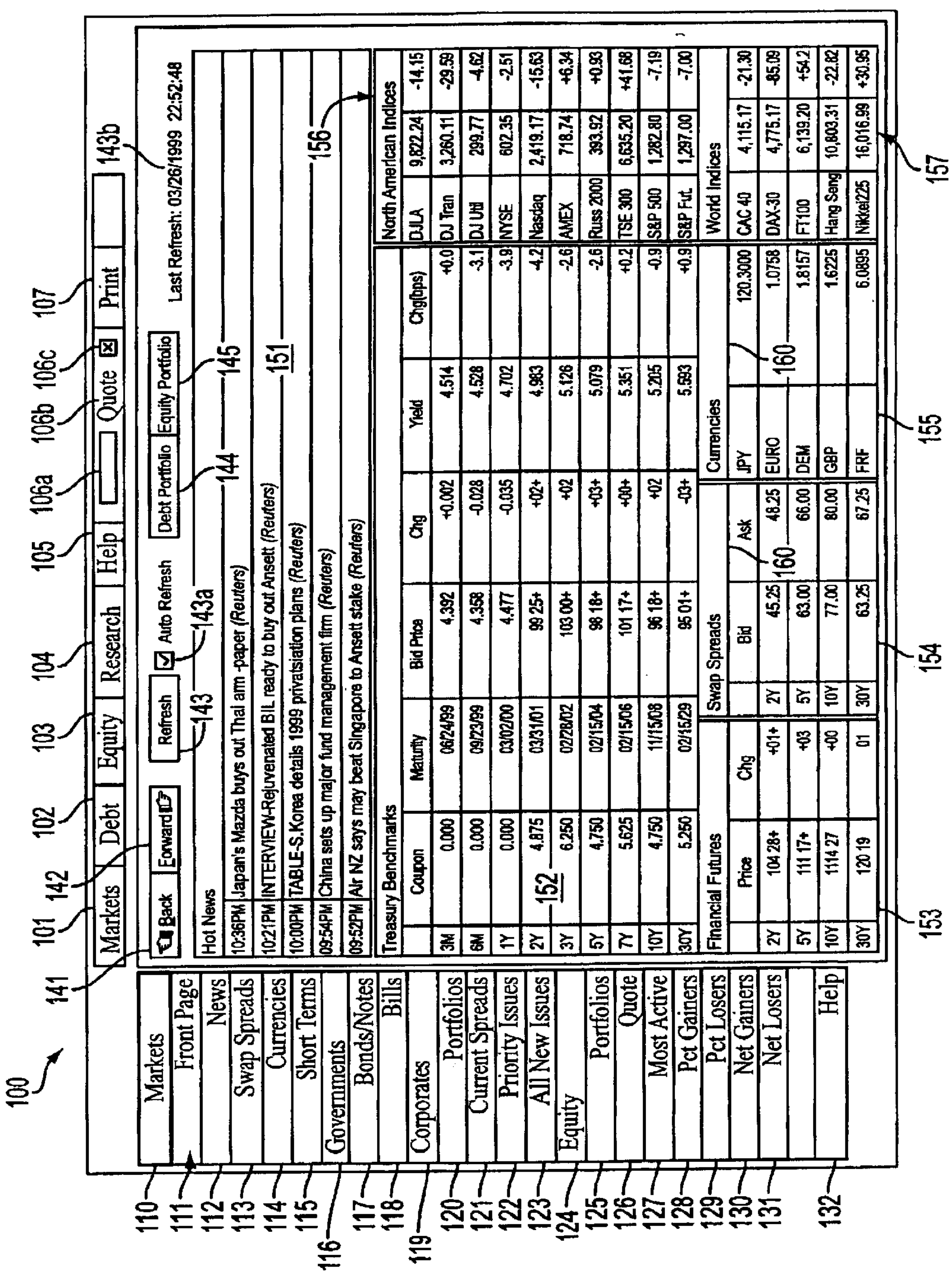
FIG. 3 illustrates a user interface according to the principles of the invention.

Navigation through the system 10 is easily accomplished via a Web-style environment of point-and-click that directly links a user to desired sections. It is understood that selecting, pointing, clicking, choosing, and the like refer to the use of a mouse and mouse pointer. In a preferred embodiment, five tabs are provided on Front Page 100. Markets tab 101, Debt tab 102, Equity tab 103, Research tab 104, and Help tab 105 are shown in FIG. 3. These tabs, when selected, connect a user directly to the section relating to the selected tab.

In FIG. 3, Quote window 106*a*, Quote tab 106*b*, and Quote Window Launch tab 106*c* are disposed, as shown adjacent to Help tab 105. A user may receive a stock quote by entering a stock symbol in Quote window 106*a* and then clicking on Quote tab 106*b*. Alternatively, a user may select Quote Window Launch tab 106*c* and enter a desired stock symbol in the provided relating to the company associated with the stock symbol. More preferably, a user may select news over various time frames, such as the past 24 hours, the past week, the past month, and the past six months.

Print tab 107 is also located at the top of FIG. 3. In a preferred embodiment, clicking on the Print tab 107 permits three choices within the markets section: Window Snapshot, Text, and Printer Set Up. The Window Snapshot option prints an image of the current window and is limited to what is visible in the current window. The Text option prints all of the current market data from the page including portions that are not visible, but can be viewed via scrolling. The Printer Setup option permits the user to select a particular printer and change the properties of the printer, such as the paper orientation (i.e., portrait or landscape).

As seen in FIG. 3, another series of tabs are located below tabs 101–107. Back tab 141 and Forward tab 142 permit a user to quickly access the contents of a previous or subsequent screen, respectively. Refresh tab 143 permits a user to refresh the screen with the most current information at a time decided by the user. Auto Refresh tab 143*a* may alternatively be selected to enable the screen to refresh automatically, for example, every two minutes. When the screen is refreshed, the system 10 updates Last Refresh field 143*b* and preferably displays the date and time. A debt or equity portfolio, the creation and modification of which are discussed in detail below, may be displayed by selecting the Debt Portfolio tab 144 or Equity Portfolio tab 145, respectively.

In a preferred embodiment, tabs 101–107 and 141–145 are present in every view to permit efficient navigation throughout the system 10. Of course, the window contents and toolbar options may be constantly modified by the user.

Selection of Markets tab 101 permits a user to view a comprehensive listing of options in a convenient drop-down menu or toolbar that is located on the left-hand side of Front Page 100, as shown in FIG. 3. A user can be linked directly to any of the toolbar options 111–15, 117–18, 120–23, and 125–32 to obtain market information by clicking on the desired option. An arrow will appear adjacent to the selected toolbar option so the user will know what screen the user is viewing at all times. In a preferred embodiment of the invention, toolbar options that are gray may not be selected until they become black or green. More information about the markets tab 101 information may be obtained by selecting help tab 105 or help toolbar option 131, which are discussed below.

The markets section provides easy access to current market information. Note that toolbar option Front Page 111 includes an arrow, which indicates that the screen is displaying the Front Page 100 under Markets heading 110. The Front Page 100 is a composite of information relating to the debt and equity markets. The other pages of this section are accessible by clicking one of the options in the toolbar displayed on the left side of FIG. 3.

In a preferred embodiment, up to five headlines 151 are displayed on Front Page 100; however, a greater or lesser number may be provided. By clicking on the news headline a pop-up box will appear on front page 100 containing the requested news article in full, a print button and stock tickers for related companies. In a preferred embodiment, the news items are displayed in real-time and are automatically scrolled downward as new articles are posted. The source of each article may preferably be displayed adjacent to the headline.

In a preferred embodiment, Treasury Benchmarks field 152, Financial Futures field 153, Benchmark Swap Spreads and Yields field 154, and Currencies field 155 may be displayed in real-time (though certain field updates may be delayed, for example, approximately 20 minutes) as depicted in FIG. 3. The financial futures information is provided as pricing for the two-year, five-year, ten-year, and 30 year futures traded on the Chicago Board of Trade. FIG. 3 also shows North American indices field 156 and World indices field 157 in real-time. This information preferably includes the total of the index and the change for the day. In one embodiment, positive changes in the numbers may be displayed in black, while negative changes may be indicated in red. Additionally, a user may click on "(more)" tab 160 to view more information relating to that particular database. The "(more)" tab is employed throughout the system 10 to indicate that more information may be viewed by clicking on the "(more)" tab.

Figure 4:
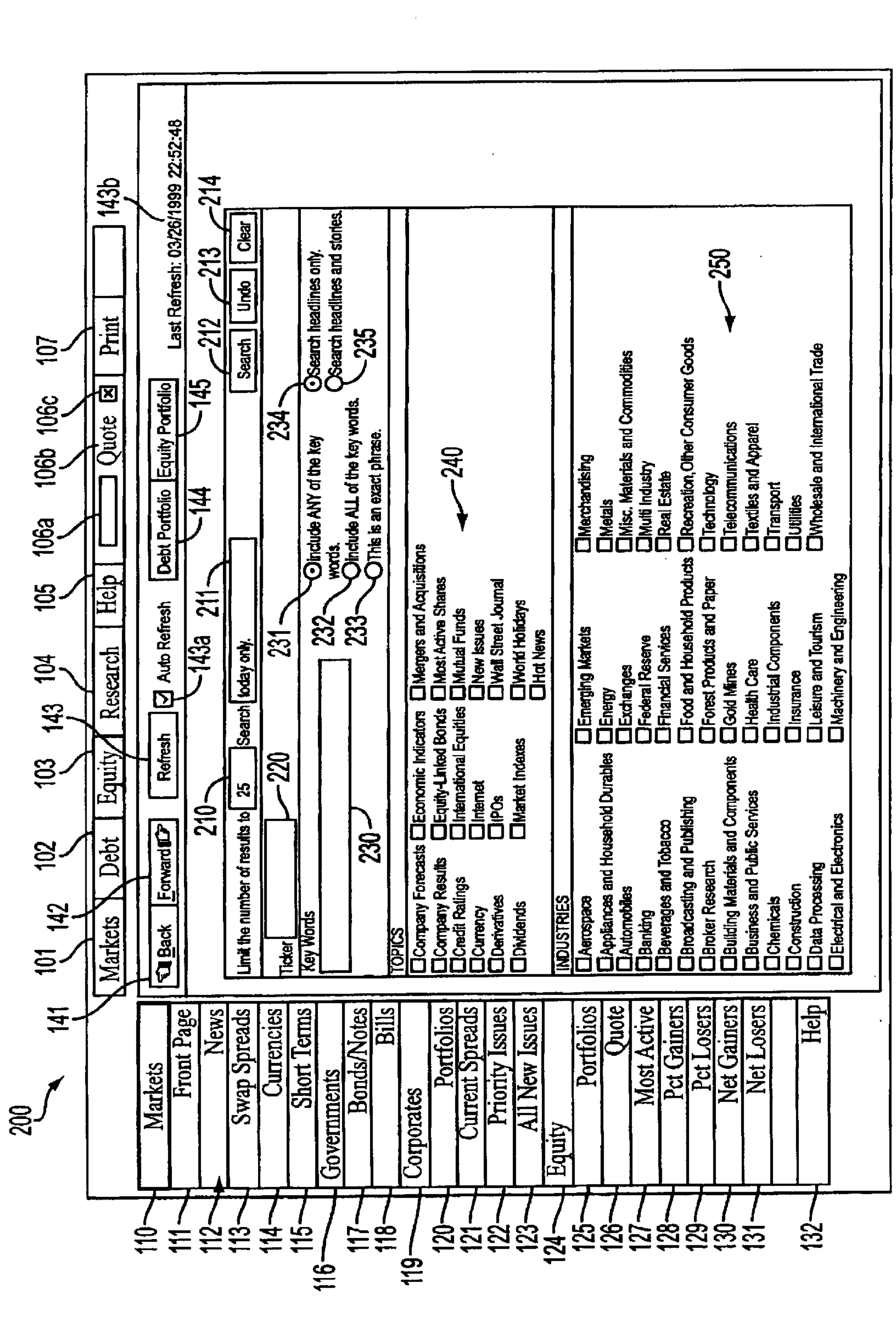
FIG. 4 illustrates a news page according to the principles of the invention.

News Page 200, when selected, provides a search engine for searching for news based on a user's specified criteria, as is shown in FIG. 4. The focus of the search is on worldwide company business news and is preferably real-time. This information can be obtained from Reuters and Dow Jones, for example. To initiate a news search a user may enter specific criteria and select the Search button 212 located at the top of News Page 200. The search provides a list of news headlines. A particular story may be retrieved by clicking on the headline associated with the story. A close button may be selected to return to the list of headlines.

In a preferred embodiment, the system 10 retrieves up to 25 headlines for the current day by setting Search Limit field 210 to 25 and Time Frame field 211 to the current day. The search may be expanded to retrieve 25, 50, 100, or 200 stories, by modifying Search Limit field 210, over a period of two days, seven days, fourteen days, 30 days, or six months, by modifying Time Frame field 211, using the provided pull-down menus.

The system 10 permits searching using ticker symbols, key words, topics and industries. A user may specify a company's stock ticker symbol in Ticker field 220 to search for news stories relating to the company. Key word searching by entering words in Word field 230 is also possible and may be focused through the utilization of the radio buttons 231–35 located to the right of the key word window in order to specify how the search is done for the entered key words. The radio buttons 231–35 permit searching for news stories having any entered key word, all entered key words, or an exact phrase, and the user may specify a headline search or a headline-plus-story search.

A user may also select from a list of Topics fields 240 which will limit the search to only identify stories related to the selected topics.

A user may further limit the inquiry by selecting one or more Industry fields 250 by clicking on the box to the left of the industry. Again, this will restrict the news search to only locate stories related to the selected industries.

Figure 5:
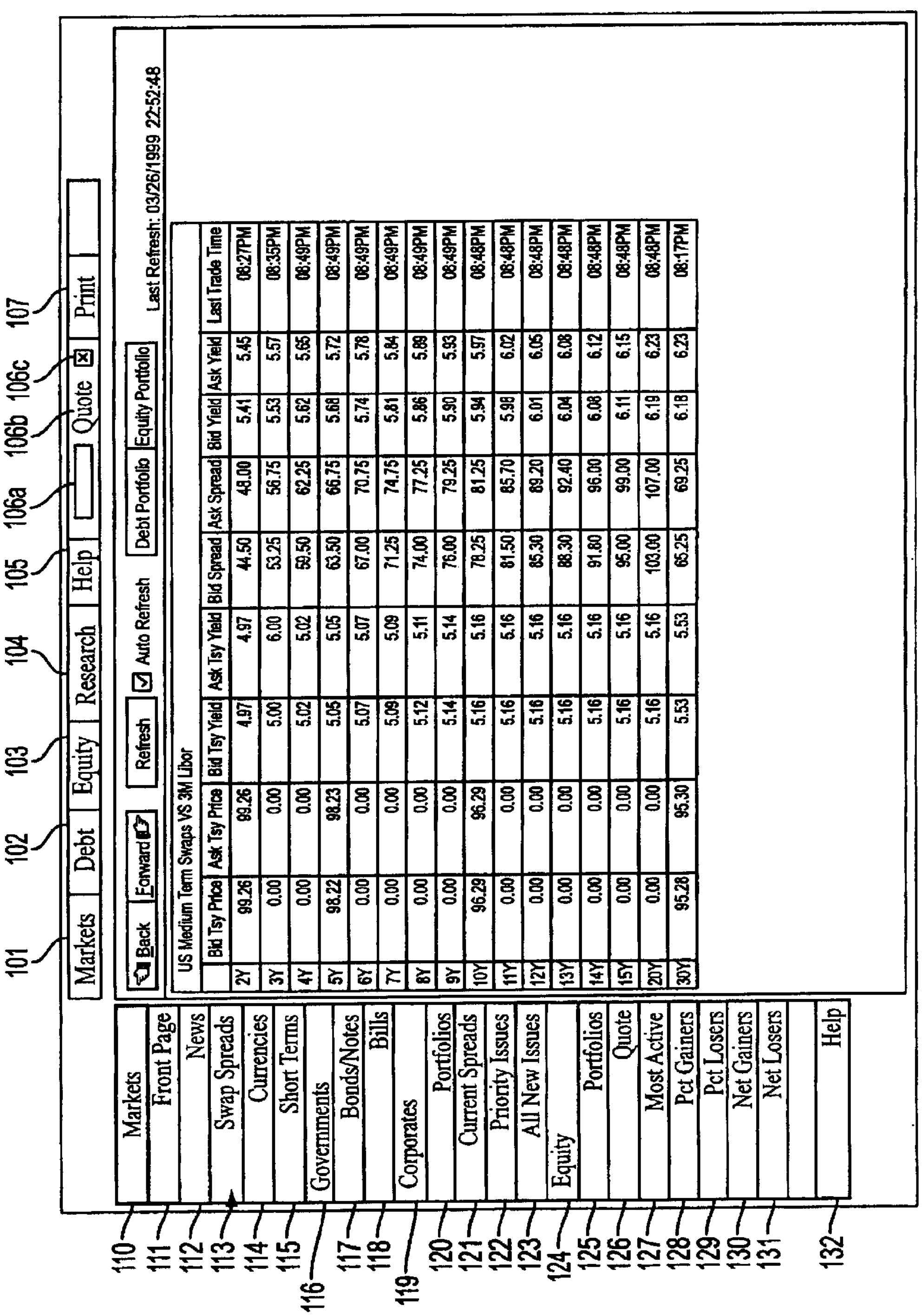
FIG. 5 illustrates a real-time display of U.S. medium term swaps vs. 3M LIBOR.
Figure 6:
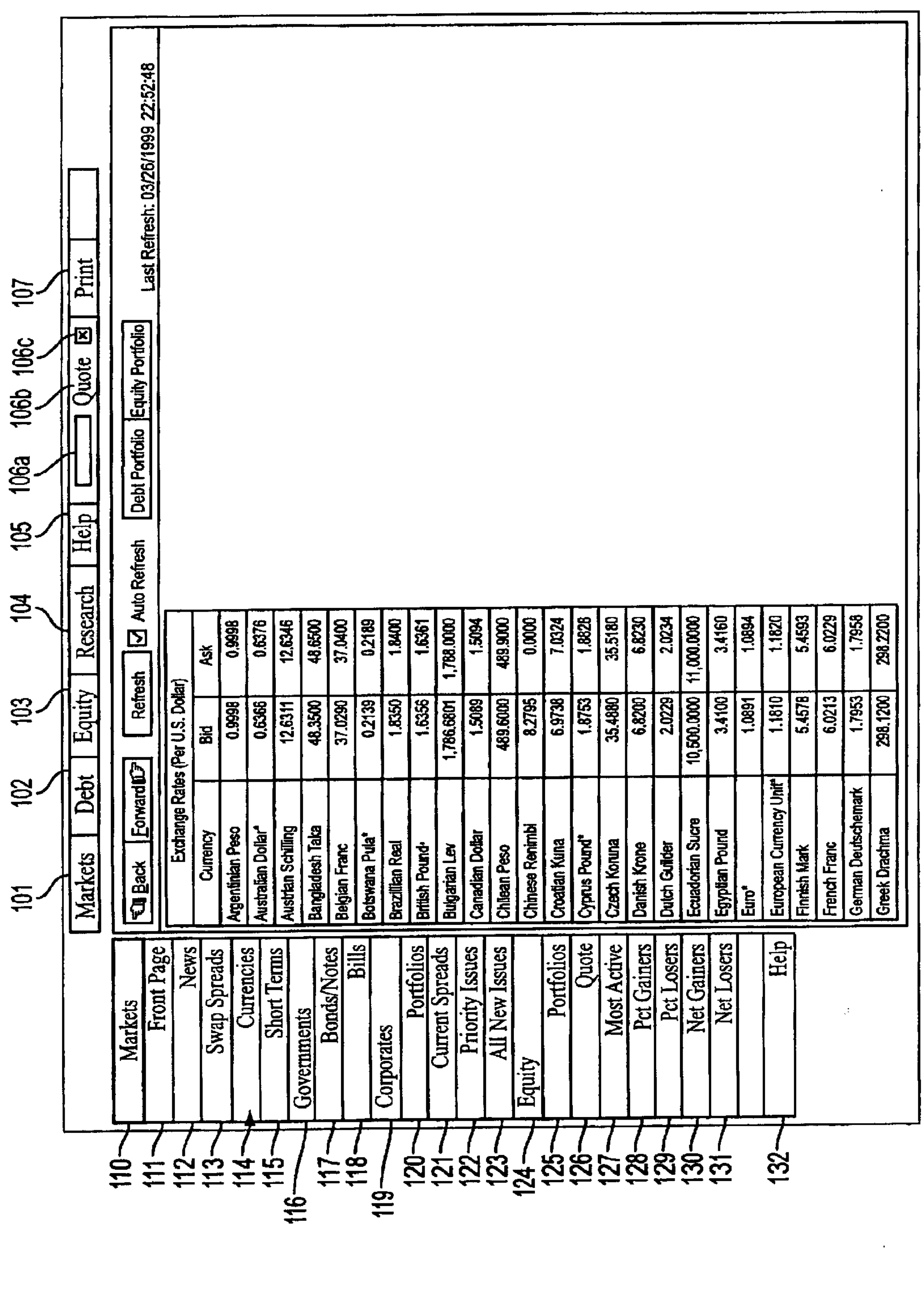
FIG. 6 illustrates a real-time display of available exchange rates based on the U.S. Dollar.

FIG. 5 displays the real-time U.S. Medium term Swaps vs. 3M LIBOR, which may be viewed by selecting toolbar option Swap Spreads 113. FIG. 6 displays a portion of the available real-time exchange rates based on the U.S. Dollar. This screen may be viewed by selecting toolbar option Currencies 114.

Figure 7:
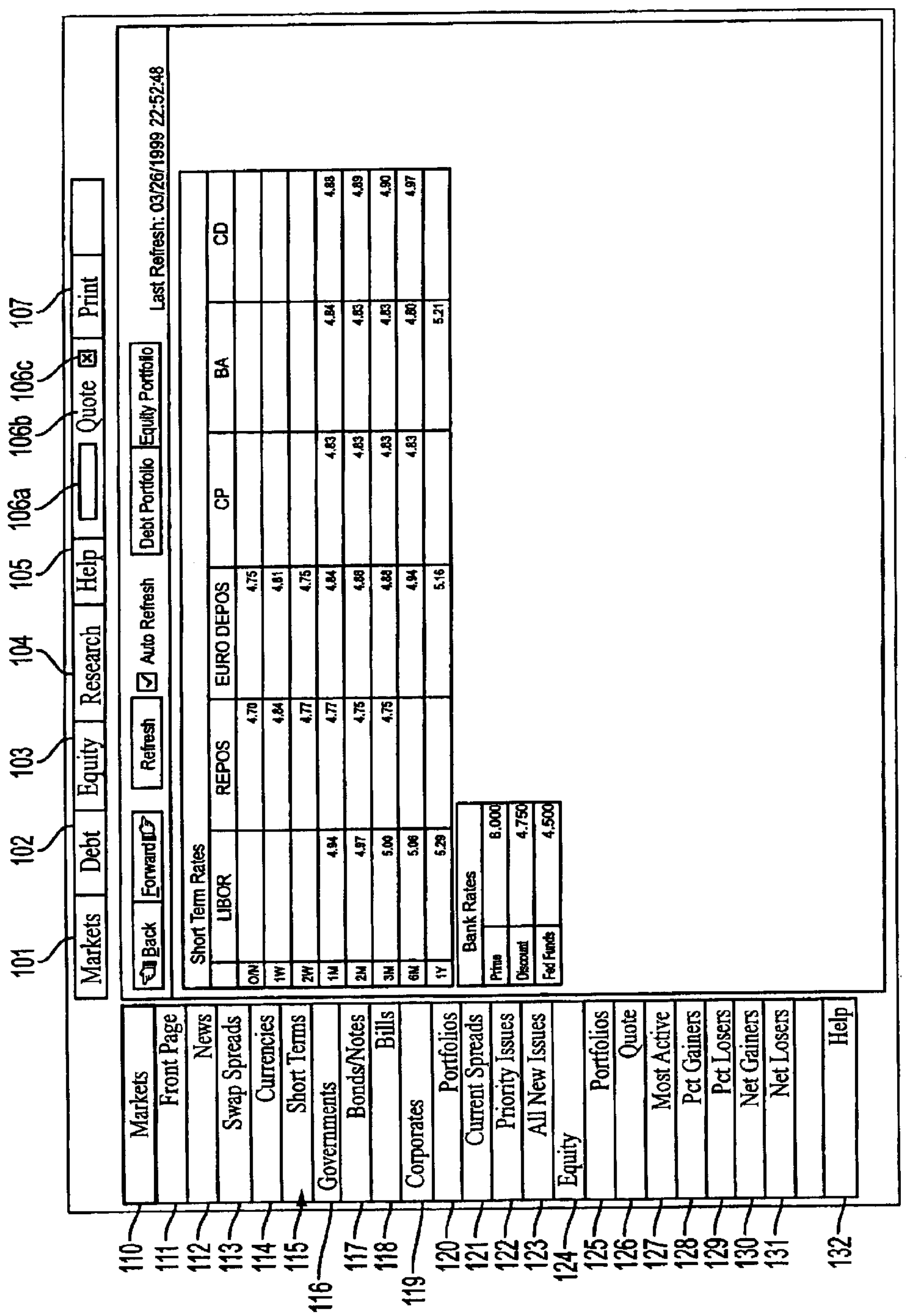
FIG. 7 illustrates a real-time display of money market rates of a cross-section of fund sources.

FIG. 7 displays real-time money market rates of a cross-section of fund sources, which may be viewed by selecting toolbar option Short Terms 115. The prime rate, discount rate and federal funds rate are located at the bottom of FIG. 7.

Figure 8:
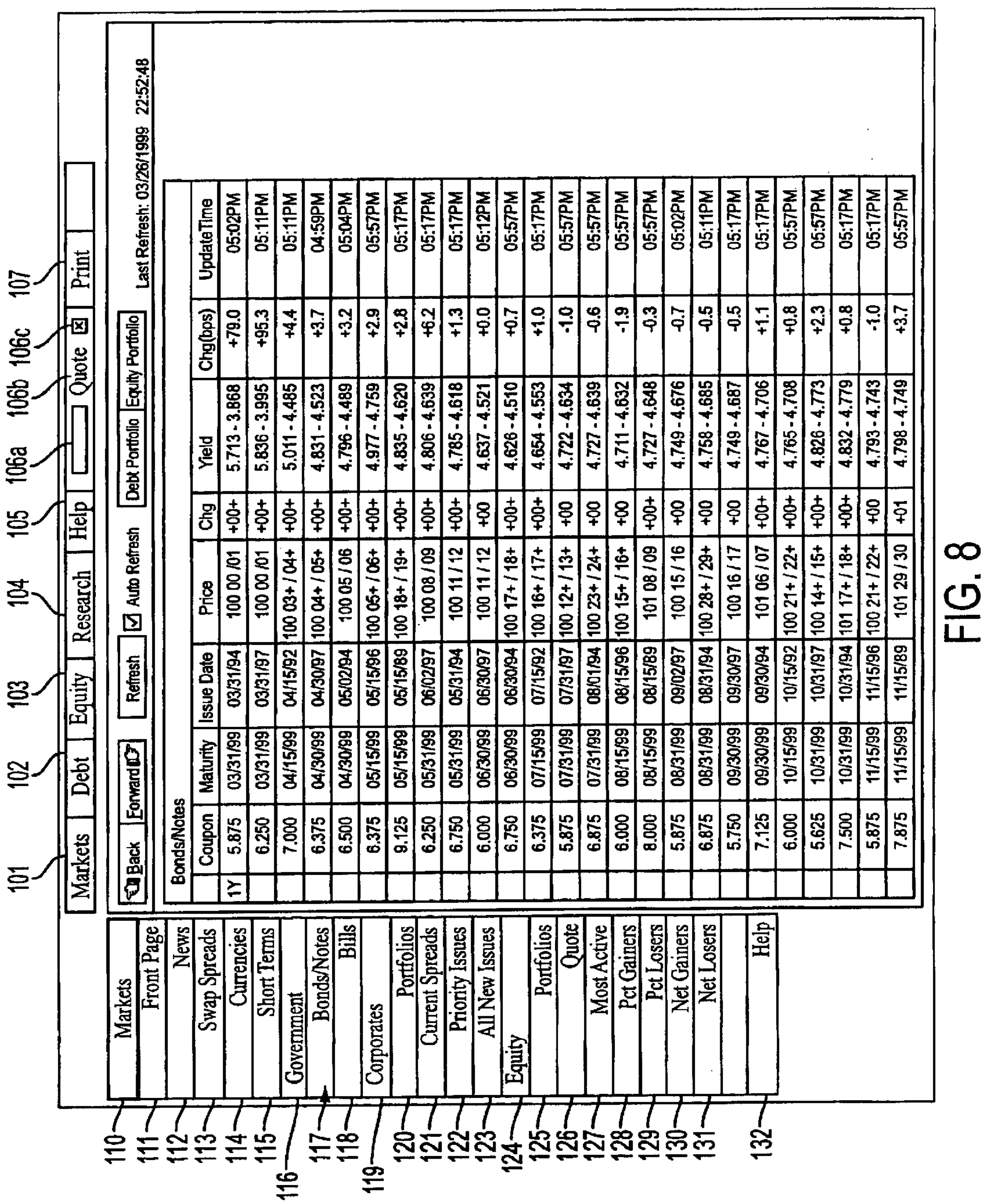
FIG. 8 illustrates a real-time display of pricing for Treasury Bonds and Notes.
Figure 9:
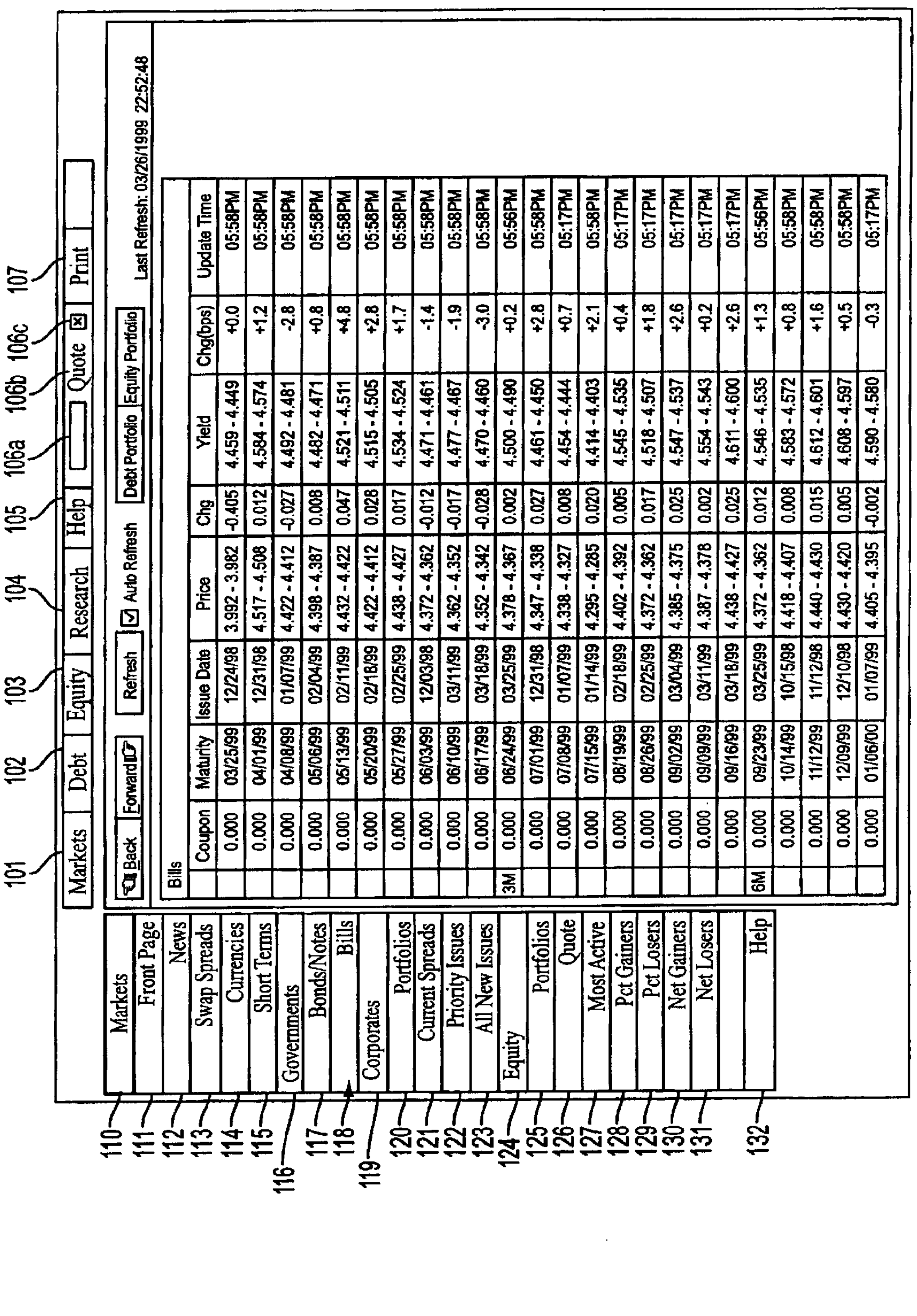
FIG. 9 illustrates a real-time display of pricing for Treasury Bills.

The Governments heading 116 includes information relating to government bonds, notes, and bills. FIG. 8 demonstrates typical government bonds and notes, which may be viewed by selecting toolbar option Bonds/Notes 117. Selecting this option provides real-time pricing for Treasury Bonds and Notes. Benchmarks are highlighted with bold typeface and a benchmark label in the left column. FIG. 9 demonstrates typical government T-bill information, which may be viewed by selecting toolbar option Bills 118. Selecting this option provides real-time pricing Treasury Bills. Benchmarks are highlighted with bold typeface and a benchmark label in the left column.

Figure 10:
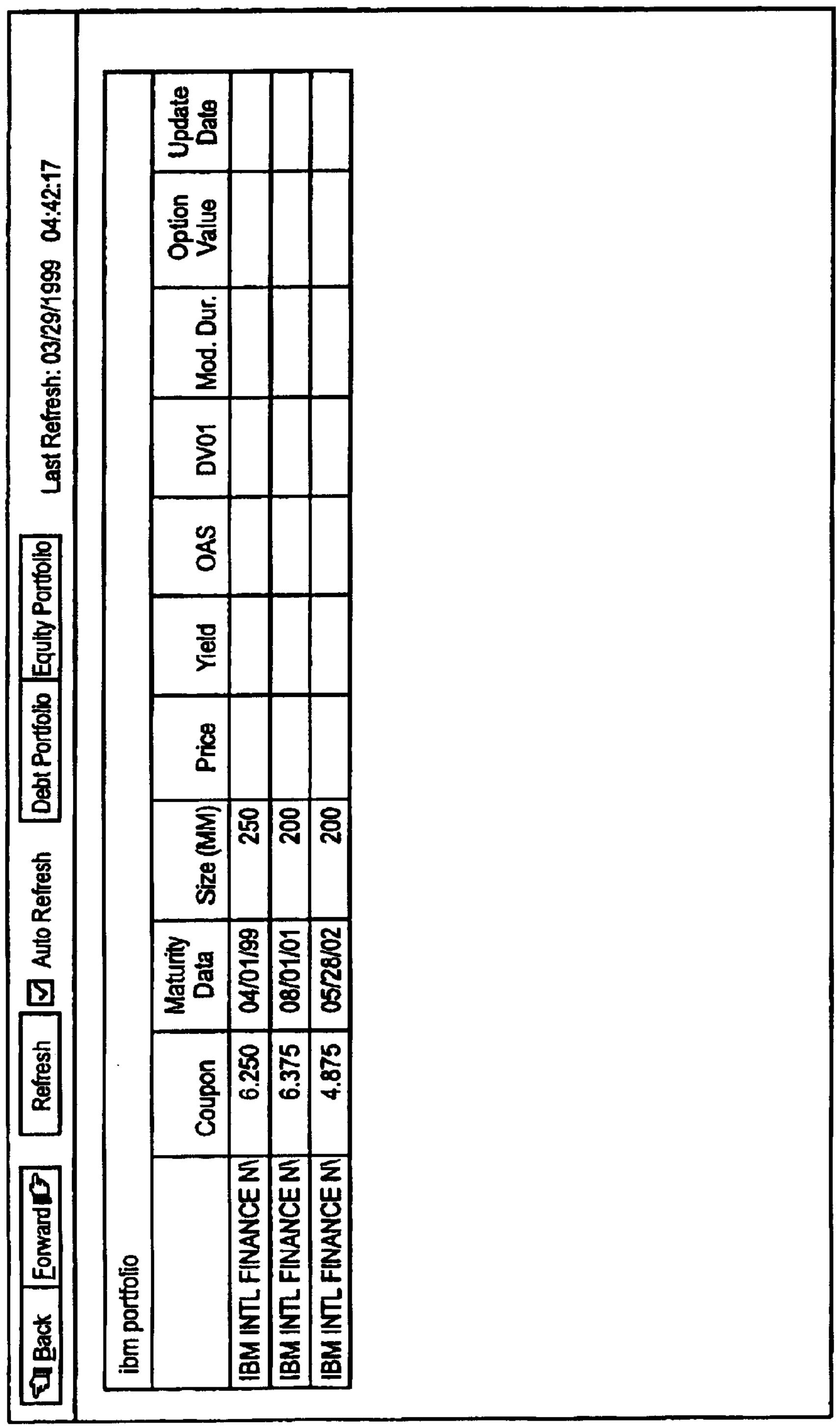
FIG. 10 illustrates a debt portfolio window according to the principles of the invention.

The Corporates heading 119 includes debt information relating to Portfolios, Current Spreads, Priority Issues, and All New Issues. Debt portfolios may be displayed by selecting toolbar option Portfolios 120 or Debt Portfolio 144. The portfolios may be displayed along with the last price for each individual bond in the portfolio. The portfolio window only is depicted in FIG. 10. If more than one debt portfolio has been saved on system 10, the desired portfolio may be selected from the debt portfolio box (not shown).

Figure 11:
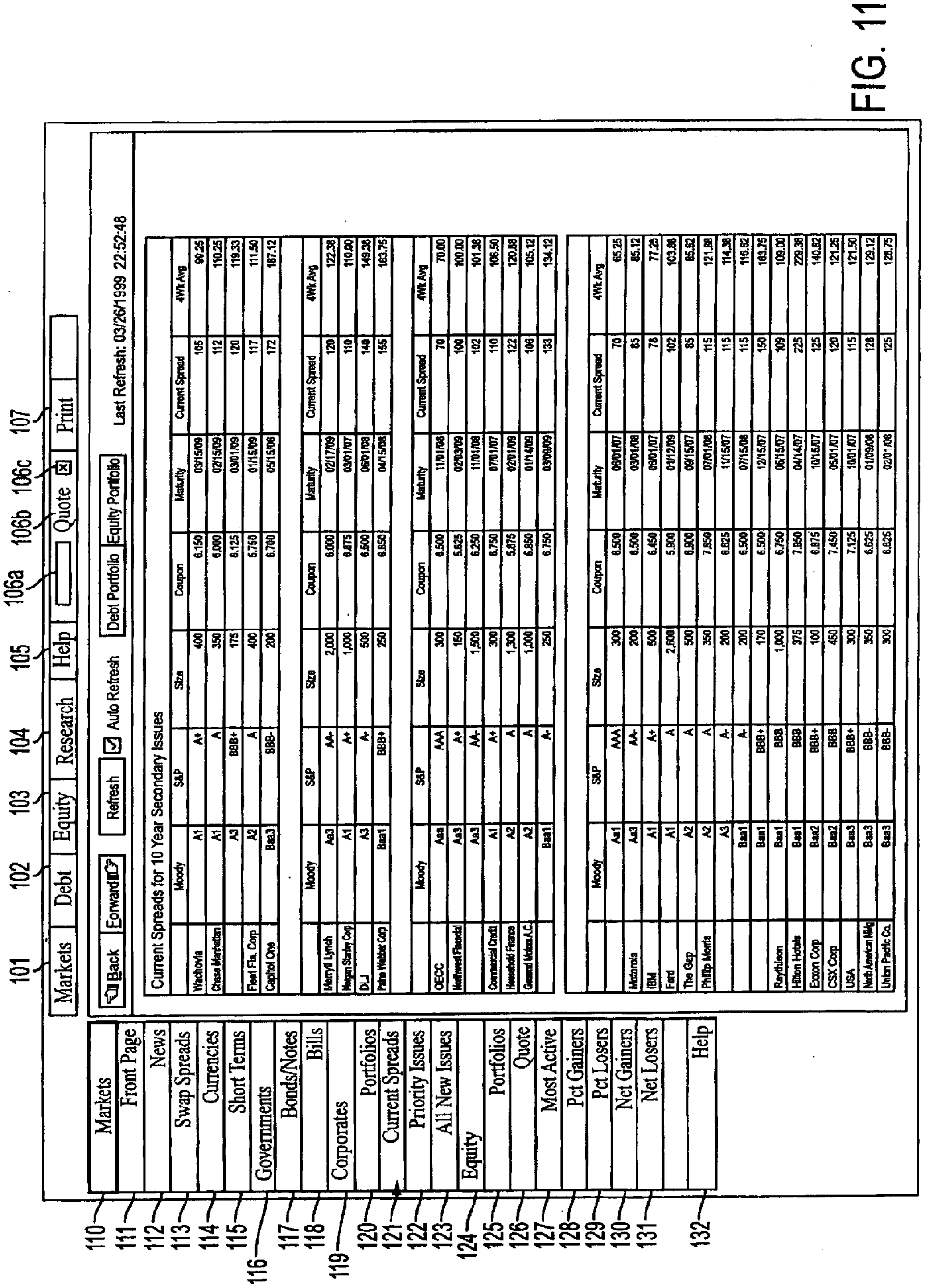
FIG. 11 illustrates indicative current spreads relating to a group of companies that represent various ratings within an industry sector according to the principles of the invention.

FIG. 11 shows indicative current spreads relating to a group of companies that represent various ratings within an industry sector. This information is displayed by selecting toolbar option Current Spreads 121. The spreads are generally updated several times per week. More detail on a particular company may be obtained by clicking on the company name.

Figure 12:
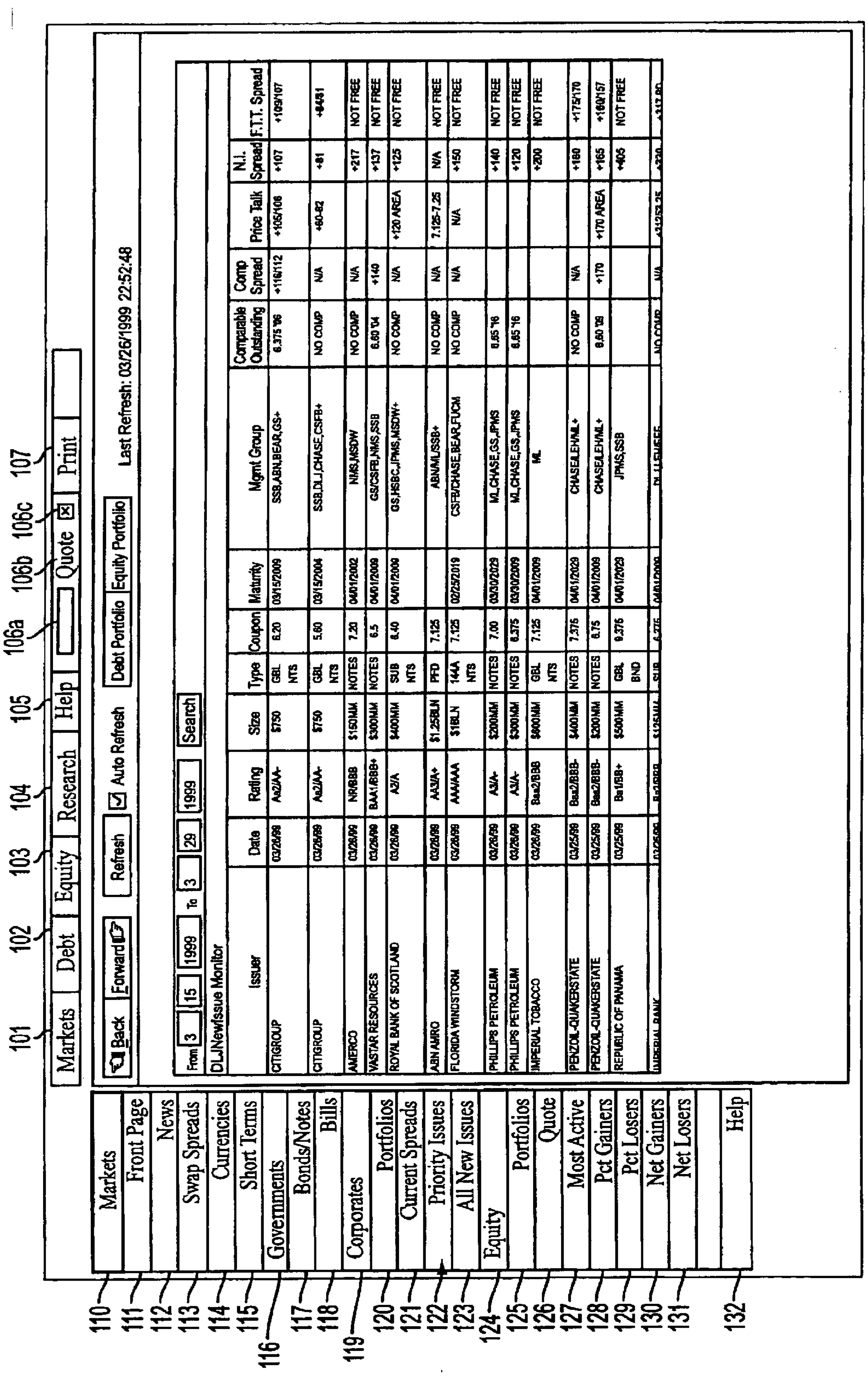
FIG. 12 illustrates information relating to new issues identified in the marketplace.

FIG. 12 displays information relating to new issues identified in the marketplace which may be viewed by selecting toolbar option Priority Issues 122. For example, the last 14 days of new issues are displayed. The last two columns are the New Issue Spread (N.I. Spread) and the Free To Trade Spread (F.T.T. Spread).

Figure 13:
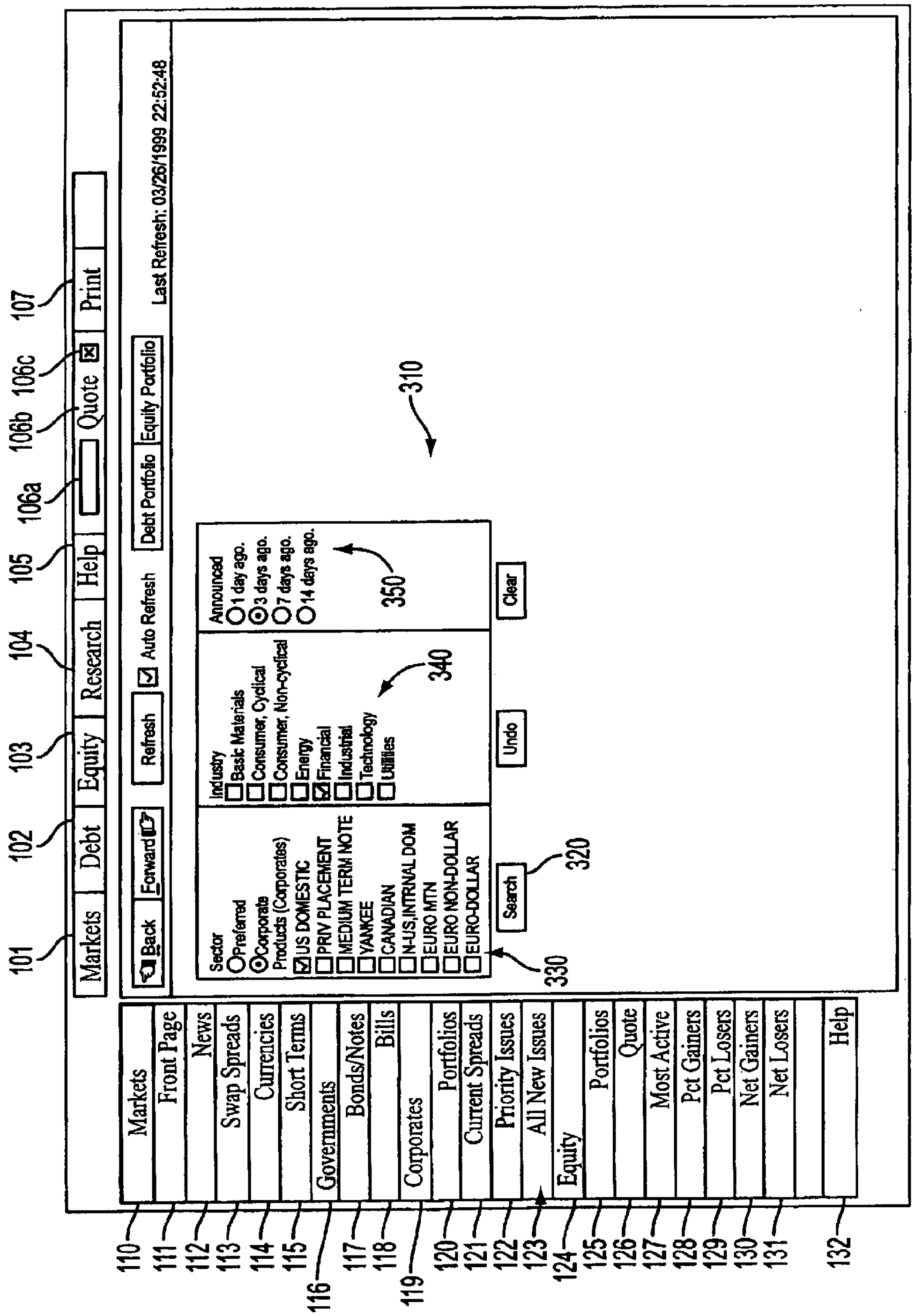
FIG. 13 illustrates a preferred manner in which a user may conduct a search of new issues.
Figure 14:
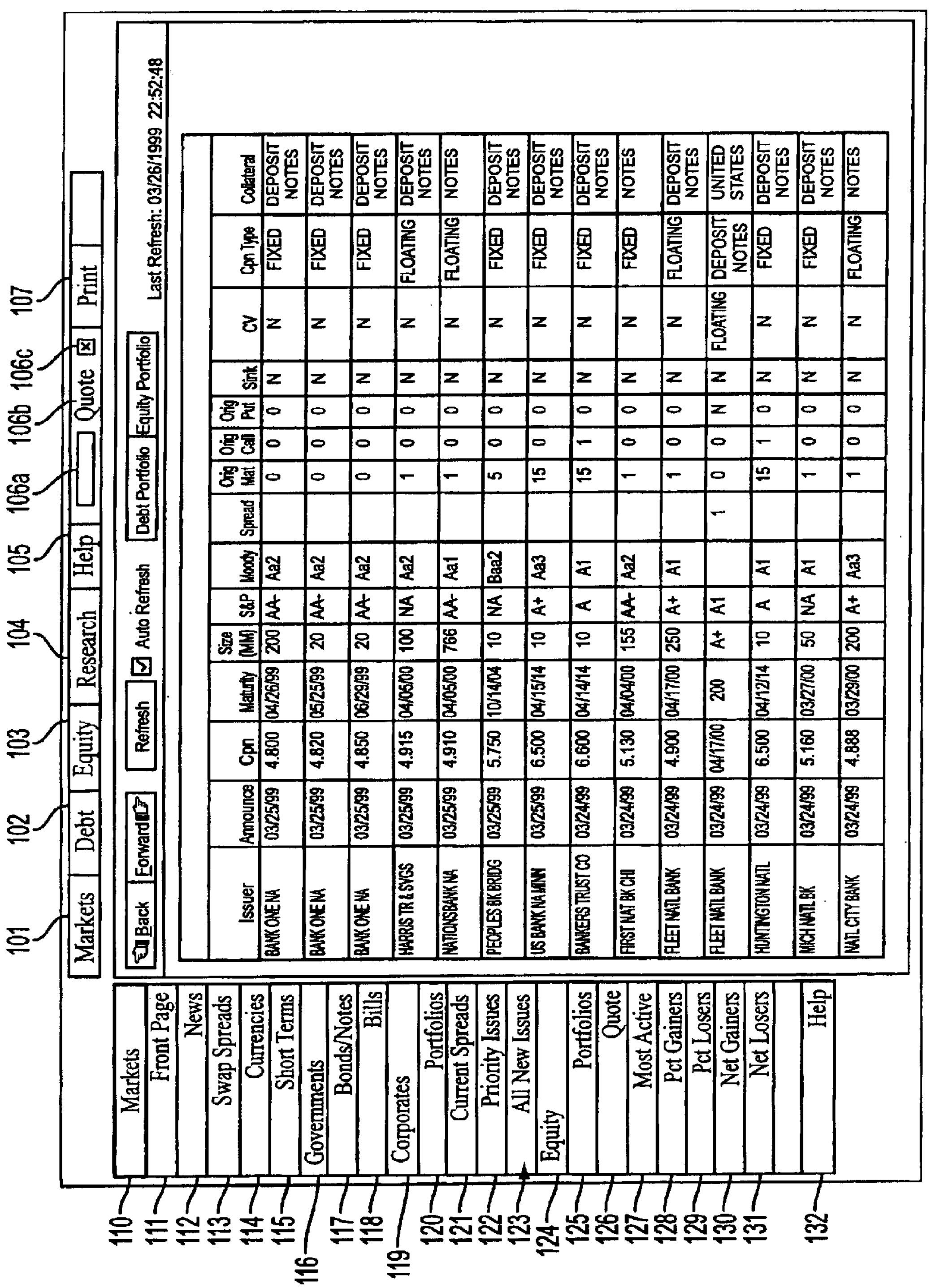
FIG. 14 illustrates the results of a search of new issues according to the principles of the invention.

Selection of toolbar option All New Issues 123 permits a user to view all new corporate and preferred debt securities issued throughout the world. Selection box 310, displayed in the center of FIG. 13 demonstrates a preferred manner in which a user may conduct a search of new issues. After selecting the Search button 320, the securities identified by the search are preferably displayed as shown in FIG. 14 with the search criteria (not shown) located at the bottom of the list of securities. The search criteria mechanism shown in FIG. 13 is generally self-explanatory. If Corporate is selected, then a user may refine the search criteria by selecting one or more of the listed products from Products field 330. The search may also be limited by selecting one or more of the industries from Industry field 340. Additionally, the search may be limited by timing of the announcement, such as one day ago, three days ago, seven days ago, fourteen days ago, by selecting the desired Timing field 350.

Figure 15:
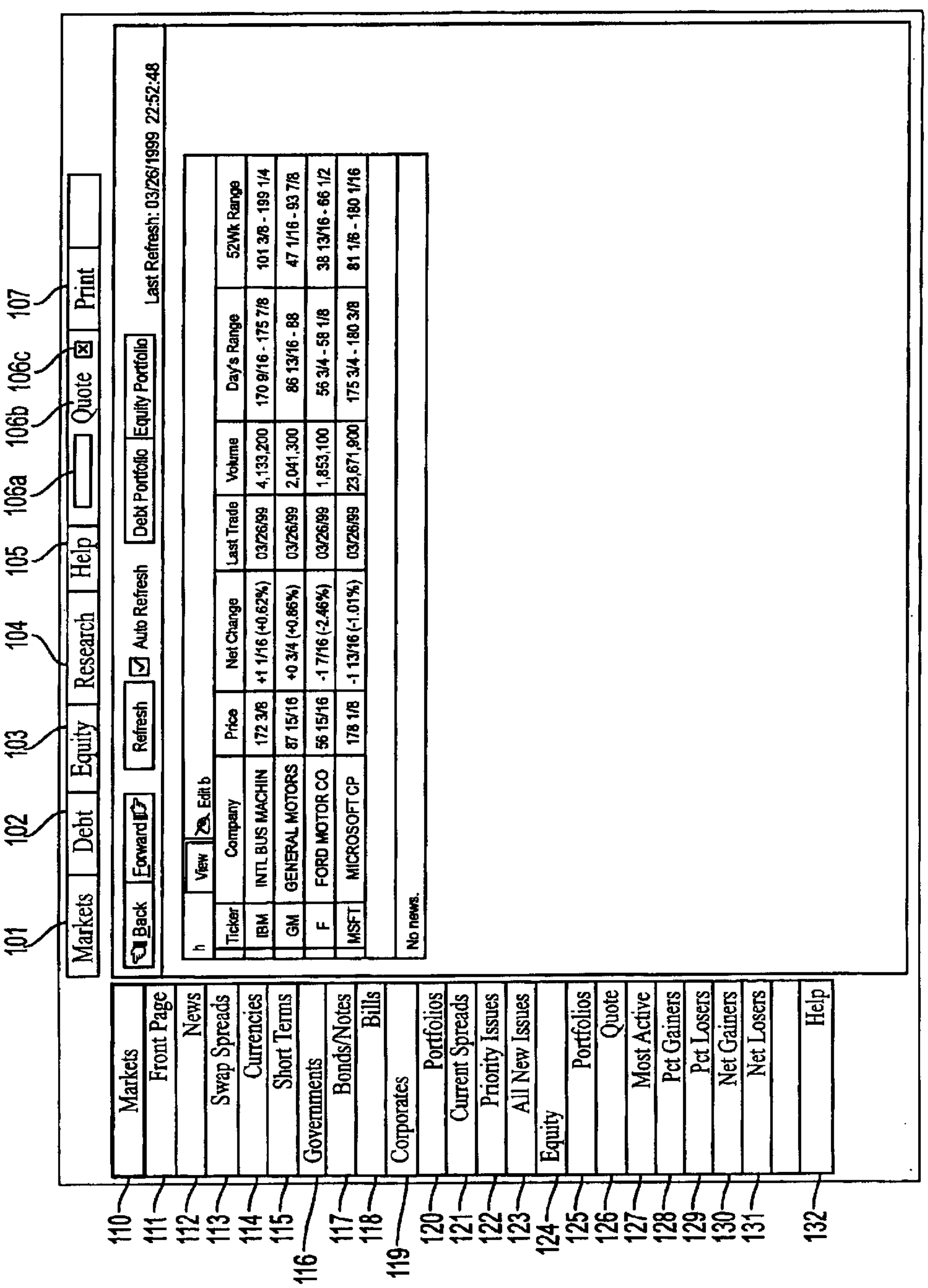
FIG. 15 illustrates an equity portfolio according to the principles of the invention.

The Equity heading 124 includes equity information relating to Portfolios, Quotes, Most Active, Pct Gainers, Pct Losers, Net Gainers, and Net Losers. Equity portfolios may be displayed by selecting toolbar option Portfolios 125 or Equity Portfolio 145. The portfolios may be displayed along with the current price and volume for each individual ticker in the portfolio as is shown in FIG. 15. Clicking on a specific ticker provides greater detailed information about that ticker. In a preferred embodiment, the headlines of news stories relevant to the selected companies are displayed in conjunction with the stock information. A particular news story may be viewed by clicking on its associated headline.

Toolbar option Quote 126 displays a real-time stock quote in a manner similar to that provided by Quote tab 106*b*, discussed above.

The top ten issues for each exchange, including NYSE, NASDAQ, AMEX, and OTC:BB, having the largest volume of shares traded for the day may be viewed by selecting toolbar option Most Active 127. A portion of the window is shown in FIG. 16.

The top ten issues for each exchange having the largest percentage gains for the day may be viewed by selecting toolbar option Pct Gainers 128. A portion of the window is shown in FIG. 17.

The top ten issues for each exchange having the largest percentage losses for the day may be viewed by selecting toolbar option Pct Losers 129. A portion of the window is shown in FIG. 18.

The top ten issues for each exchange having the largest net gains for the day may be viewed by selecting toolbar option Net Gainers 130. A portion of the window is shown in FIG. 19.

The top ten issues for each exchange having the largest net losses for the day may be viewed by selecting toolbar option Net Losers 131. A portion of the window is shown in FIG. 20.

The information is somewhat delayed by each exchange. Additional issues from a particular exchange may be viewed by selecting the (more) button 160.

Selecting toolbar option Help 132 provides the user with guidance in operating the system.

Selection of Debt tab 102 allows a user to view options for debt analysis and searching on Debt Page 400. In a preferred embodiment, Debt Page 400 facilitates analysis of Portfolios, Debt Refinancing, option adjusted spread ("OAS"), Hedging, and Yield Curve Analysis. More information about Debt Page 400 information may be obtained by selecting Help tab 105 or toolbar option Help 132.

Figure 21:
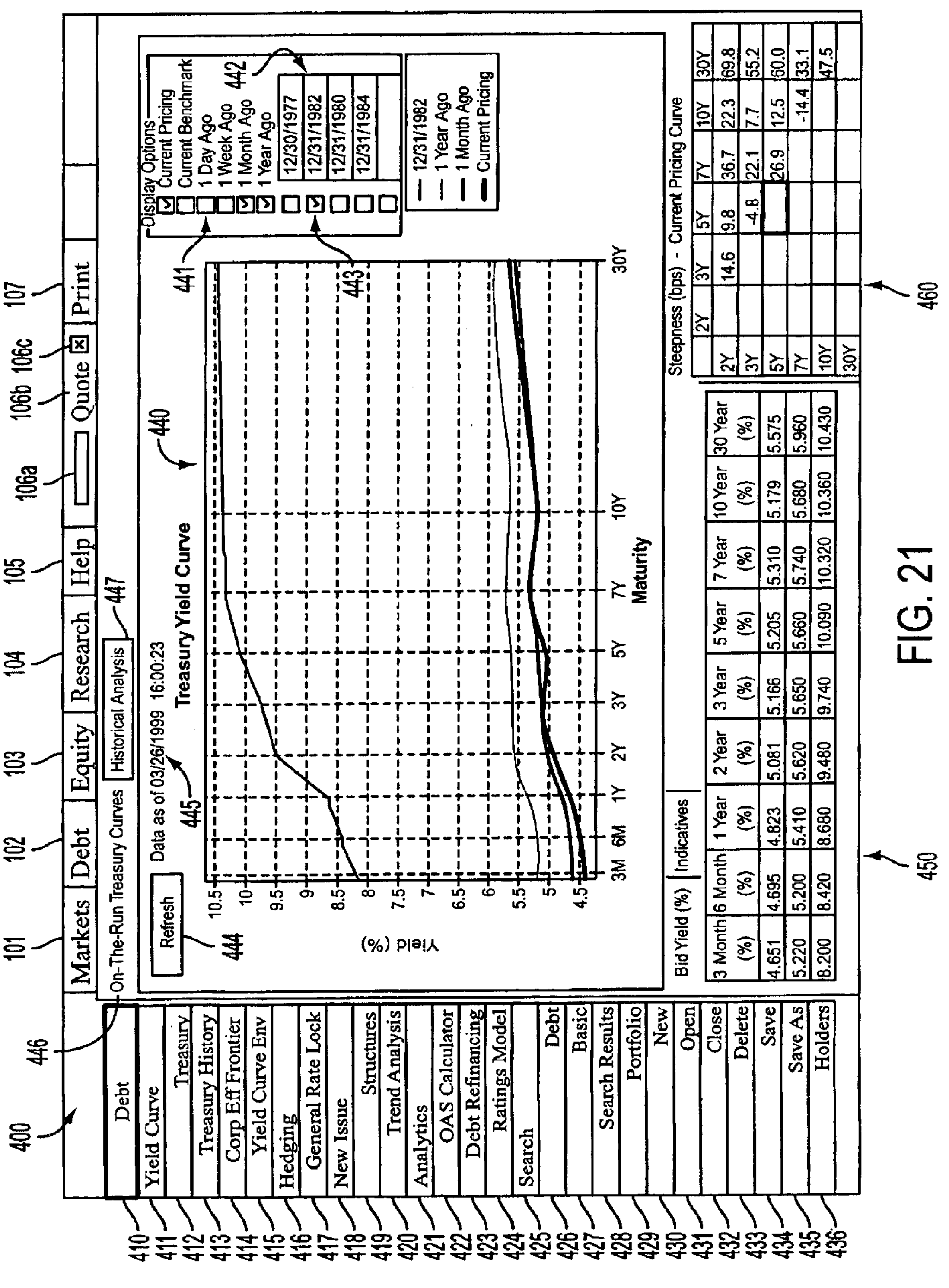
FIG. 21 illustrates a suitable debt page according to the principles of the invention.

Debt Page 400 provides a menu of options as shown in FIG. 21. Specifically, toolbar options 412–15, 417, 419–20, 422–24, and 426–36 include the analytics and search functions relating to debt. In a preferred embodiment, when debt is initially selected, a Yield Curve window 440 appears. However, another preferred chart or graph may be viewed by selecting another option from the toolbar options. As with Front Page 100, an arrow appears adjacent to the selected toolbar option that allows the user to keep track of the selected screen. In FIG. 21, the arrow is located on toolbar option Treasury 412.

Under the Debt heading 410, six main topics are listed: Yield Curve 411, Hedging 416, New Issue 418, Analytics 421, Search 425, and toolbar option Portfolio 429. Under each main topic a series of sub-topics or toolbar options are listed that when selected connect a user directly to the selected screen. Grayed items located in the menu may not be used until they become black or green. The grayed items related to the topics that are being viewed, but are not active at the time.

A yield curve is a fundamental financial tool. When making decisions about debt issuance and refunding, a user may refer to the yield curve to view a detailed picture of both the interest rate environment and the corporate credit spread environment. The yield curve may also be used as a powerful tool in refinancing analysis. A user must understand how to view the points along the yield curve and how to interpret the "shape" of the yield curve.

The construction of a yield curve is relatively straight forward. When creating the yield curve, the system 10 selects Treasury securities having three-month, six-month, one-year, two- year, three-year, five-year, seven-year, ten-year, and 30-year maturities and, for each security, plots the time to maturity (x-axis) against the percent value of the yield (y-axis). Hence, a user may refer to the system-provided yield curve to find the yield of any of the above-listed securities. For example, if a user would like to find the yield of a five-year Treasury bond, then the user should identify the point along the yield curve that has an x-axis value of 5Y, and find the corresponding value along the y-axis. This y-axis value represents the percent value of the yield.

The yield curve is not a continuous curve since every point along the curve does not represent the true maturity/yield relationship. This is because the system plots the values for the above-listed securities and forms the curve by connecting the discrete data by a series of line segments. Therefore, the system plots only those data that correspond to the above-listed securities. The other points on the curve that lie on the line segments do not represent true values. For example, the system does not plot the datum representing the four-year security as the four-year security is an interpolation between the three- and five-year security yields.

The above-listed securities are known as the "On-The-Run" treasury securities. The data that correspond to these securities determine the basic shape of what is known as the On-The- Run Treasury Yield Curve or O-T-R Treasury Yield Curve.

The shape of the yield curve represents the change in yield from one point along the yield curve to another point on the same curve. Although one cannot view the curve to determine the percent yield of each security along the x-axis, one can view the overall shape of the yield curve to get a sense of the basic yield curve environment.

Several theories attempt to explain the basic shape of the yield curve. For example, the following two theories attempt to explain the positive, upward slope of the yield curve. Note that these theories are not mutually exclusive.

According to the Liquidity Preference Theory, market participants prefer to purchase shorter-term, more liquid, and less interest-rate-sensitive instruments that are on the shorter end of the maturity spectrum. The fact that market participants prefer shorter-term securities results in a greater demand for these securities. This increased demand serves to lower the yields of the shorter-term securities relative to the yields of the longer-term securities. Because the shorter-term securities have lower yields than the longer-term securities, the yield curve has a positive, i.e., upward, slope.

According to the Market Segmentation Hypothesis, different market participants (e.g., banks, mortgage companies, corporate treasury departments) tend to purchase securities that have certain maturities. The nature of the participant's business determines which securities the firm tends to purchase. For example, many corporate treasury departments tend to invest money in shorter-term instruments so that cash can be more readily available for accounts payable, payroll, debt services, or other unexpected expenses. Because fixed-income purchasers tend to invest in shorter-term maturities, the demand for shorter-term securities is higher than that for longer-term securities. This increased demand serves to lower the yields on the shorter-term securities. Because the shorter-term securities have lower yields than the longer-term securities, the yield curve has a positive, i.e., upward, slope.

Although the Liquidity Preference Theory and the Market Segmentation Hypothesis may have intuitive appeal, one cannot easily quantify their effects upon the yield curve. Most market professionals rely upon the Expectations Hypothesis.

According to the Expectations Hypothesis, the yield from any given maturity can be "built" or "bootstrapped" from a current short-term yield and a forward yield. The forward yield is the mathematically projected value of the yield at some future date. For example, a two-year yield can be thought of as a combination of the current one-year yield and the one-year forward rate, which is the one-year rate that market participants expect will "exist" one year from the current time.

If the investment horizon is two years, the borrower may issue a two-year note. Alternatively, the borrower may issue two securities: a one-year security at the current one-year rate and, at the end of the first year, another one-year security at the then-prevailing rate. For example if the current two-year yield is 6.0% and the current one-year yield is 5.5%, an issuer (1) can issue a two-year note at 6.0% or (2) issue two successive one-year notes. With the one-year rate at 5.5%, a forward yield of approximately 6.5% makes the second option mathematically equivalent to the first option. If the rate at the end of the first year is less than 6.5%, then the second option is more advantageous. On the other hand, if the rate is greater than 6.5%, then a two-year note would have been the better economic option.

An issuer can look at the yield curve to determine the cost of "going out along the curve" to issue a longer-term security. For example, a borrower may consider issuing a five-year rather than a three-year security. The issuer can refer to the yield curve to determine the cost of the longer maturity. If the three-year security has a yield of 6.0% and the five-year security has a yield of 6.5%, then the borrower must pay 0.5% (50 basis points) for locking in a longer-term financing rate.

The steepness of the yield curve may be viewed to assess trade-offs between yields as maturity increases. For example, an issuer seeking funding in the three- to five-year maturity range would view the steepness in this section of the curve. If the curve is flat or possibly sloping downward, increasing maturity (duration) of debt may have little negative increase in the cost of funds; however, a steep upwardly sloping curve implies a large increase in the cost of funds in order to achieve an increase in maturity (or duration) of debt.

The steepness of the historical yield curve can be computed for up to five dates in the past using the system 10. This function may be used to compare the current incremental cost of funds for increasing maturity to the incremental cost in the past. If the incremental cost of funds is small compared to the historical costs, an issuer might consider issuing longer maturity debt to take advantage of the relative flatness in the yield curve.

The Treasury Yield Curve may be displayed by selecting toolbar option Treasury 412. In a preferred embodiment, a current yield curve will be automatically displayed. To select another curve, choose one of the following options in the Treasury field 441:

Current (default)
1 Day Ago
1 Week Ago
1 Month Ago
1 Year Ago
Specific Date

A specific date may be selected by first entering the date (mm/dd/yy) in the Date field 442, and then checking the specific Date Display Option field 443.

The current yield curve may be refreshed by clicking the Refresh tab 444. The date and time of the most recent update are preferably displayed on the screen in Last Refresh field 445.

Figure 22:
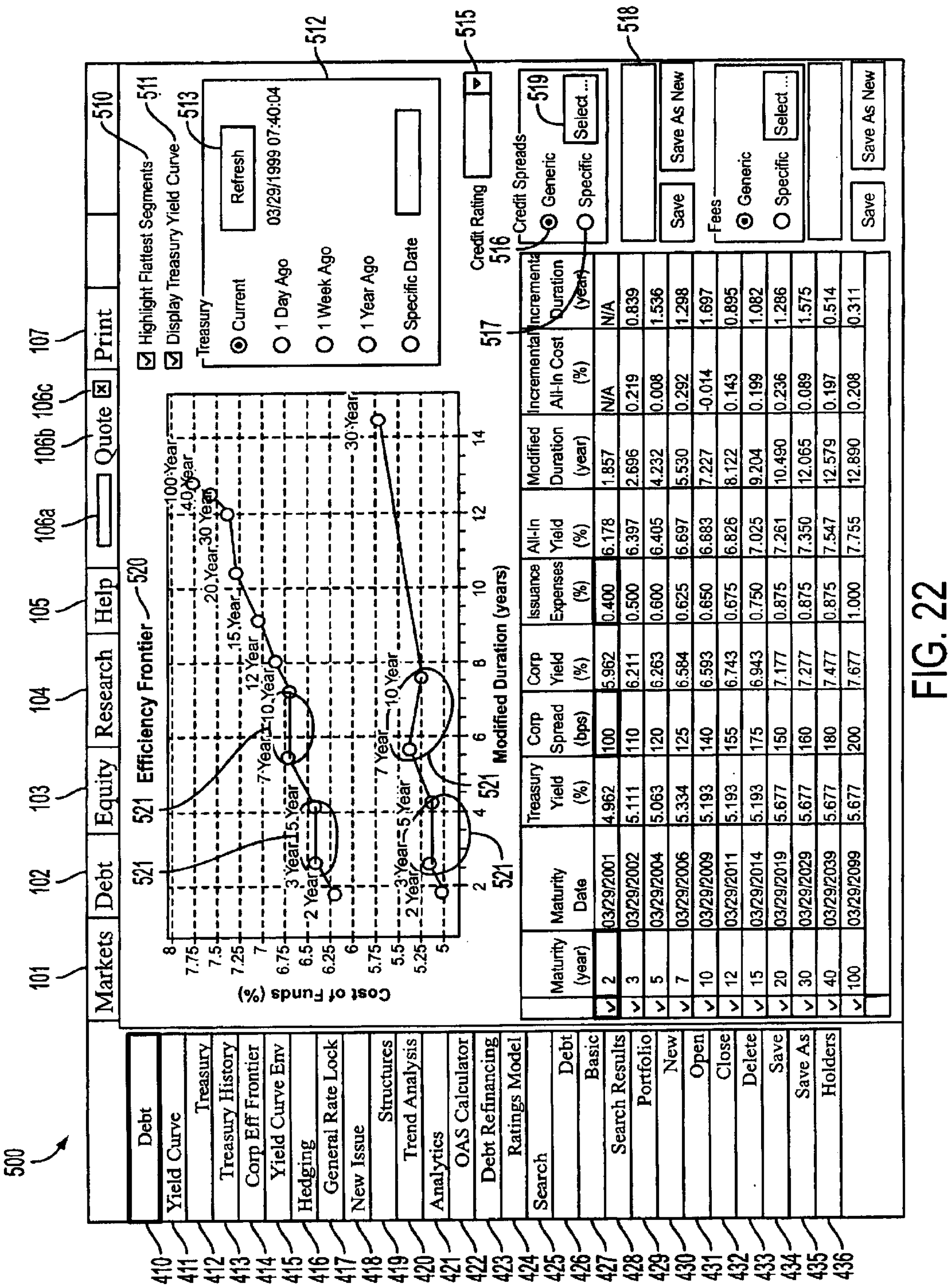
FIG. 22 illustrates a corporate efficiency frontier page according to the principles of the invention.

The flattest segments of each curve may be highlighted by selecting the Highlight Flattest Segments field 510, which is demonstrated in FIG. 22. The flattest segments are those that have the smallest change in y-value or, in other words, the smallest change in the percentage value of the cost of funds. In a preferred embodiment, the flattest segments 521 are indicated by displaying the line segments in a color that is distinct from the color employed for the other line segments. A segment of the curve may be magnified by employing the user's mouse pointer by (1) positioning the mouse pointer to the left and to the top of the segment, (2) holding down the left mouse button, and (3) dragging the pointer down and to the right. The box appears as the mouse is dragged. Then the user releases the mouse button and an enlarged curve is shown. To return to the full view of the curve, the mouse pointer is positioned anywhere on the graph, the left mouse button is held down, the mouse is dragged to the left and up, and the mouse button is released. A user may display the y-axis data on the curve by placing the mouse pointer on the curve and clicking either the left or right mouse buttons.

To view the data in tabular form, the user may refer to the Bid Yield (%) table 450 at the bottom of Debt Page 400. Note that, in a preferred embodiment, the information for each curve appears in a separate row in the table.

The system 10 automatically calculates the steepness of the yield curve from point A to point B along the x-axis and displays the data in a Steepness table 460 at the bottom of Debt Page 400.

The system 10 computes the amount of time that a yield for O-T-R maturities have been below yields in the past. This function allows the user to assess whether or not current yields are at high, low, or average levels compared to the recent past. If, for example, yields in certain maturities are at or near historical lows, an issuer might choose to issue a security having these maturities in order to reap the benefits of advantageous current costs of funds. By selecting the Historic Analysis tab 447, the results of an historical analysis of the following Treasury securities is displayed:

3 Year
5 Year
10 Year
30 Year

For each security and for each of the following time periods, the system 10 calculates the percentage of time during which the benchmark treasury yield was at or below the current bid side yield of the benchmark reference treasury that is used for the pricing and hedging of corporate bonds.

Time Periods

Last Year
Last 3 Years
Last 5 Years
Last 10 Years
Last 20 Years

The Corporate Efficiency Frontier is the curve plotted from all available bonds in the marketplace which have the lowest modified duration of each value of the cost of funds. For example, all corporate bonds with a cost of funds of 7% are found (the Investor Search function could be used), and the corporate bond with the lowest modified duration is selected. This bond's cost of funds (7%) and its modified duration are plotted on the Efficiency Frontier. The above procedure is repeated for a large range of cost of funds, and a curve emerges. Any point along this curve is considered efficient, because no other bond possesses a lower cost of funds (y-axis) for any value of modified duration (x-axis). Alternatively stated, no other bond possesses a lower modified duration (x-axis) for any value of cost of funds (y-axis).

Corporate Efficiency Frontier Page 500 is displayed in FIG. 22 and may be viewed by selecting toolbar option Corp Eff Frontier 414. The Efficiency Frontier Page 500 contains three panels of information. Graph 520 of the efficiency frontier for a selected portfolio is disposed at the top of Page 500. A user may access the OAS Analysis for any point on the graph by placing the user's mouse pointer on one of the marked data and clicking the right mouse button.

The table, below the graph 520, contains the following information for each Treasury security:

Maturity (year)
Maturity Date
Treasury Yield (%)
Corp. Spread (bps)
Corp. Yield(%)
Issuance Expenses (bps)
All-in Yield (%)
Modified Duration (year)
Increment All-in Cost (%)
Increment Duration (year)
Increment Cost vs. Duration Highlight flattest Segments field 510 and Display Treasury Yield Curve field 511 are located to the right of graph 520. The efficiency frontier curve and the Treasury curve may be plotted at various times including current, one day ago, one week ago, one year ago, and a specific date. The timing is determined by the user's input in Time fields 512. A Refresh button 513 and Last Refresh Field 514 are displayed next to the Time fields 512.

A user may interactively manipulate the cost-of-funds curve based on various inputs. Credit Rating field 515 includes the following options: AGNCY, AAA, AA, A, BBB, BB, B, CCC, any of which may be selected from the preferably provided dropdown list.

Credit spreads may be selected by choosing either Generic field 516 or Specific field 517. Note that the system defaults to Generic field 516. A user may or may not be able to enter specific credit spreads depending upon the user's profile. A specific credit spread may be created by typing the name of the Credit Spread Environment in Credit Spread field 518, or by clicking the Select button 519 to access the Environment Selection screen and then clicking on the desired credit spread environment. A user may also modify a specific corporate spread value by placing the mouse pointer in an appropriate cell, left-clicking, typing the correct value (in basis points), and pressing <Enter>. The system 10 automatically recalculates the values and updates the efficiency frontier curve. Fees, located below credit spreads, are employed in analogous fashion by system 10.

Corporate spreads may widen (increase) or narrow (decrease) for variety of reasons. For example, an economic recession may cause low-rated companies to default on debt at a higher rate than during an economic expansion. This often results from lower revenues coupled with typically higher debt burden. A user may wish to analyze a security or a portfolio using a yield curve environment where corporate spreads have widened.

Figure 23:
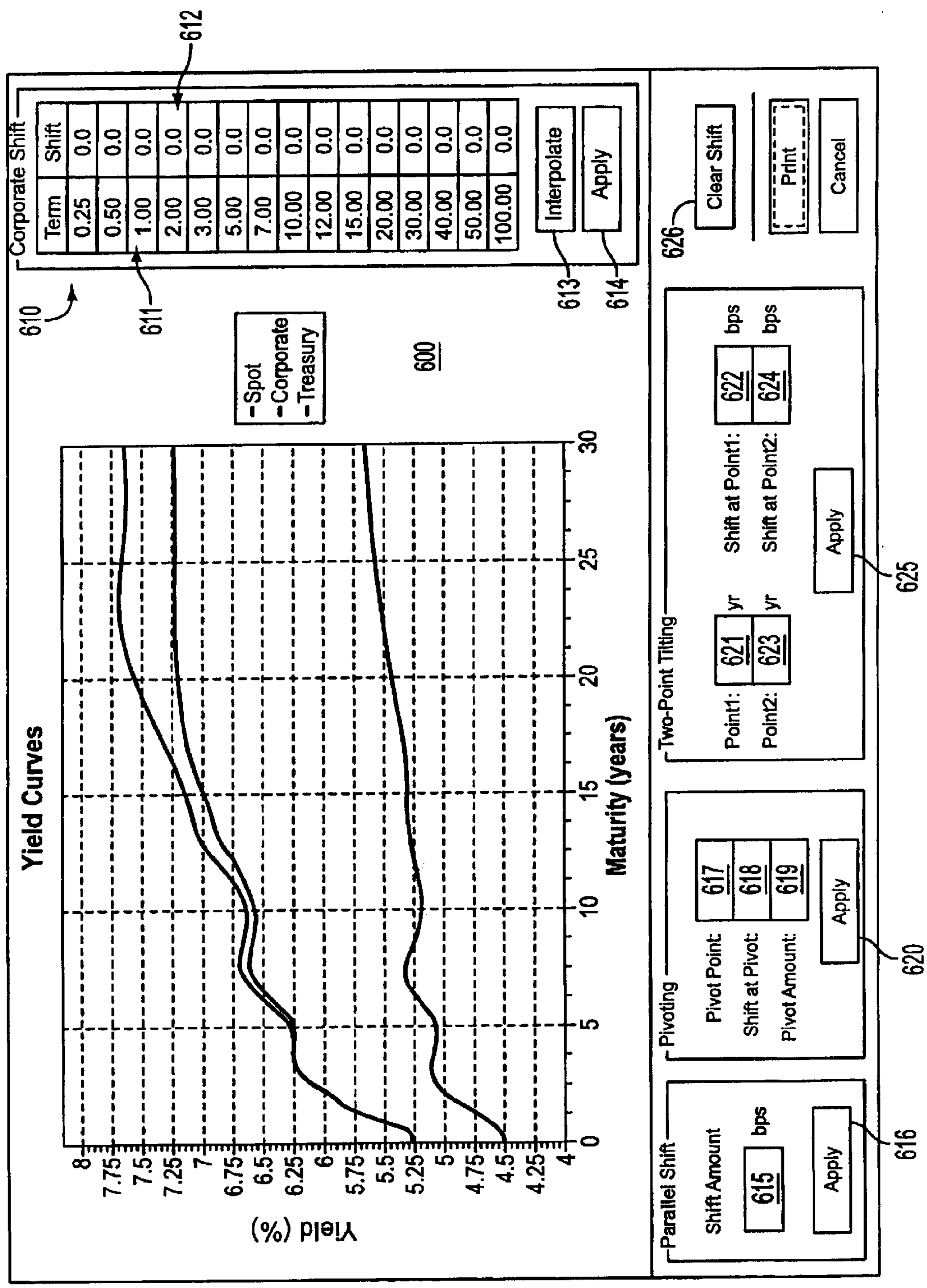
FIG. 23 illustrates shifting the yield curve according to the principles of the invention.

Corporate spreads may be shifted by entering or modifying the values on the Yield Curve Graph window 600, illustrated in FIG. 23. This screen may be accessed by selecting the toolbar option Yield Curve Env 415 when a user is either creating a new yield curve environment or selecting an existing yield curve environment.

Corporate spreads may be shifted by entering the appropriate shift values (bps) into the Corporate Shift field 610 on the Yield Curve Graph window 600. This window 600 may be accessed by selecting either the Apply Shift or the Graph button on the Yield Curve Environment tab screen. The Corporate Shift field 610 contains Term Column field 611 and Shift Column field 612. The Shift Column field 611 contains the numeric value of the shift for each x-axis value listed in the Term Column field 611. The shift value may be modified for any given term. A new value may be entered by typing the value in the appropriate cell and clicking the Apply button 614. The system 10 automatically modifies the Shifted Corporate Curve to reflect the modified values.

The system 10 also interpolates between the non-zero entered values to calculate the Treasury yields and corporate spread values. The interpolated function enables a user to speed the process of creating a yield curve by allowing a user to enter a few points and click on the Interpolate button 613 to fill in the remaining values.

A parallel shift in the yield curve occurs when all yields increase or decrease by the same number of basis points. By entering the appropriate shift values (bps) into the Shift Amount field 615 a user may generate a parallel shift in the corporate spreads. For example, to shift the yield curve along the y-axis, a user may enter the shift amount in the Shift Amount field 615 and then clicks the Apply button 616. The number of basis points entered is the change in percent Yield for every point along the curve. Once entered and applied, all the points on the curve shift "in parallel." To decrease the y-value, the user enters a negative number.

A pivot in the yield curve occurs when a single point on the curve is chosen to remain constant. Then, yields of shorter-term maturities move in one direction (e.g., down), and yields on longer-term maturities move in the opposite direction (e.g., up). Thus, the curve effectively pivots around the chosen pivot point (clockwise, in the above example).

A user may define the pivot point (yr) by entering into the Pivot Point field 617 the appropriate x-axis value. The number of basis points may be entered at Shift at Pivot field 618 to increase or decrease yield (%) at the pivot point. To decrease the y-value, the user enters a negative number. The number of basis points may be entered at Pivot Amount field 619 by the pivot curve. A positive value shifts the curve in a counterclockwise direction around the pivot point and a negative value to shift the curve in a clockwise direction around the pivot point. After entering the appropriate information, the user may click the Apply button 620 to view the shifted yield curve.

The corporate spreads may be modified by entering the appropriate shift values (bps) to obtain two-point tilting. The first pivot point may be defined by entering the appropriate x-axis value in Point 1 field 621. The number of basis points by which the user would like to increase or to decrease the yield (%) at the pivot point 1 may be indicated at Shift at Point 1 field 622.

The second pivot point may be defined by entering the appropriate x-axis value in Point 2 field 623. The number of basis points to increase or to decrease the yield (%) at the point 2 may be indicated at Shift at Point 2 field 624. To view the shifted corporate curve, the user clicks the Apply button 625.

In all of these examples, the shifted yield curve may be removed from the graph by clicking the Clear Shift button 626.

The yield curve environment represents a company's cost of funds curve, comprised of Treasuries and corporate credit spreads. The yield curve environment is employed throughout the debt section of system 10 to calculate and compare values among companies, securities, and maturities. It is a fundamental component of both the debt refinancing analysis and the option adjusted spread calculation.

A yield curve environment may be created and saved under a user's login identification so that it may be retrieved at a later time. Each time a yield curve environment is saved, the treasury and spread values are saved together so that a user may restore the environment at a future date. If a user is performing a tax-related analysis (e.g., debt refinancing) and has entered a tax schedule, then that tax schedule may also be saved along with the yield curve environment.

The yield curve is set up to allow users to re-create analyses very quickly, such as modeling various scenarios to perform "what if" analyses with hypothetical changes to the treasury curve, or updating corporate credit curves with current treasury rates at the touch of a button. The system 10 has helpful functions to let users quickly create new curves by pulling in generic spreads, or using the interpolate function.

The yield curve environment is a reusable module in the system 10 that appears in the OAS Calculator, the Debt Refinancing Analysis, the Portfolio Analysis, and the Corporate Efficiency Frontier. In fact, a user may assign a yield curve environment to a portfolio so that each time the user loads the portfolio for analysis, the assigned yield curve will be associated with the portfolio. A yield curve may be assigned to multiple portfolios.

Graphing the On-the-Run or O-T-R Treasury Yield Curve provides a visual representation of yield versus maturity. Although the maturity and corresponding yields are displayed in a table, the graph provides a more easily understood view of yields and the steepness of sections of the yield curves.

The historical yield curve can be graphed for up to five dates in the past. This function may be used to compare the movement of yields throughout time. If a user is considering a five-year issuance, the user may graph the five-year yields for each of the last five years. If, for example, the current five-year yield is significantly lower than in the previous five years, the time may be attractive for such a debt issuance.

The Generic Rate Lock window 700 of system 10, displayed in FIG. 24, illustrates the various costs of executing an interest rate lock on various benchmark securities for various terms. The objective of a rate lock is to lock in the current benchmark Treasury yield for pricing of a future fixed rate corporate debt issue. This provides an issuer with protection against a rise in Treasury yields by effectively pricing, in advance, the Treasury component of a future debt financing.

The Generic Rate Lock window 700 may be viewed by selecting toolbar option Generic Rate Lock 417. To perform an analysis of the several hedging options, the user refers to the Hedge Costs table 710 on the window 700. For each given Treasury security, the system calculates the hedge costs for the following rate-lock periods:

2 week 1 month 2 month 3 month 6 month

For each given Treasury security, the system also calculates the hedge ratio (%) and the interest rate-risk ($MM). The hedge ratio measures the relative volatility of the future bond offering to be hedged versus the volatility of the hedged Treasury. The hedge ratio (%) allows for matching of the volatilities to provide optimal execution of an interest rate lock. The 2-month Hedge-Ratio column 711 is located on the right side of window 700. An issuer is exposed to risk between the time that a financing decision is made and when the transaction is priced. Risk is expressed in terms of dollar cost per basis point rise in the benchmark Treasury. The Interest-Rate Risk column 712 displays the risk for an illustrative $100 million borrowing.

An Explanation Text Box field 713 is provided at the bottom of window 700 to explain the calculation results that may be accessed by clicking on the appropriate cell. The Company Name may be entered into Name field 714 at the top of window 700. The appropriate credit rating option may be selected from the drop-down list 715. Treasury data may be updated by clicking the Refresh button 716. The date and time of the most recent update preferably appear in Last Refresh field 717.

The Call Structures window 800 provides a "template" for many of the common issued callable bond structures. For example, a 10NC3 is a bond with a ten-year final maturity that is not callable during the first three years from the original issue date. Thus, the bond is callable by the issuer during years four through ten.

Callable bonds provide the issuer with protection from falling interest rates. If a bond were issued that was not callable at any time, and if interest rates were to fall, the issuer would have to pay the above market coupon (interest) for the entire remaining maturity of the bond. But, if the bond were callable, the issuer could call or redeem the bonds at a pre-specified call price, and issue new bonds at a lower interest rate. Such a call and re-issuance would lower the issuer's interest expense. Of course, the issuer of a callable bond must pay a higher yield (coupon) on callable bonds to entice investors to purchase these bonds.

Figure 25:
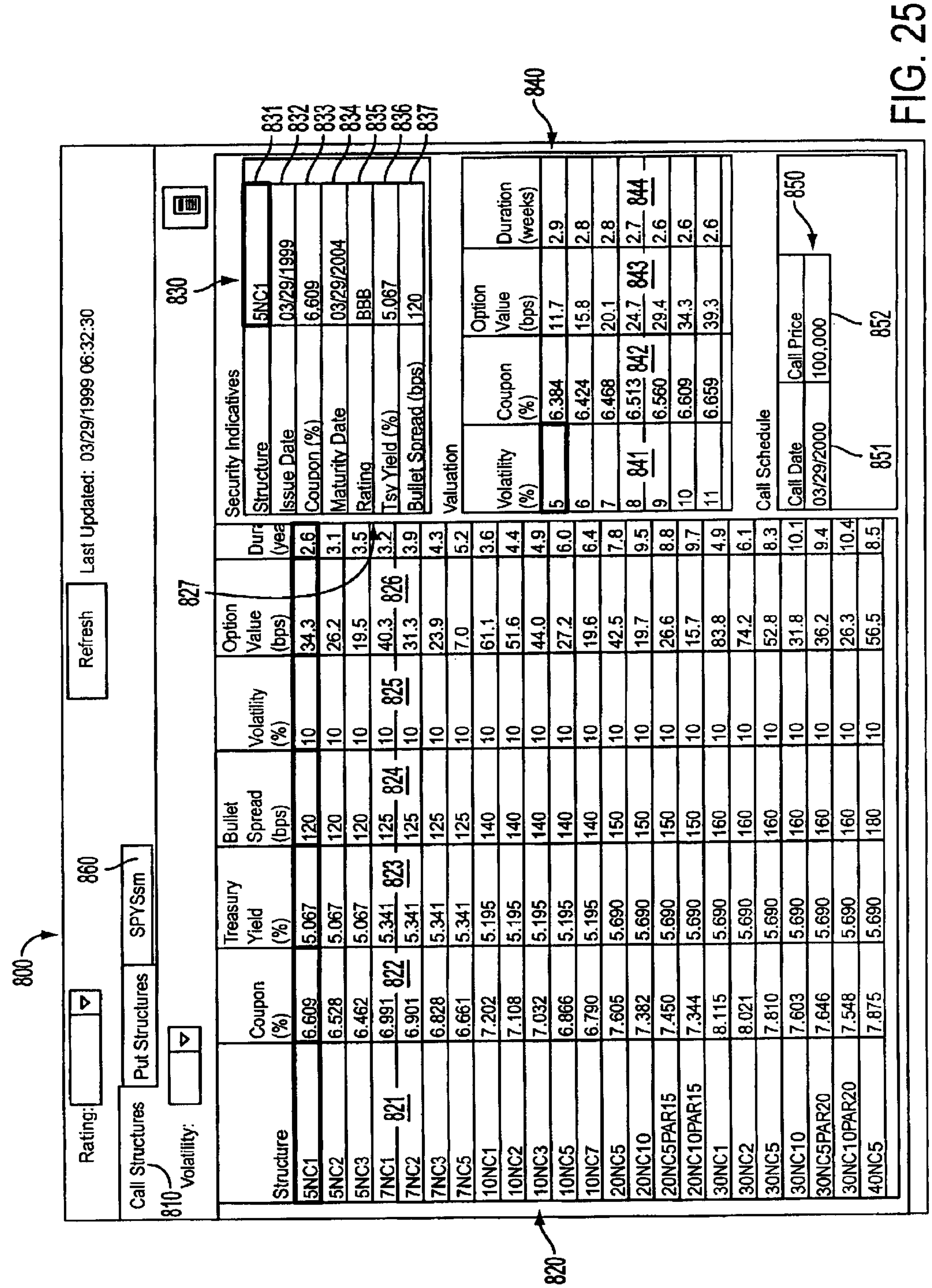
FIG. 25 illustrates a call structures window according to the principles of the invention.

The Call Structures window 800, illustrated in FIG. 25, contains four tables of information and may be accessed by clicking toolbar option Structures 419 and the Call Structures tab 810. The main table 820 contains a listing of the various options for structuring the bond. For each Structure field 821, the system displays the following five columns of information:

Coupon (%) field 822

Treasury Yield (%) field 823

Bullet Spread (bps) field 824

Volatility (%) field 825

Option Value (bps) field 826

Duration (years) field 827

After a structure has been selected from the main table, the system automatically populates the Security Indicatives table 830, Valuation table 840, and Call Schedule table 850 with data related to the chosen structure. The Security Indicatives table 830 contains the following information:

Structure field 831

Issue Date field 832

Coupon (%) field 833

Maturity Date field 834

Rating field 835

Treasury Yield (%) field 836

Bullet Spread (bps) field 837

The Valuation table 840 contains the following four columns of information:

Volatility (%) field 841

Coupon (%) field 842

Option Value (bps) field 843

Duration (years) field 844

The Call Schedule table 850 displays each Call Date and the corresponding call price in Call Date field 851 and Call Price field 852, respectively.

Figure 26:
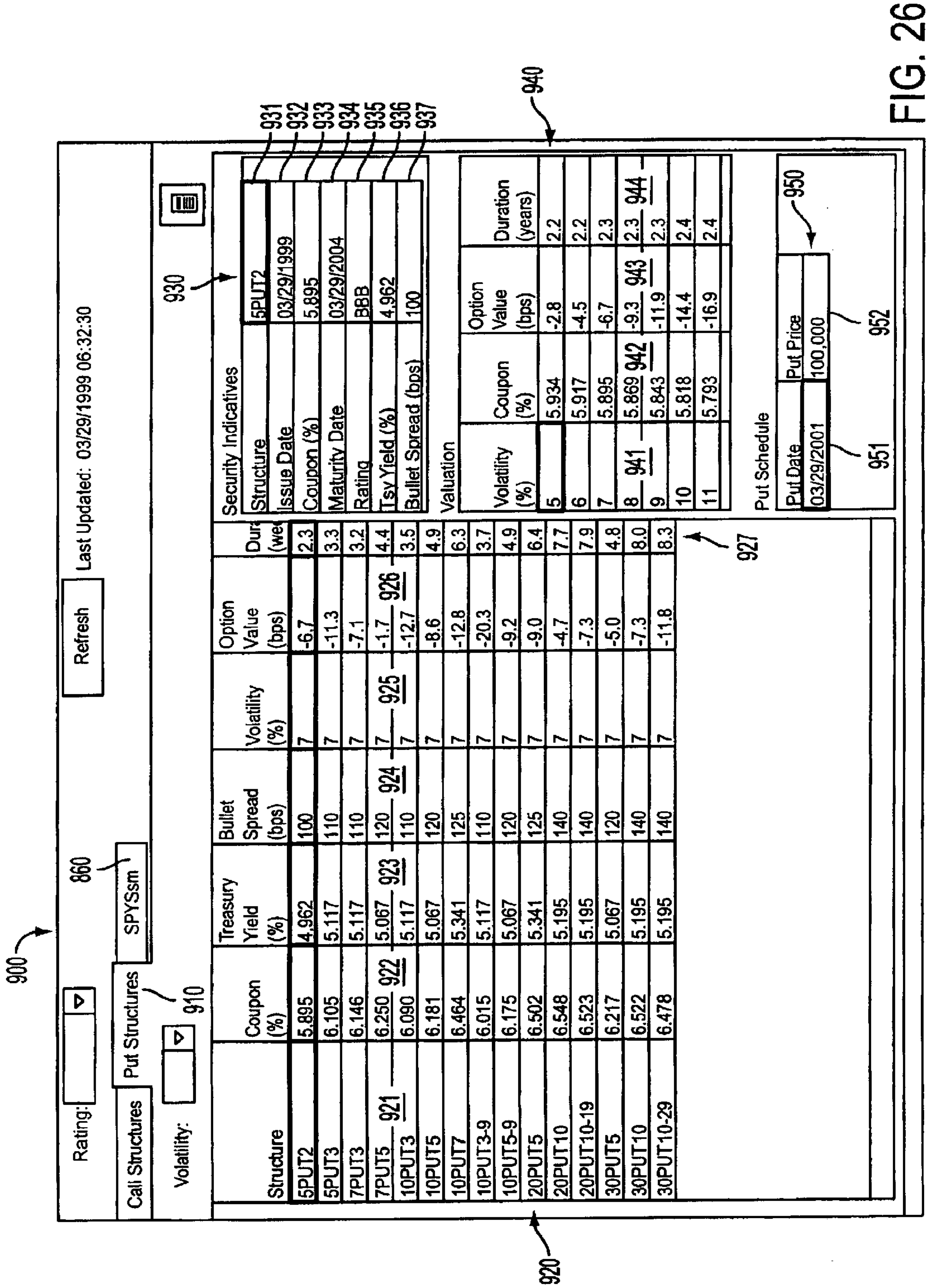
FIG. 26 illustrates a put structures window according to the principles of the invention.

The Put Structures window 900, illustrated in FIG. 26, provides a "template" for many of the commonly issued putable bond structures. For example, a 10PUT3 is a bond with a ten-year final maturity that is not putable during the first three years from the original issue date. Therefore, the bond is putable by the investor during years four through ten.

Putable bonds provide investors with protection against rising interest rates. If interest rates rise, an investor holding a putable bond may put the bond back to the issuer at a pre-specified put price, and use the proceeds to purchase a bond with a higher coupon payment. If the bond were not putable, the investor would own a bond with a below market coupon rate. The investor must relinquish a certain amount of yield (coupon) to purchase a bond that is putable, so the issuer can lower interest expense by issuing putable bonds.

The Put Structures window 900 contains four tables of information that is analogous to the Call Structures window 800. The Put Structures window 900 may be accessed by clicking toolbar option Structures 419 and the Put Structures tab 910. The main table 920 contains a listing of the various options for structuring the bond. For each Structure field 921, the system displays the following six columns of information:

Coupon (%) field 922

Treasury Yield (%) field 923

Bullet Spread (bps) field 924

Volatility (%) field 925

Option value (bps) field 926

Duration (years) field 927

After a structure has been selected from the main table 920, the system automatically populates the Security Indicatives table 930, Valuation table 940, and Put Schedule table 950 with data related to the chosen structure.

The Security Indicatives table 930 contains the following information:

Structure field 931

Issue Date field 932

Coupon (%) field 933

Maturity Date field 934

Rating field 935

Treasury Yield (%) field 936

Bullet Spread (bps) field 937

The Valuation table 940 contains the following four columns of information:

Volatility (%) field 941

Coupon (%) field 942

Option Value (bps) field 943

Duration (years) field 944

The Put Schedule table 950 displays each put date and the corresponding put price in Put Date field 951 and Put Price field 952, respectively.

Step-Up Put Structures screen provides a "template" for many of the commonly issued step-up put bond structures. For example a 13PUT3 Step is a bond with a thirteen-year final maturity that is not putable during the first three years from the original issue date. Therefore, the bond is putable by the investor during years four through thirteen.

Step-Up Put Structures are putable bonds that have coupon payment rates that rise over the life of the bond. The issuer, who makes lower coupon payments in the early years of the bond, benefits from the lower interest expense in these early years.

The Step-Up Put Structures screen contains five tables of information and is analogous to Put Structures window 900. The main table contains a listing of the various options for structuring the bond. For each structure, the system 10 displays the following six columns of information:

Coupon (%) field

Treasury Yield (%) field

Bullet Spread (bps) field

Volatility (%) field

Option value (bps) field

Duration (years) field

After a structure has been selected from the main table, the system automatically populates the Security Indicatives, Valuation, Put Schedule, and Coupon Schedule tables with data related to the chosen structure.

The Security Indicatives table contains the following information:

Structure field

Issue Date field

Coupon (%) field

Maturity Date field

Rating field

Treasury Yield (%) field

Bullet Spread (bps) field

The Valuation table contains the following four columns of information:

Volatility (%) field

Coupon (%) field

Option Value (bps) field

Duration (years) field

The Put Schedule table displays each Put Date and the corresponding Put Price.

The Coupon Schedule table displays the Step-Up Date and the Coupon.

Figure 27:
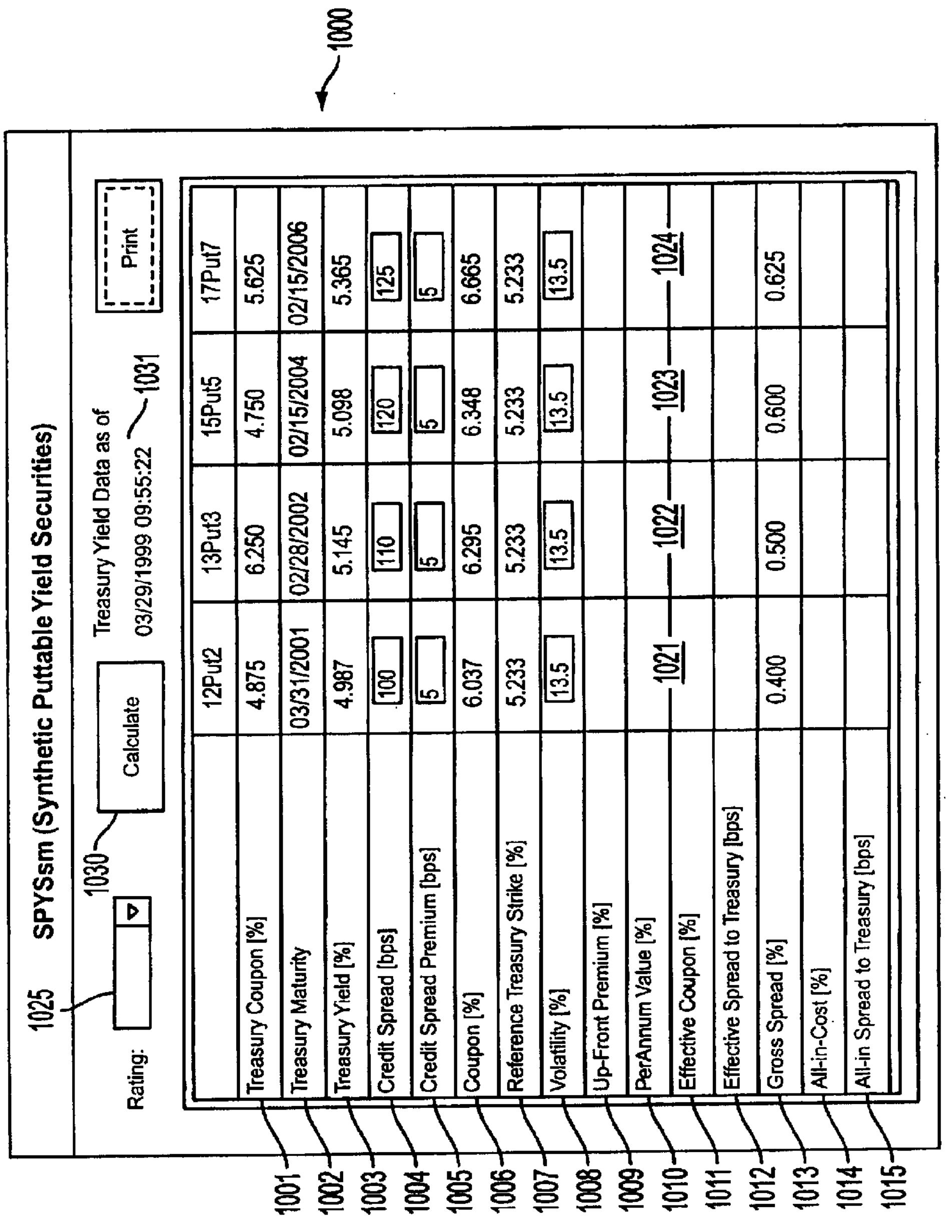
FIG. 27 illustrates a synthetic putable yields securities window according to the principles of the invention.

The Synthetic Putable Yields Securities (SPYSsm), illustrated in FIG. 27, may be accessed by selecting toolbar option Structures 419 and the SPYSsm tab 860.

The system 10 displays the following information for each Synthetic Putable Yield Security:

Treasury Coupon (%) field 1001

Treasury Maturity field 1002

Treasury Yield (%) field 1003

Credit Spread (bps) field 1004

Credit Spread Premium (bps) field 1005

Coupon (%) field 1006

Reference Treasury Strike (%) field 1007

Volatility (%) field 1008

Up-front Premium (%) field 1009

Per Annum Value (%) field 1010

Effective Coupon (%) field 1011

Effective Spread to Treasury (bps) field 1012

Gross Spread (%) field 1013

All-in Cost (%) field 1014

All-in spread to Treasury (bps) field 1015

The Synthetic Putable Yield Securities include:

12 Put 2 field 1021

13 Put 3 field 1022

15 Put 5 field 1023

17 Put 7 field 1024

The credit rating may be selected from the Credit Rating Drop-down list 1025.

For each SPYS, the user enters the appropriate:

Credit Spread (bps)

Credit Spread Premium (bps)

Volatility (%)

Values may be entered by using the mouse to select the text box, typing the appropriate value, and pressing <Enter>.

The user clicks the Calculate button 1030 at the top of the screen to view the results of the entered values on the screen. Clicking the Calculate button 1030 also accesses the most recent Treasury data. In a preferred embodiment, the date and time of the most recent update are displayed in Last Refresh field 1031.

The analytics section provides three options: OAS Calculator, Debt Refinancing and Ratings Model.

Figure 28:
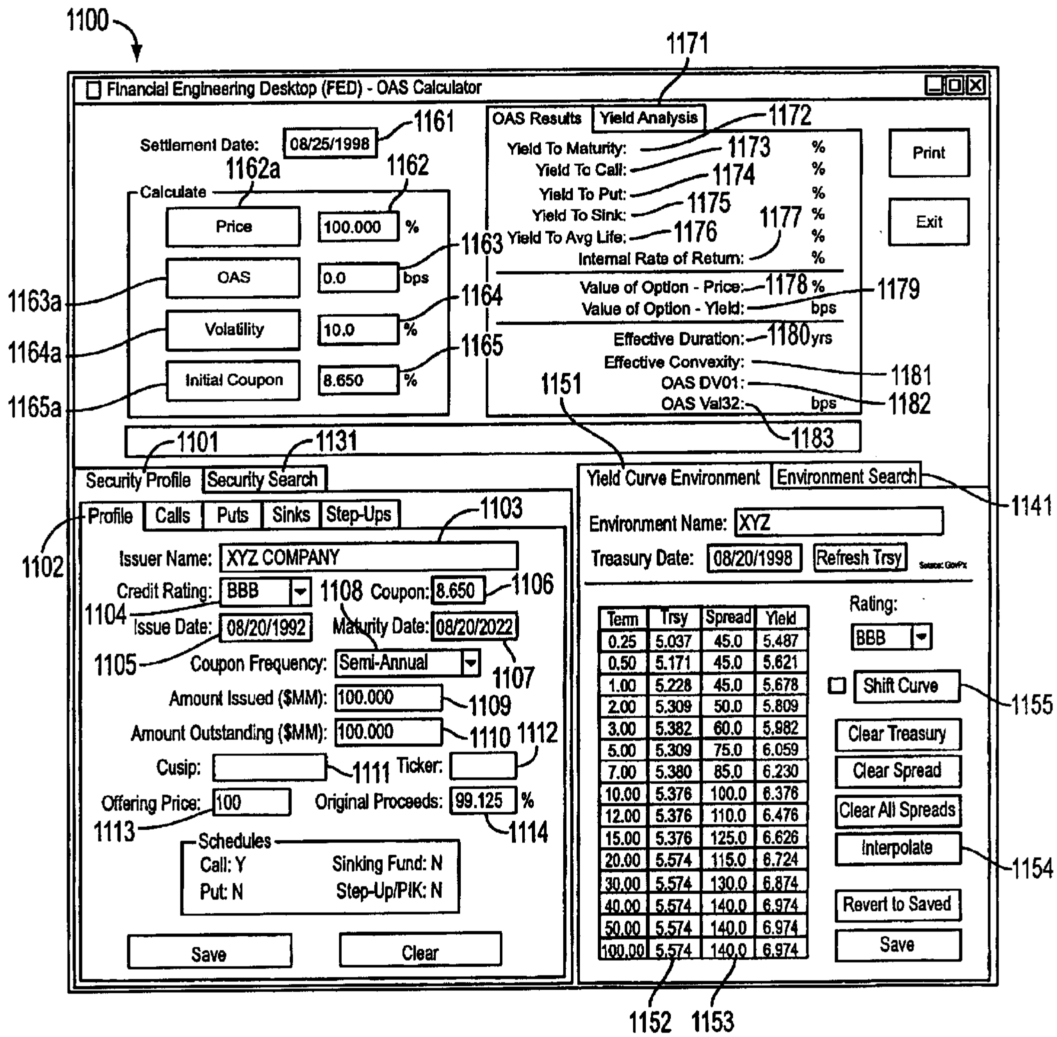
FIG. 28 illustrates an OAS calculator according to the principles of the invention.

The OAS Calculator window 1100, illustrated in FIG. 28, may be used to perform a variety of analytical calculations on callable and/or putable bonds and may be accessed by selecting toolbar option OAS Calculator 422. As the first step in performing an OAS calculation, both the security profile (indicatives) and the yield curve environment must be defined. The embedded call and/or put options may be American, European, or Bermudan (see below). A bond having a sinking fund schedule (with delivery options) and a varying coupon rate schedule may be selected. As discussed above, the yield curve environment defines both the Treasury yield curve and the corporate yield curve. The system 10 uses these curves to evaluate the price of the bond using the OAS calculator.

An OAS calculation may be performed on either an existing security or on a new security. To define a new security, a user must enter the appropriate information into the text fields on the Security Profile tab 1101, including:

Credit Rating field 1104

Coupon Frequency field 1108

Amount Issued field 1109

Call Date(s) field 1122

Call Price(s) field 1123

To perform a calculation on an existing security, the Security Search tab 1131 may be employed to select the security from the database or from the user's own personal portfolio. The system 10 automatically populates the Security Profile fields with the appropriate information when selecting an existing security.

When performing an OAS calculation, an existing or new yield curve environment may be utilized. To select an existing environment, the Environment Search tab 1141 may be used to access the list of environment names and to make the user's selection. When the user selects an existing yield curve environment, the system automatically populates the Yield Curve Environment fields.

To define a new environment, a user must complete the table on the Yield-Curve Environment mini-window 1151. Specifically, the user must input the Treasury yield and the corporate spread into Trsy fields 1152 and Spread fields 1153, respectively, for each term. A user may use the interpolate function to calculate and to enter the appropriate values in Interpolate field 1154. If necessary, a user may alter the environment by shifting either the Treasury yield curve or the corporate spreads, as discussed above, by clicking Shift Curve button 1155.

The settlement date, which is the date on which the user would like to value the security, must be entered in Settlement Date field 1161. The date is typed in a mm/dd/yy format, and then the user presses <Enter>.

Once the settlement date is defined, one of the values located in Price field 1162, OAS field 1163, Volatility field 1164, or Initial Coupon field 1165, may be calculated.

A user must first enter the values of the three known variables and then click on the button adjacent the field that corresponds to the unknown value. To price a security, for example, a user must first input the OAS, Volatility, and Initial Coupon values into their respective fields and then click on the Price button 1162*a*.

The system 10 automatically calculates the results of the various analytical calculations and displays them on the OAS Results mini-window 1171:

Yield to Maturity field 1172

Yield to Call field 1173

Yield to Put field 1174

Yield to Sink field 1175

Yield to Average Life field 1176

Internal Rate of Return field 1177

Value of Option—Price field 1178

Value of Option—Yield field 1179

Effective Duration field 1180

Effective Convexity field 1181

OAS DV01 field 1182

OAS Vol32 field 1183

The OAS Calculator may be used to perform a comparative analysis and to help a user determine an appropriate bond structure. For instance, a user may perform a comparative analysis by performing an OAS calculation on a 10NC3 bond, changing the structure of the bond to 10NC5, recalculating the OAS values, and comparing the results of the two calculations. The OAS Calculator may also be used to determine the cost of funds (initial coupon) associated with each bond structure.

EXAMPLE

A user chooses an 8.650% bond due on Aug. 20, 2022. To define this security, the user may either (a) use the Security Search tab screen to select the security from his or her portfolio or (b) enter the information listed below into the appropriate fields on the Security Profile tab 1101 in FIG. 28:

| PROFILE TAB 1102 | INPUT | FIELD |
|---|---|---|
| Issuer Name | XYZ Company | 1103 |
| Credit Rating | BBB | 1104 |
| Coupon | 8.650 | 1106 |
| Issue Date | Aug. 20, 1992 | 1105 |
| Maturity Date | Aug. 20, 2022 | 1107 |
| Coupon Frequency | Semi-Annual | 1108 |
| Amount Issued ($MM) | 100.00 | 1109 |
| Amount Outstanding ($MM) | 100.00 | 1110 |
| Offered Price | 100.00 | 1113 |
| Original Proceeds | 99.125. | 1114 |

Figure 29:
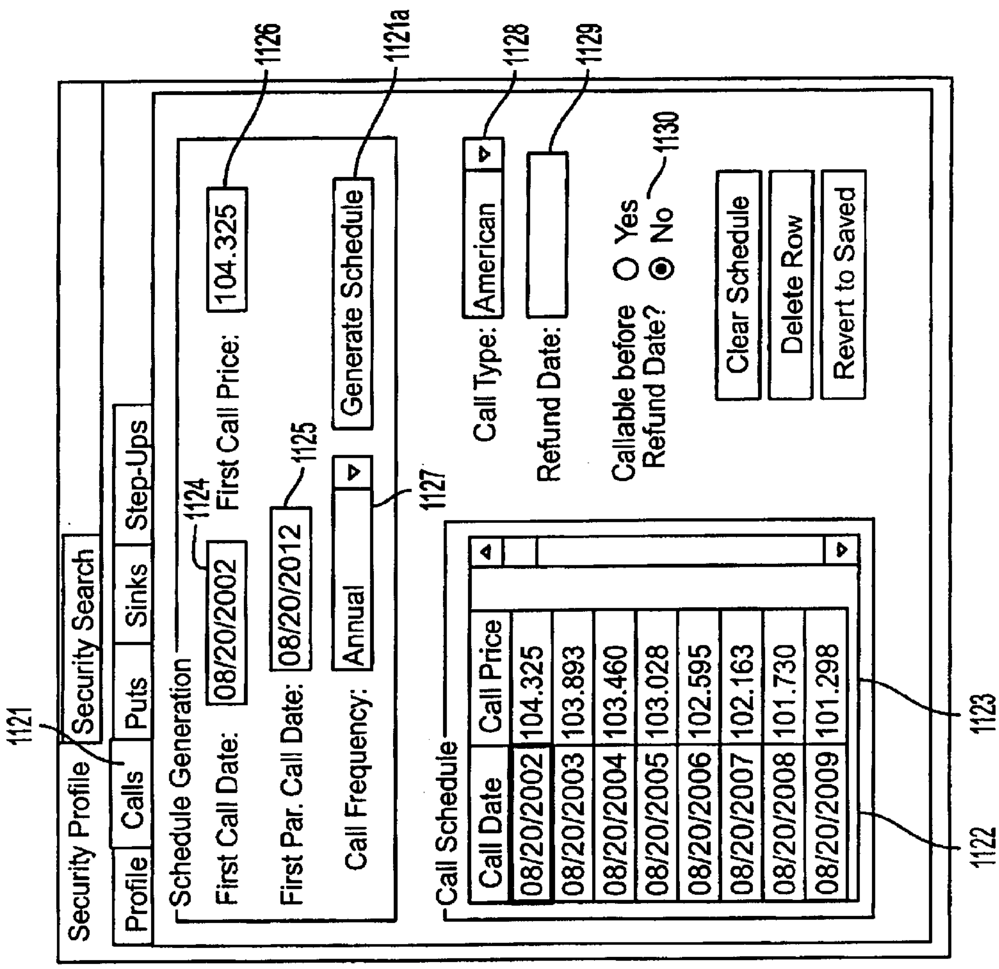
FIG. 29 illustrates the calls tab portion of the OAS calculator window according to the principles of the invention.

The user then enters the information listed below into fields on the Calls tab 1121, which is displayed in FIG. 29.

| CALLS TAB 1121 | INPUT | FIELD |
|---|---|---|
| First Call Date | Aug. 20, 2002 | 1124 |
| First Par Call Date | Aug. 20, 2012 | 1125 |
| First call price | 104.325 | 1126 |
| Call Frequency | Annual | 1127 |
| Call Type | American | 1128 |
| Refund Date | [blank] | 1129 |
| Callable before Refund Date? | [No] | 1130 |

After entering the above information, the user clicks on the Generate Schedule button 1121*a* to create the following call schedule, which is displayed in Call Date fields 1122 and Call Price fields 1123:

| Call Date | Call Price |
|---|---|
| Aug. 20, 2002 | 104.325 |
| Aug. 20, 2003 | 103.893 |
| Aug. 20, 2004 | 103.460 |
| Aug. 20, 2005 | 103.028 |
| Aug. 20, 2006 | 102.595 |
| Aug. 20, 2007 | 102.163 |
| Aug. 20, 2008 | 101.730 |
| Aug. 20, 2009 | 101.298 |
| Aug. 20, 2010 | 100.865 |
| Aug. 20, 2011 | 100.433 |
| Aug. 20, 2012 | 100.000 |

Note that the first call date (Aug. 20, 2002) is the first date on which the issuer can repurchase the security. By exercising the call option on this date, the issuer can repurchase the security at 104.325%. If the issuer does not exercise the option, he or she must wait until the next call date (Aug. 20, 2003). Note that the final call date (Aug. 20, 2012) is the date on which the issuer can repurchase the security at par.

To define the yield curve environment, the user either (a) accesses the Environment Search tab screen to select "XYZ" from the list of previously created environments or (b) enters the appropriate information into the text boxes on the Yield Curve Environment tab screen as described above.

Figure 30:
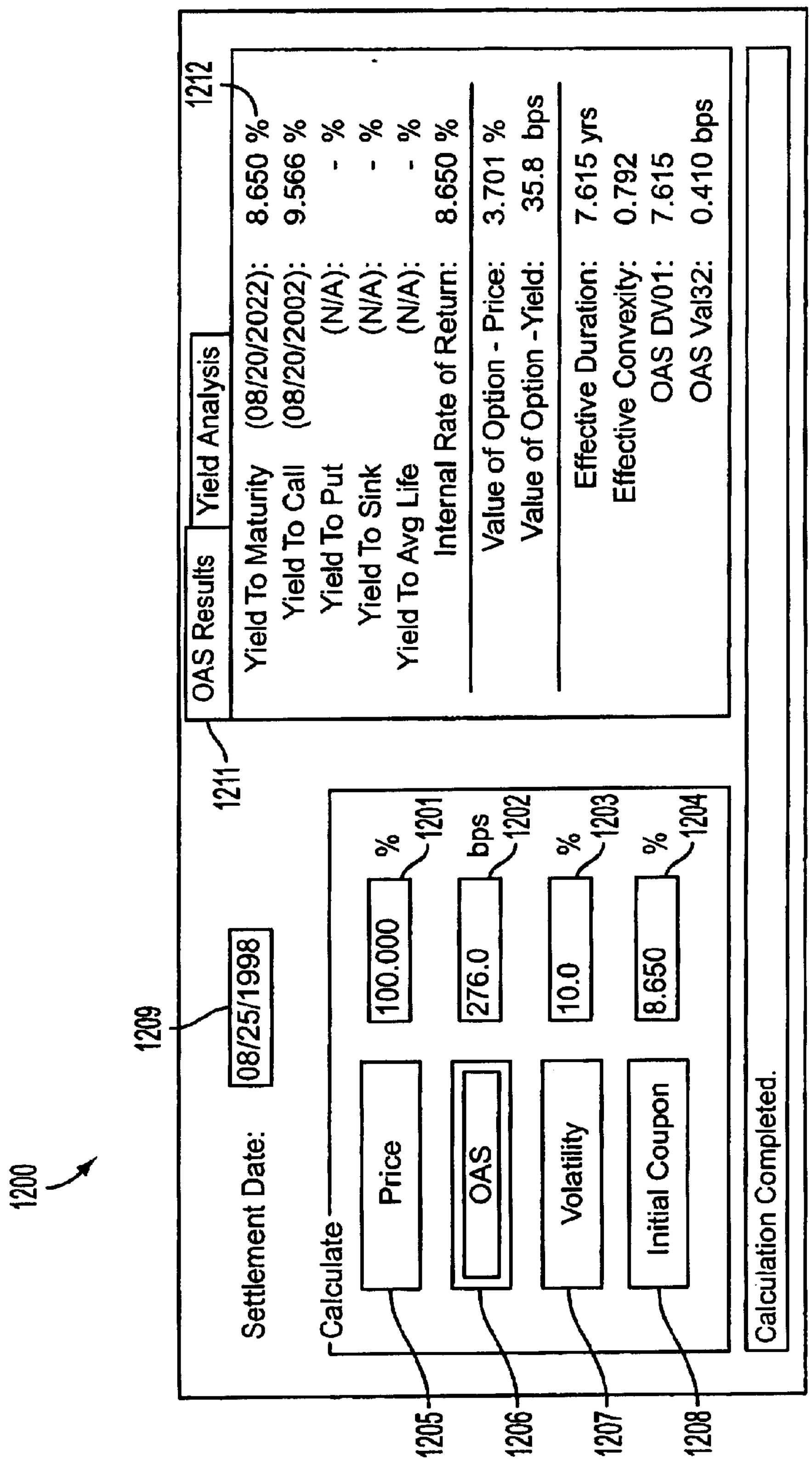
FIG. 30 illustrates the calculate field box portion of the OAS calculator according to the principles of the invention.

The Calculate field box 1200, illustrated in FIG. 30, contains Price field 1201, OAS field 1202, Volatility field 1203, and Initial Coupon field 1204. The system automatically populates the OAS Results mini-window 1211 with the value that the user has entered into the Security Profile (8.650%) in Maturity field 1212. Note that the Price defaults to 100.000% in Price field 1201. Before performing any calculations, the user must enter the settlement date, which is the date on which the security is valued, in Settlement Date field 1209. In this example, the user enters a settlement date of Aug. 25, 1998.

After entering the appropriate information, the user can use the Calculate field box 1200 to perform various analytical calculations. To calculate the OAS value for example, the user clicks on the OAS button 1206 to obtain the results displayed in FIG. 30. The system automatically calculates the values that appear on the OAS Results mini-window 1211.

When determining the value of the option adjusted spread, the system 10 inputs into the calculation a bond price of 100.000% in Price field 1201 and a yield volatility of 10.0% in Volatility field 1203. Note that the system 10 automatically changes the settlement date to the issue date. See Settlement Date field 1401 in FIG. 32.

Figure 31:
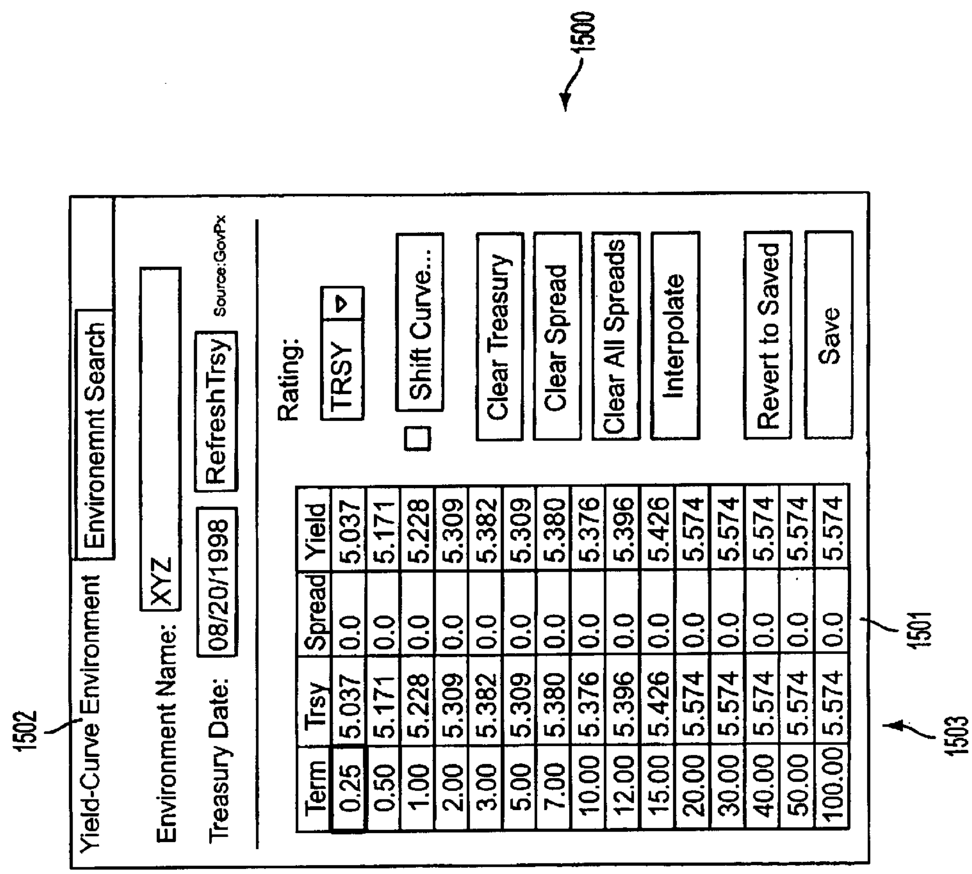
FIG. 31 illustrates the yield-curve environment of the OAS calculator according to the principles of the invention.

When the user calculates the OAS value, the system clears the Spread fields 1501 of Yield-Curve Environment tab 1502 and displays only the values for the Trsy fields 1503 as is demonstrated in FIG. 31.

Figure 32:
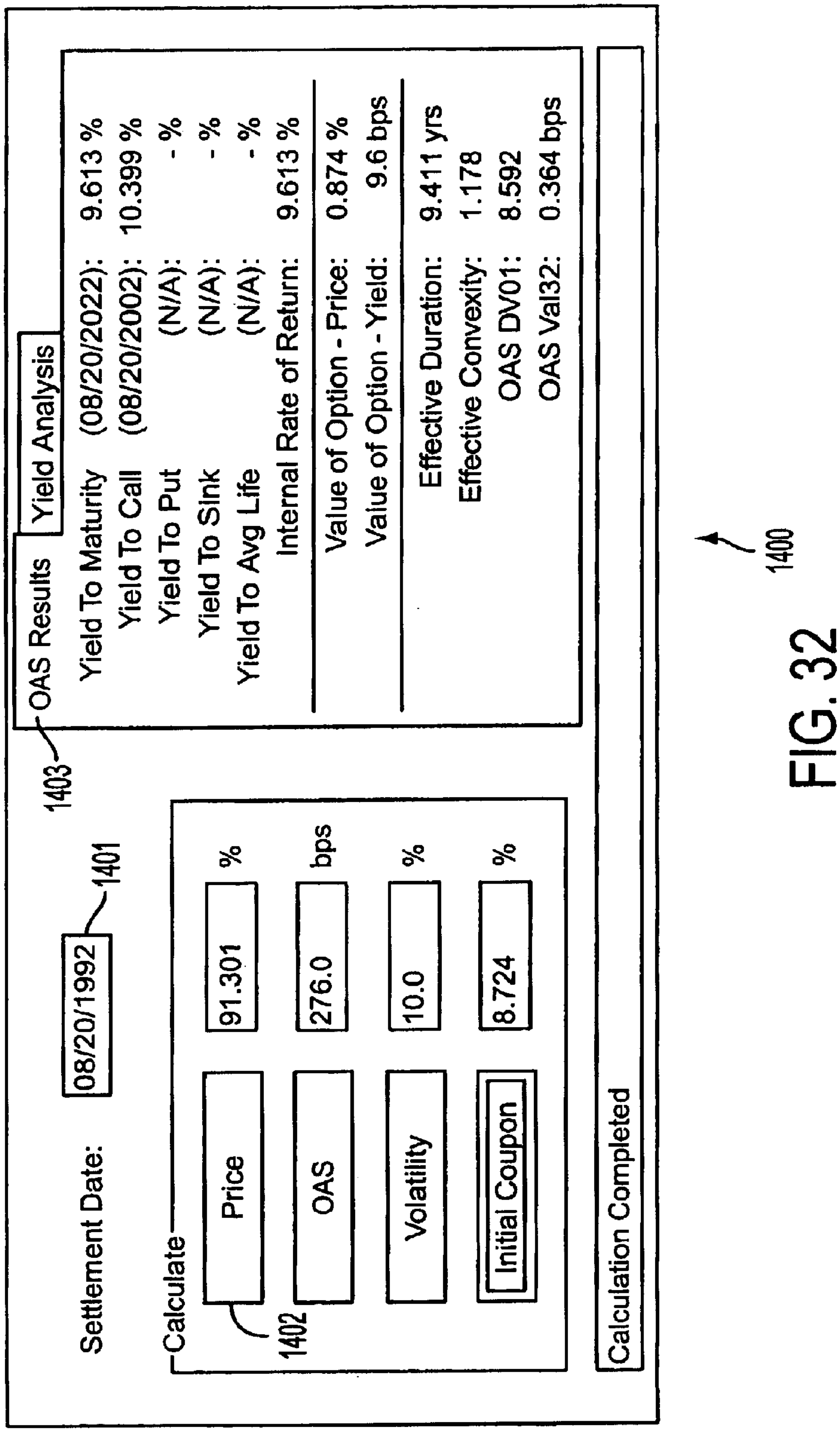
FIG. 32 illustrates the calculate field box portion of the OAS calculator according to the principles of the invention.

After calculating the value of the OAS, the user may decide to recalculate the price of the bond based on the new OAS value. To do so, the user clicks on the Price button 1402 to obtain the following value (91.301%), as shown in FIG. 32. FIG. 32 also exemplifies the relationship between price and OAS, as the system automatically recalculates the values displayed on the OAS Results mini-window 1403 when the user clicks on the Price button 1402.

As described above, an OAS calculation may be performed on either an existing security or on a new security. Additionally, the yield curve environment may be defined by accessing an existing yield curve environment or by creating a new one, as described above. The OAS calculations may be performed as described above by the user entering the values of the three known variables and then clicking the on button corresponding to the unknown value. The OAS Results screen is also described above.

Figure 33:
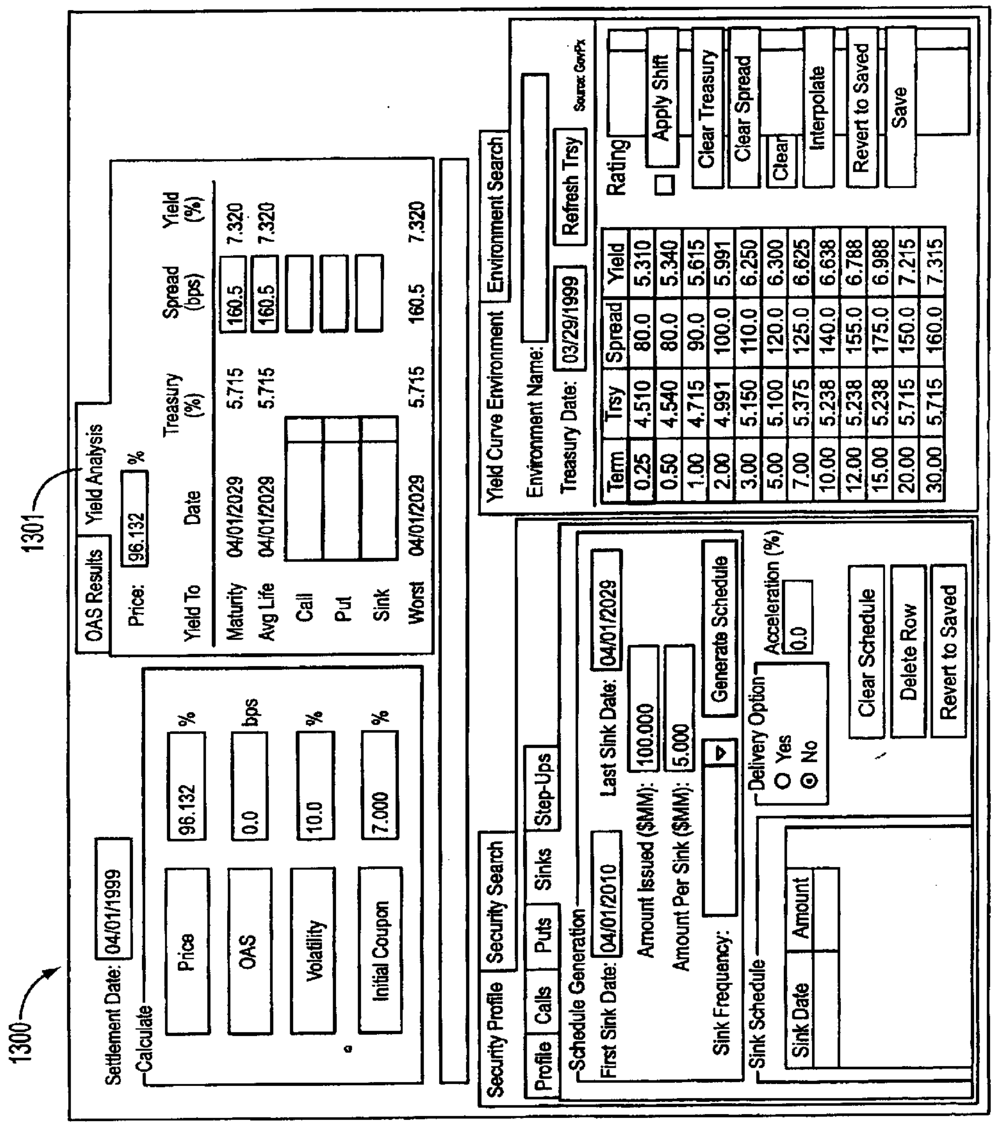
FIG. 33 illustrates the yield analysis of the OAS calculator according to the principles of the invention.

The Yield Analysis mini-window 1301, displayed in FIG. 33, may be selected to modify price, spread, call date, put date and sink date and to perform a variety of calculations. The Yield (%) and the corresponding Spread (bps) may be recalculated for a new value for Price (%). The Yield (%) and the corresponding Price (%) may be recalculated for a new value for the Spread (bps). The Yield (%) and the corresponding Spread (bps) may be recalculated by selecting another Call date from the drop-down list. The Yield (%) and the corresponding Spread (bps) may be recalculated by selecting another Put date from the drop-down list. The Yield (%) and the corresponding Spread (bps) may be recalculated by selecting another Sink date from the drop-down list.

An issuer may want to refinance a debt obligation on a date that is before either the redemption date or the call date for at least one of the following two reasons:

(a) The issuer has a security with a call option, and would like to exercise the option in order to realize the net present value ("NPV") positive savings, or (b) The issuer would like to refinance a high coupon security with a low coupon security in order to reduce its annual interest expense.

When structuring the debt refinancing transaction, the user must (a) chose to retire all or part of the Original Issue security through a call, tender, or open market repurchase and (b) define the New Issue security that the user is utilizing to refinance the original transaction.

The system 10 calculates the debt refinancing on an after-tax basis. Therefore, a user should consult a tax professional to determine the tax consequences of refinancing the debt obligation.

As the first step in performing a debt refinancing analysis, a user must define both the Original Issue security profile (indicatives) and the yield curve environment.

Figure 34:
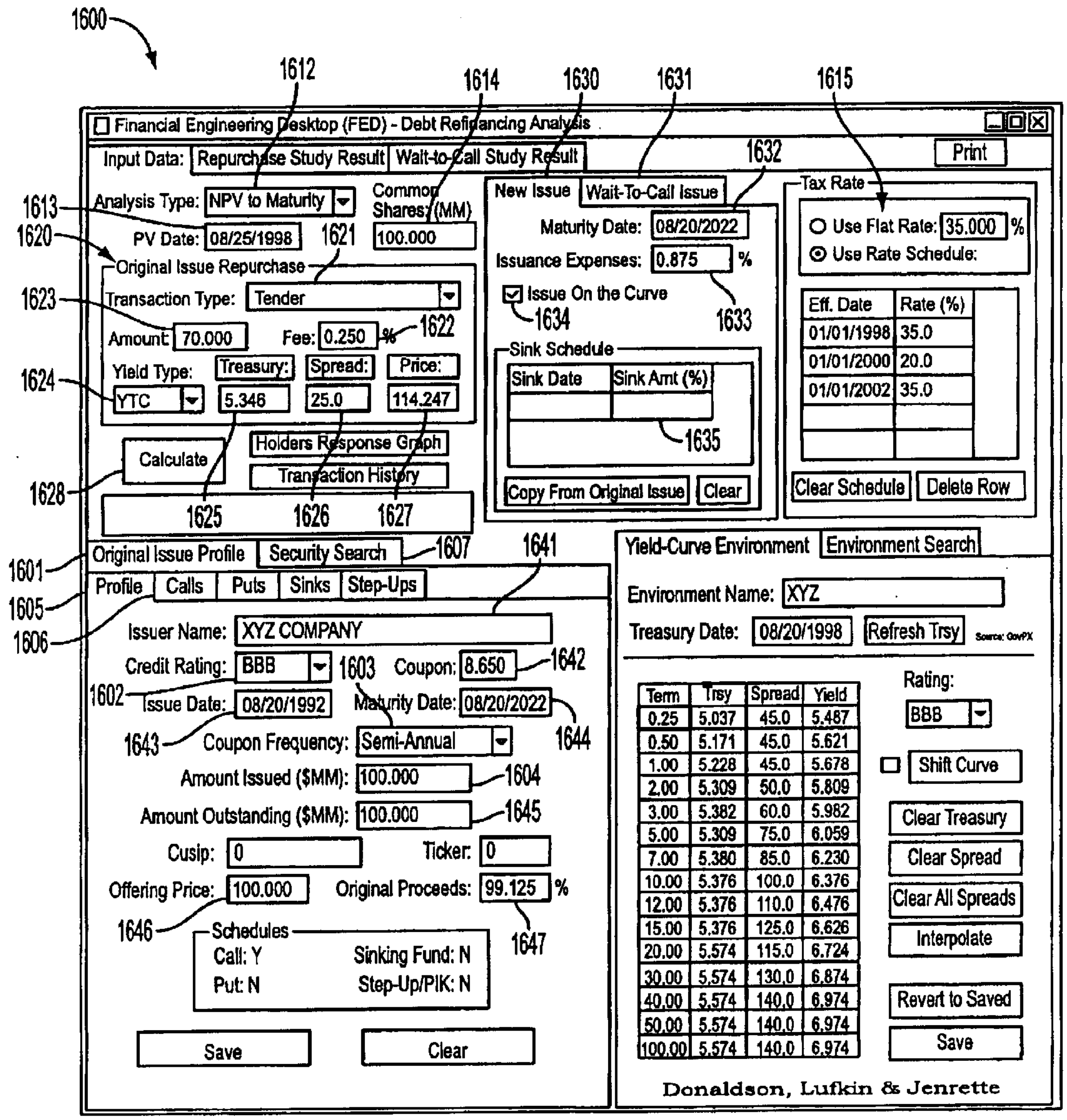
FIG. 34 illustrates input data of the Debt Refinancing Analysis window according to the principles of the invention.

To define the original (target) security, a user must enter the appropriate information into the Credit Rating field 1602, Coupon Frequency field 1603, and Amount Issued field 1604 on Profile tab 1605; and Call Date(s) field 1701 and Call Price(s) field 1702 on Calls tab 1606. Both Profile tab 1605 and Calls tab 1606 are on the Original Issue Profile mini-window 1601, as seen in FIG. 34.

The Security Search mini-window 1607 may be used to select a security from the database or from the user's own personal portfolio. The system 10 automatically populates the Original Issue Profile mini-window fields with the appropriate information when an existing security is selected.

Once both the target security and the yield curve environment have been defined, a user must enter the necessary information into Analysis Type field 1612, PV Date field 1613, Common Shares (MM) field 1614, and Tax Rate fields 1615 in order to perform debt refinancing analysis. Specifically, the Analysis Type, PV Date, Common Shares (MM), and Tax Rate must be defined.

Figure 36:
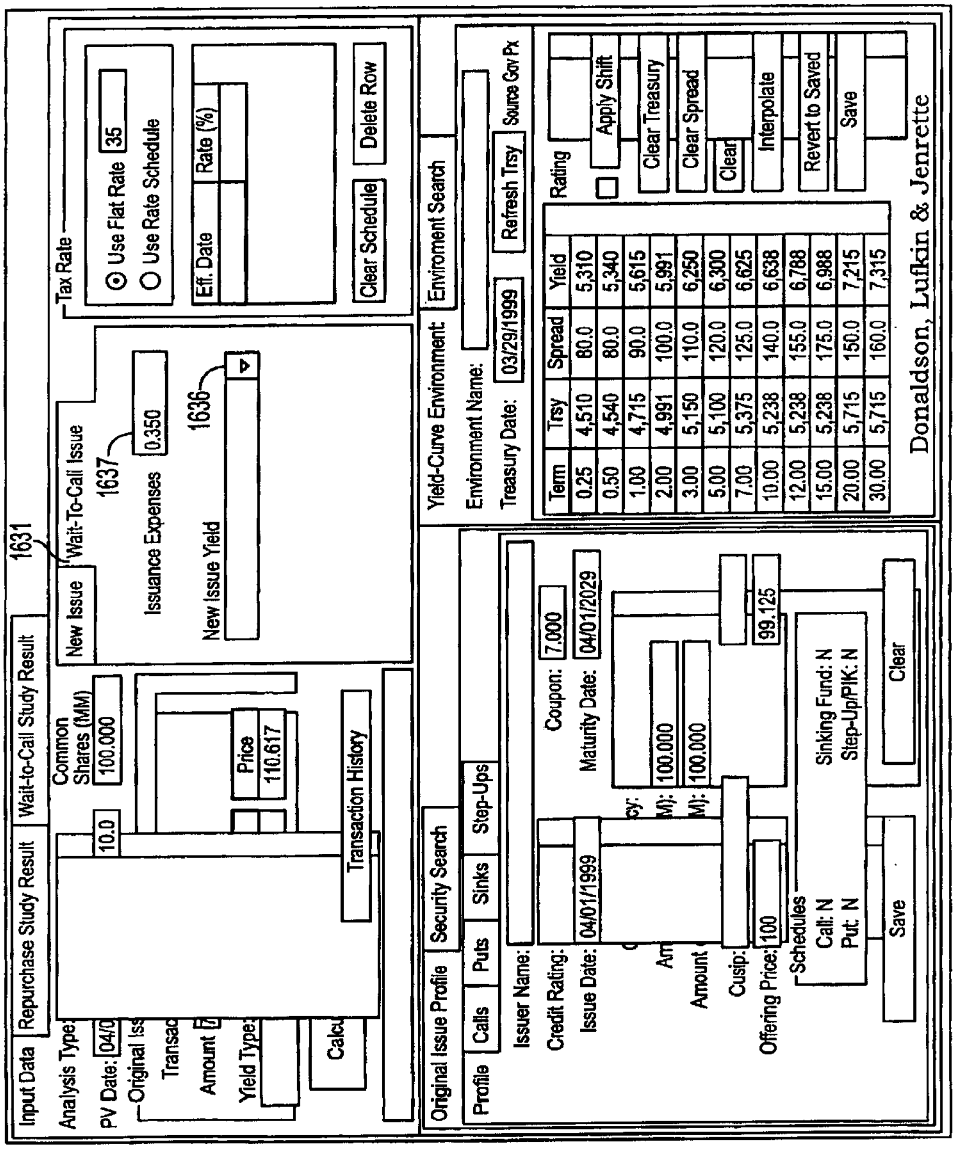
FIG. 36 illustrates the wait-to-call issue aspect of the Debt Refinancing Analysis window according to the principles of the invention.

After the basic parameters have been entered, a user must enter the transaction details into the Original Issue Repurchase field box 1620. The New Issue tab 1630 may be used to define the security to be utilized to refinance the transaction. If the original issue is callable at a future date, a user may use the Wait-to-Call Issue tab 1631, as seen in FIG. 36, to analyze the benefits of refinancing the security at the present time versus refinancing the security at the call date.

Once the appropriate information has been entered, the system performs the necessary calculations. The results may be viewed on the Repurchase Study Result or Wait-To-Call Study Result screen.

EXAMPLE

A user chooses an 8.650% bond due on Aug. 20, 2022. To define this security, the user may either (a) use the Security Search tab screen to select the security from his or her portfolio or (b) enter the below information into the appropriate fields on the Security Profile tab screens:

| PROFILE TAB 1605 | INPUT | FIELD |
|---|---|---|
| Issuer Name | XYZ Company | 1641 |
| Credit Rating | BBB | 1602 |
| Coupon | 8.650 | 1642 |
| Issue Date | Aug. 20, 1992 | 1643 |
| Maturity Date | Aug. 20, 2022 | 1644 |
| Coupon Frequency | Semi-Annual | 1603 |
| Amount Issued ($MM) | 100.00 | 1604 |
| Amount Outstanding ($MM) | 100.00 | 1645 |
| Offered Price | 100.00 | 1646 |
| Original Proceeds | 99.125. | 1647 |

Figure 35:
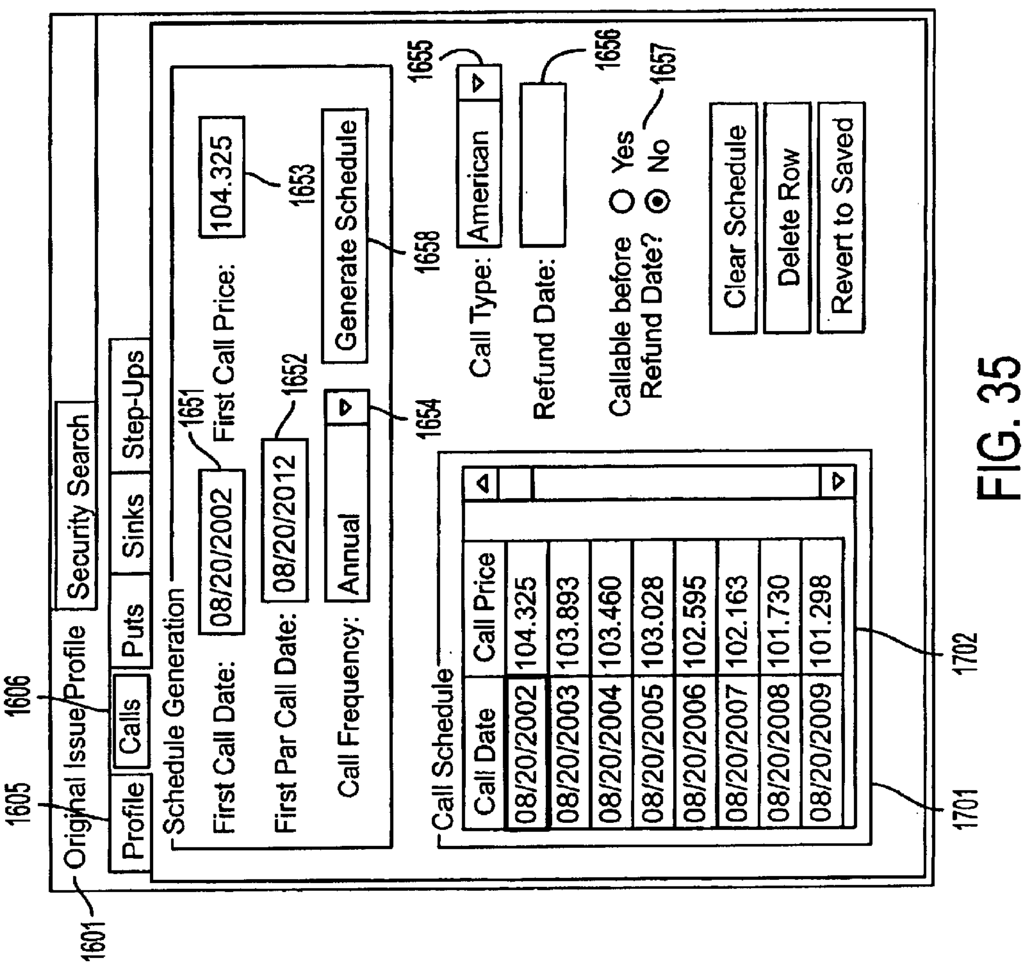
FIG. 35 illustrates the Calls aspect of the Debt Refinancing Analysis window according to the principles of the invention.

The user then enters the below information into the fields on the Calls tab 1606, which is shown in FIG. 35.

| CALLS TAB 1606 | INPUT | FIELD |
|---|---|---|
| First Call Date | Aug. 20, 2002 | 1651 |
| First Par Call Date | Aug. 20, 2012 | 1652 |
| First call price | 104.325 | 1653 |
| Call Frequency | Annual | 1654 |
| Call Type | American | 1655 |
| Refund Date | [blank] | 1656 |
| Callable before Refund Date? | [No] | 1657 |

Figure 37:
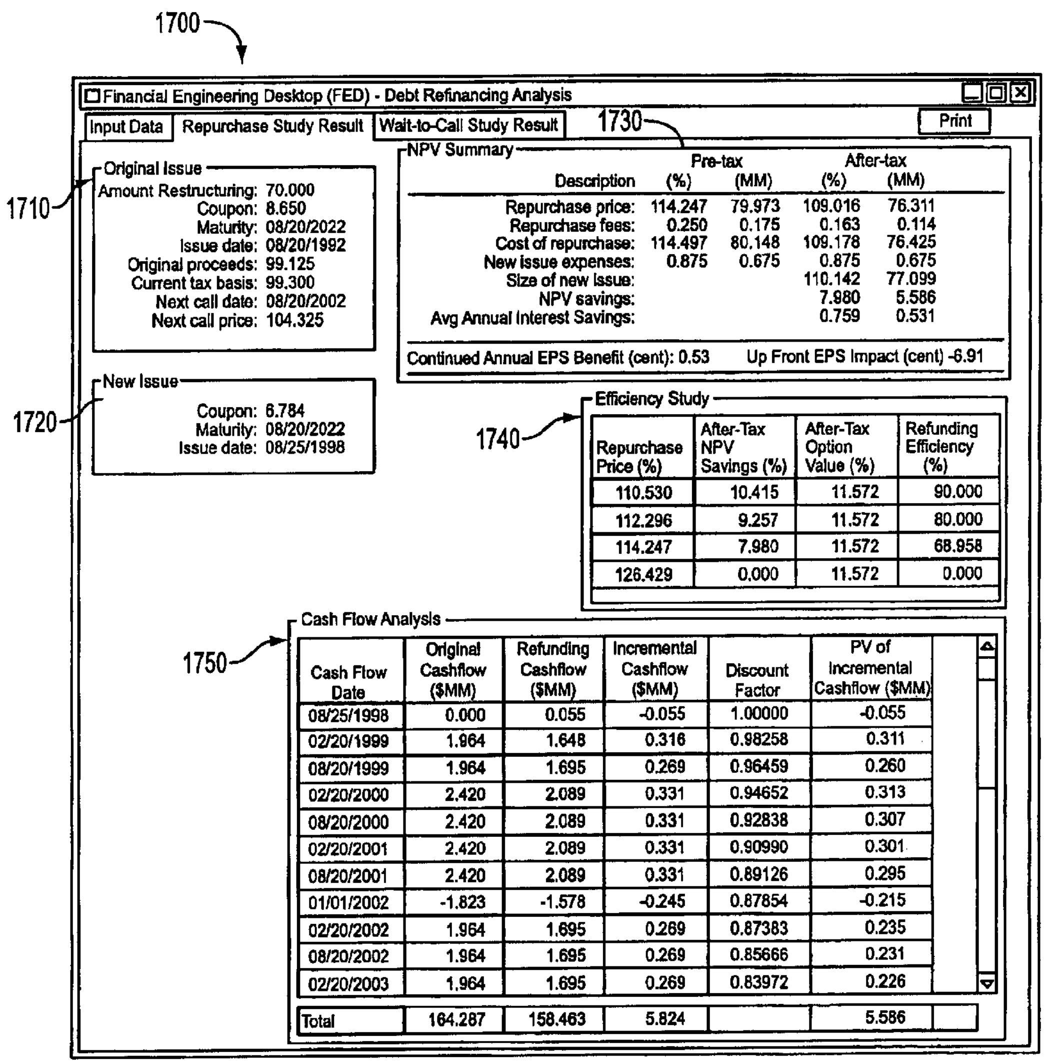
FIG. 37 illustrates the repurchase study result according to the principles of the invention.

After entering the above information, the user clicks on the Generate Schedule button 1658 to create the following call schedule, which is displayed in Call Date fields 1701 and Call Price fields 1702, as seen in FIG. 37:

| Call Date | Call Price |
|---|---|
| Aug. 20, 2002 | 104.325 |
| Aug. 20, 2003 | 103.893 |
| Aug. 20, 2004 | 103.460 |
| Aug. 20, 2005 | 103.028 |
| Aug. 20, 2006 | 102.595 |
| Aug. 20, 2007 | 102.163 |
| Aug. 20, 2008 | 101.730 |
| Aug. 20, 2009 | 101.298 |
| Aug. 20, 2010 | 100.865 |
| Aug. 20, 2011 | 100.433 |
| Aug. 20, 2012 | 100.000 |

Note that the first call date (Aug. 20, 2002) is the first date on which the issuer can repurchase the security. By exercising the call option on this date, the issuer can repurchase the security at 104.325%. If the issuer does not exercise the option, he or she must wait until the next call date (Aug. 20, 2003). Note that the final call date (Aug. 20, 2012) is the date on which the issuer can repurchase the security at par.

To define the yield curve environment, the user either (a) accesses the Environment Search tab screen to select "XYZ" from the list of previously created environments or (b) enters the appropriate information into the text boxes on the Yield Curve Environment tab screen as described above.

When selecting the tax rate, the user has the option of choosing a flat tax rate or a variable tax schedule. For this example, the user inputs the following tax schedule, which is identified in Tax Rate fields 1615:

| Effective Date | Rate (%) |
|---|---|
| Jan. 01, 1998 | 35.000 |
| Jan. 01, 2000 | 20.000 |
| Jan. 01, 2002 | 35.000 |

The user enters the following information to define the new security:

Maturity Date (field 1632): Mar. 20, 2022

Issuance Expense (field 1633): 0.875%

By selecting to issue the new security "On the Curve," by checking Issue on the Curve field 1634, the user indicates that the new issue is to have the same coupon rate and the same price as the original issue. The user does not enter a sink schedule for the new security in this example as is shown by no entries in Sink Schedule fields 1635.

The user may use the Wait-to-Call Issue tab 1631 to analyze the benefits of refinancing the security at the present time versus refinancing the security at the call date. To do so, the user must select the desired type of New Issue Yield from the Drop-down list 1636, shown in FIG. 36. In this example, the user chooses "Forward Rate" as the New Issue Yield and "0.350" as the decimal value in the Issuance Expenses field 1637.

The user selects "NPV to Maturity" from the Drop-down list 1612, enters "Aug. 25, 1998" as the PV [Present Value] Date field 1613, and "100.000" as the number of Common Shares (MM) field 1614. The user selects "Tender" from the Drop-down list 1621 of available options, which include tender, open market research, call, and wait-to-call, for the Original Issue field box 1620. The user enters "0.250" in Fee field 1622 as the decimal fee (cost) associated with the transaction and "70.000" in Amount field 1623 as the percent of the transaction that the user expects to be successful. Because the user chooses to value the security at the next call date, the user enters "YTC" (Yield-to-Call) in Yield Type field 1624 as the appropriate yield type, which includes Yield-To-Maturity and Yield-To-Next-Call. The user may then calculate Treasury field 1625, Spread filed 1626, or Price field 1627.

To calculate the price of the security, the user must enter values for both the Treasury and the Spread. The system 10 automatically populates the Treasury text box with the current Treasury yield. In this example, the user enters "25.0" as the Spread value, and clicks on the Price button to calculate the price at which the issuer repurchases the security.

After entering the necessary information, the user clicks on the Calculate button 1628 to generate both the Repurchase Study Result 1700 and the Wait-to-Call Study Result 1800.

The Repurchase Study Result 1700 is displayed as FIG. 37 and displays the results of performing a debt refinancing analysis of a security that is repurchased on the PV date. When analyzing the results, the user must be sure to compare the values on this screen to those on the Wait-to-Call Study Result 1800, as seen in FIG. 38.

The user must enter the percent value of the issuance expense (field 1633, discussed above) that an issuer must pay to the Investment bank on the call date for refinancing the security.

Because the wait-to-call is in the future, a user cannot know with certainty what the price and yield curve will be. The New Issue Yield (field 1636, discussed above) may be determined from the forward rate, call date to maturity, PV date to maturity, or user specified, which are available on the call date.

1. Forward Rate.

Using the current yield curve, the system calculates the forward rate from the next call date to the maturity date of the new issue.

2. Call Date to Maturity.

The second choice is the current yield for a security with the same maturity as the security from the next call date to the new issue maturity date. The amount of time is displayed in the choice itself.

3. PV Date to Maturity.

The third choice is the current yield for a security with the same maturity as the security from the PV date to the new issue maturity date. The amount of time is displayed in the choice itself.

4. User Specified.

If the user selects the User-Specified Rate option, the system displays a Coupon text box. The user enters the appropriate rate into this text box.

The Repurchase Study Result 1700 contains the following five field boxes:

Original Issue 1710

New Issue 1720

NPV Summary 1730

Efficiency Study 1740

Cash Flow Analysis 1750

In the Original Issue field box 1710, the system 10 displays information related to the original issue that is being refinanced. The notional amount that the issuer is going to buy back or restructure through a tender, call, or open market repurchase is 70. The coupon of the original issue security is 8.650. The maturity date of the original issue security is Aug. 20, 2022. The issue date of the original issue security is Aug. 20, 1992. The original proceeds of the original issue security is the amount left over after the fee is deducted from the issue price and is calculated as 99.125. The current tax basis is calculated as 99.3, which represents the taxable cost of the original issue. The next call date of the original issue is the date that the wait to call study is based on. The next call price refers to the original issue.

The New Issue field box 1720 contains several indicative values for the new issue security. The system 10 displays the coupon, maturity and issue dates in the new issue fields. The coupon of 6.784 for the new security was calculated from the curve because the "Issue on the Curve" box was checked on the input screen. The user may also input the coupon. The maturity date of the new issue security is Aug. 20, 2022, which is entered by the user. The issue date (Aug. 25, 1998) of the new issue security is the PV Date, which is entered by the user.

The NPV Summary field box 1730 displays the results of the NPV analysis. In this example, box 1730 displays are four columns, two percentage columns labeled (%) (pre-tax and after-tax), and two dollar amount columns labeled (MM) (pre-tax and after-tax). To calculate the dollar amount columns, the corresponding % column is multiplied by the restructuring amount, which is $70 million in this example. The restructuring amount is calculated by taking the outstanding amount, $100 million, of the issue and multiplying that by estimated 70% tender success rate.

The Efficiency Study field box 1740 contains Repurchase Price, After-tax NPV Savings, After-tax Option Value, and Refunding Efficiency.

The Repurchase Price (%) is the price at which an issuer will repurchase the original issue security and is a user input field. A user may also use spread and yield on the input screen to calculate the repurchase price. If an issuer buys above the current tax base, the issuer may generate a tax loss, which may be tax deductible. If an issuer buys below the current tax base, then the issuer may generate a gain that may be a tax liability.

Pre-Tax Repurchase Price: 114.247%

After-Tax Repurchase Price (%)=Current Tax Basis +(Pre-Tax Price−Tax Basis)(1−Current Tax Rate) 99.3%+(114.247%−99.3%)(1−35%)=109.016%

After-Tax Repurchase Price (%)*Amount Restructuring= 109.016%*70 MM=76.311 MM

The Repurchase Fee, which may be tax deductible, is a user-entered field.

Pre-Tax Fee: 0.250%

After-Tax Fee=Pre-Tax Fee*(1−Tax Rate)=0.250%*(1−35%)=0.163%

The Cost of Repurchase is the repurchase price plus the repurchase fee.

Pre-Tax Cost of Repurchase: 114.247%+0.25%= 114.497%

After-Tax Cost of Repurchase: 109.015%+0.163%= 109.178%

The New Issue Expenses are entered by the user. These are not initially tax deductible; rather, they are amortized over the life of the new issue. The after-tax dollar amount is based on the size of the new issue. The Size of the New Issue is a calculated field that takes into account the size of the new issue, repurchase fee, and the new issue fee so that no additional cash outlay is necessary.

Pre-Tax New Issue Expense (%): 0.875%

After-Tax New Issue Expense (MM): After-Tax Expense(%) *Size of New Issue(MM)=0.875%*77.099MM= 0.674MM After-Tax Cost (%): Cost of Repurchase/(1−New Issue Expenses) 109.178%/(100%–0.875%)=110.142%

After-Tax Cost (MM): Cost of repurchase (%)*Amount Restructuring=110.142%*70MM=77.099 MM The NPV Savings is the amount of savings obtained by performing the refinancing transaction. A security with a call option should have a positive NPV. A bullet security will most likely have a negative NPV. The details relating to NPV savings are set forth in the Cash Flow Analysis field box 1750. The After-Tax Net Present Value Savings for the transaction is 7.980% of the restructured notional amount or $5.586 million by refinancing the security on Aug. 25, 1998.

The Avg. Annual Interest Savings is the amount of interest expense that an issuer would save each year by refinancing the security on the PV Date.

After-tax (MM)=After-tax (%)*Amount Restructuring 0.759%*$70MM=$0.531MM

The Continued Annual EPS Benefit is the Average Annual Interest Savings divided by the total common shares outstanding. The benefit is 0.53 cents per share ($0.531 million/100 million shares).

The Up Front EPS Benefit (Loss) measures the initial economic impact of the transaction. A negative number indicates negative earnings per share impact because the issuer has a loss due to the Cost of Repurchase being above the tax basis. The loss translates into a reduction in earnings in the year during which the transaction occurred. On the other hand, a positive number reflects an earnings benefit.

(Tax Basis−Cost of Repurchase)/Common Shares Outstanding (99.3%*$70 Million−$76.425 Million)/100 Million Shares=−6.91 cents per share Note that the Tax Basis is translated into dollars by taking the price and multiplying it by the restructured notional amount.

The purpose of the efficiency study is to demonstrate how much savings may be realized as a percentage of the option value embedded in the original security. If the security does not have a call schedule then the efficiency study is not relevant and does not appear in the results.

The after-tax option value is 11.572% on the PV date of Aug. 25, 1998 with a 10% volatility. The repurchase price of the security at 114.247 would yield an after tax NPV savings of 7.980% and a refunding efficiency of 68.958% (calculated by dividing the after tax NPV Savings of 7.980% by the after-tax option value of 11.572%). This means that an issuer would realize 69% of the option value by refinancing on Aug. 25, 1998. The percentage is higher if the option is valued at a lower than 10% volatility.

For reference purposes the table also calculates the repurchase price that would give the user a 90% refunding efficiency, an 80% refunding efficiency, and a 0% refunding efficiency. The price of 126.481 at a refunding efficiency of 0% is the breakeven price, which would result in a 0 NPV.

The detail behind the cash flow analysis and the NPV Savings Calculation is summarized in Cash Flow Analysis field box 1750. The number 5.586, located in the bottom right corner in this example, is the After Tax NPV Savings. All numbers in this table are after-tax numbers. The Original Cashflow is equal to the After-Tax Interest Payment less the Tax Benefit of the Issuance Fee Amortization. The Interest Payment is the sum of the coupon payments and accretion of tax basis. For example, if the original security is issued at a discount, the tax basis on the issuance day is the offering price. Then, the tax basis accretes to par over the life of the bond using a constant yield or straight-line method depending on the issuance date and the amount of original discount.

The Issuance Fee is the difference between the offering price and the original proceeds on original issue. In this example the offering price was 100, and the original proceeds were 99.125; therefore, the issuance fee was 0.875%.

The original cashflow on Jan. 1, 2002 in the example is the reduced tax deduction during the amortized period of a lower tax rate carried forward to this date. The tax benefit of −1.823 is the benefit carried forward during the prior amortized period. The refunding cashflow ($MM) is distinguished from the original cashflow except that it pertains to the new issue. The refunding cashflow on the PV date is the accrued interest of the original issue. In this example it is $0.055 million shown on Aug. 25, 1998. The Incremental Cashflow ($MM) is the difference between the original cashflow and the refunding cashflow. The Discount Factor is the amount that an issuer discounts the cashflow to factor in the time value of money. This is derived from the yield curve environment used in the calculation. The PV of Incremental Cashflow ($MM) is the incremental cash flow multiplied by the discount factor.

The Wait-To-Call Study Result 1800 shown as FIG. 38 displays the results of performing a debt refinancing analysis of a security that is repurchased on the "next" call date. When analyzing the results, the user must be sure to compare the values on this screen with those of the Repurchase Study Result 1700.

The following relates to a discussion of fields that are not found on the Repurchase Study Result 1700. The Break-Even between Repurchase and Wait-To-Call shows the value of refinancing on the PV Date against waiting to call the security on the next call date. The Break-Even yield (%) is the refinancing yield an issuer obtains when repurchasing the security on the next call date. In this example, 7.196% is the yield at which the user would be indifferent to refinancing the security today versus waiting to the call date. Thus, an issuer would benefit from repurchasing the security on the next call date if the issuer can issue a new bullet security below 7.196%. In this example, the issuer realizes a 7.980% NPV savings if the issuer refinances the security on the call date and issues a new security that yields 7.196%. The percent value for this field matches the NPV savings (%) on the Repurchase Study Result screen.

The break-even yield movement (bps) of 41.2 basis points is the difference between the current refinancing yield (6.784%) and the break-even yield (7.196%). Note that that the issuer would benefit from refinancing on the PV date (Aug. 25, 1998) rather than on the next call date (Aug. 20, 2002) if the percent yield value increases (moves) by more than 41.2 basis points.

Of course, the user may return to the Input Data screen to make any adjustments and to recalculate the analytical values.

The Investor analysis search engine may be employed to find previously issued securities that match or approximate user-defined criteria. This enables an issuer to target investors, bankers, traders, brokers, research analysts and salespeople based on present or past ownership of or relationship to a particular security or type of transaction. In conducting the search, a user may input the security indicatives and/or define the company profile.

To structure or price a new issue, a user may want to search for the securities of other companies in the industry that have a similar credit rating. For example, if structuring an issue for a gaming company that has a BBB credit rating, then a search for securities of other gaming companies with similar or like credit ratings should be conducted.

To structure a preferred security, a user may conduct a search of other preferred securities in order to perform a comparative analysis. By entering the indicatives that define the proposed new issue, a search can be performed for similar or like securities.

Figure 39:
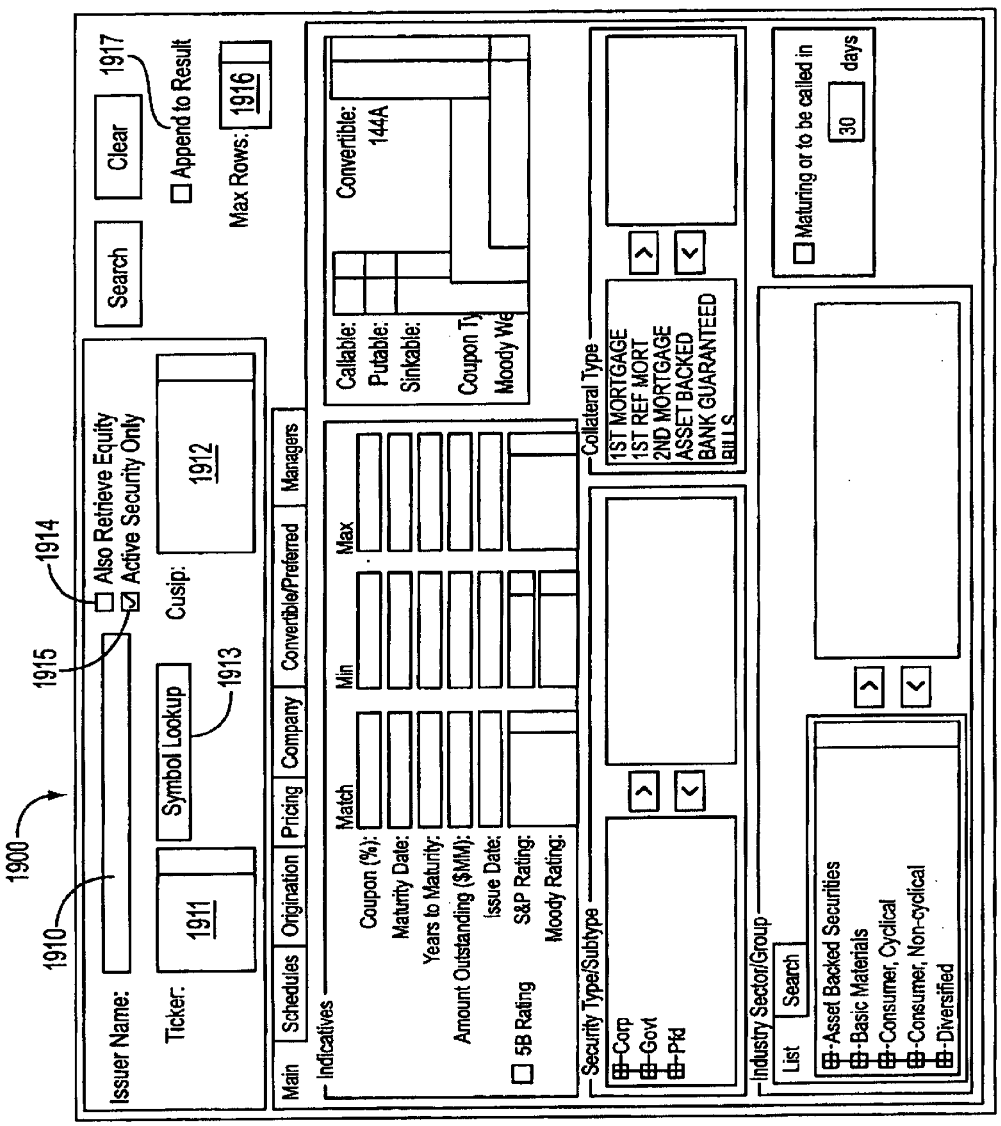
FIG. 39 illustrates the debt search window according to the principles of the invention.

A debt securities search may be conducted by selecting toolbar Option Debt 426. The Debt Search window 1900, as seen in FIG. 39, may then be displayed on the user's screen and may be utilized to search for either a specific security or a specific issuer. To do so, the user must follow the below steps:

Step 1: Enter the Issuer Name, Ticker, and/or CUSIP in fields 1910, 1911, 1912, respectively. If necessary, the user must click on the Symbol Lookup button 1913 to find the appropriate ticker symbol.

Step 2: Indicate whether or not the search should include equity securities. To include equity securities, the user must place a checkmark in the Also Retrieve Equity field 1914.

Step 3: Indicate whether the search should include only active securities or both active and inactive (retired) securities. To search for active securities only, the user must place a check mark in the Active Security Only field 1915.

Step 4: If necessary, limit the number of results by selecting the appropriate number of rows from the pull-down list attached to the Max Rows text box. For example, the user must select 500 rows in field 1916 if the user would like to obtain no more than 500 search results.

Step 5: Indicate whether the search should add the securities to an existing portfolio. To add the securities the user must, place a checkmark in the Append to Result field 1917.

Step 6: Further define the search criteria by entering the appropriate information into the Main, Schedules, Origination, Pricing, Company, Convertible/Preferred, and Managers text boxes.

Step 7: Click on the Search button to view the results. If necessary, the input fields may cleared by clicking on the Clear button and the search parameters may be re-entered.

A search for securities by Announcement Date under the Origination text box may also be conducted.

To conduct a basic search the toolbar option Basic 427 should be selected. The basic search screen may then be displayed on the user's screen and may be utilized to search for either a specific security or a specific issuer. The basic search follows the principles of debt search, described above. To conduct a search, the user must follow the steps listed below:

Step 1: Enter the Issuer Name, Ticker and/or CUSIP. If necessary, the user must click on the Symbol Lookup button to find the appropriate ticker symbol.

Step 2: The user must use the mouse to select the appropriate Security Type from the list of available options:

All (debt and equity)

Debt Only

Equity Only

Step 3: If necessary, limit the number of results by selecting the appropriate number of rows from the pull-down list attached to the Max Rows text box. For example, the user must select 500 rows if the user would like to obtain no more than 500 search results.

Step 4: Indicate whether the user would like to search for only active securities or if you would like to search for both active and inactive (retired) securities. To search for active securities only, the user must use the mouse to place a check mark in the Active Security Only check box.

Step 5: Indicate whether or not the user would like to add the securities to an existing portfolio. To add the securities, the user must use the mouse to place a checkmark in the Append to Result check box.

Step 6: Click on the Search button to view the results. If necessary, the input fields may cleared by clicking on the Clear button and the search parameters may be re-entered.

Figure 40:
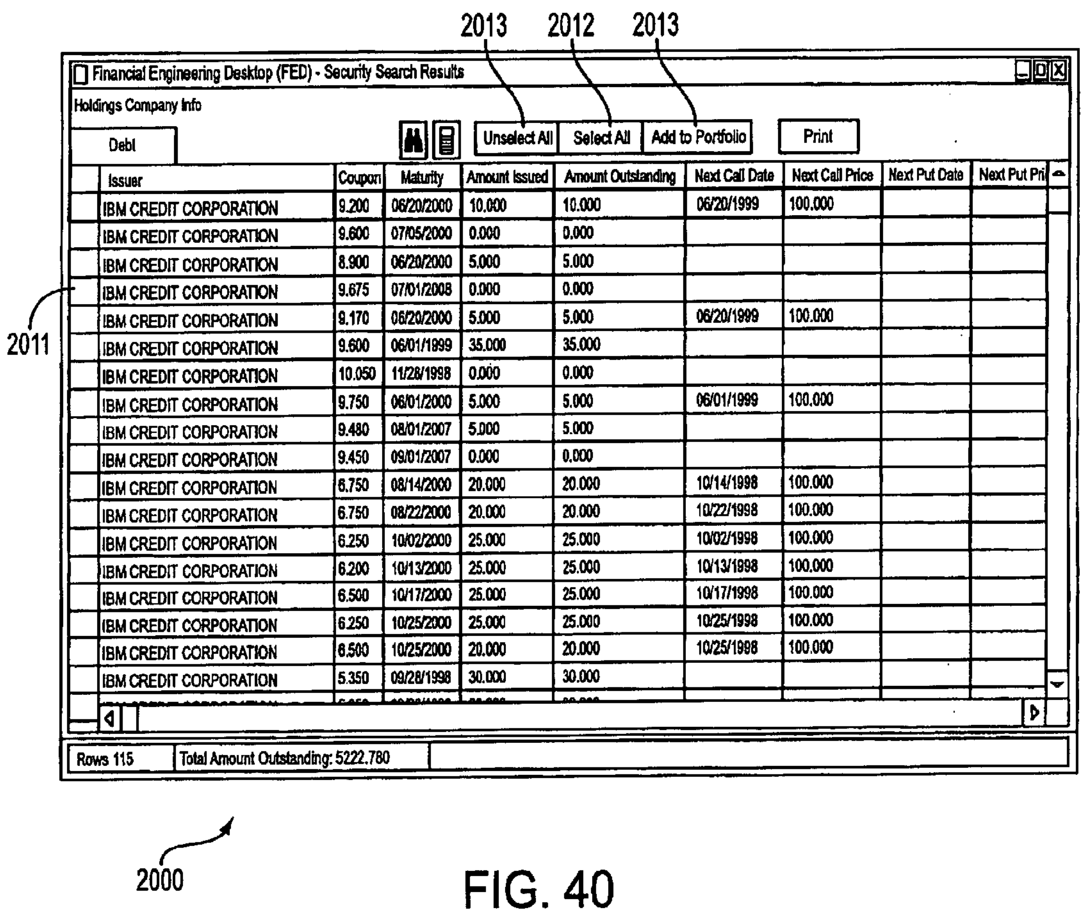
FIG. 40 illustrates the security search results according to the principles of the invention.

The Security Search Results window 2000, as seen in FIG. 40, may be viewed by clicking on toolbar option Search Results 428. The following tab options: debt, convertible, preferred and equity, are available to view the search results. In FIG. 40, Debt tab 2010 has been selected. The search results may be sorted using the information contained in the various columns. For example, the user may want to sort the debt securities by the Option Adjusted Spread (bps). To do so, the user must place the mouse pointer in the title cell of this column. The user must then left-click to sort the information from A-to-Z and right-click to sort the information from Z-to-A.

To select a security, the user must place a checkmark in the appropriate cell in the far-left column in field 2011 of the table using the mouse pointer. Then the user must click the Select All button 2012 at the top of the screen to select all the securities in the table and click the Unselect All button 2013 to remove all checkmarks from the far-left column.

Next the user must select toolbar option Holders 436 and choose either Selected Securities or All Securities to view the current holding of selected securities.

The following pop-up menu may be accessed by right-clicking on any cell in the table as represented below:

OAS Calculator

Debt Refinancing analysis

Rate Lock

Trades

Holders Response Graph

Search for Comparable Securities

The system 10 displays the appropriate input screen associated with the selected pop-up menu choice.

One or more securities may be added to a new portfolio by placing a checkmark in the appropriate row(s) of each security and clicking the Add to Portfolio button 2013. The system 10 displays the Untitled Portfolio screen and populates the table with information related to the selected securities.

One or more securities may be added to an existing portfolio by clicking the Add to Portfolio button 2013 before selecting any securities. After the system displays the Untitled Portfolio screen, the user must select Portfolio from the main menu bar, and choose Open from the pull-down menu to access a list of existing portfolios. The user must then select the appropriate portfolio, and click Open. After opening the portfolio, the user must return to the Security Search Results window 2000 to select the securities. After the securities have been selected, the user must click the Add to Portfolio button 2013 to add the selected securities to the opened portfolio.

After a portfolio exists, system 10 may display a variety of information about the securities included in the portfolio. The Indicative Data tab screen contains the following information:

Issue Name

Coupon (%)

Maturity Date

Amount Outstanding ($MM)

Issue Date

Rating

Amount Issued ($MM)

Call Flag

Put Flag

Sink Flag

Step-Up Flag

Coupon Frequency

Security ID

CUSIP

Next Call Date

Next Call Price

Current Call Price

Maturity Profile button may be selected to view the maturity profile for the selected portfolio. The Maturity Profile includes the following options:

OAS Calculator

NPV Analysis

Delete

Edit

Holdings

Holders Response Graph

The Holders Graph screen may be accessed to obtain information on the holders of the selected security. The system displays the number of holders and the dollar amount held by known holders.

The equity tab 103 allows a user to view options for equity searching and analysis. In a preferred embodiment, tab 103 facilitates conducting equity searches, creation of new portfolios, and manipulation of existing portfolios. More information about the equity tab 103 information may be obtained by selecting Help tab 105 or toolbar option Help 132.

Figure 41:
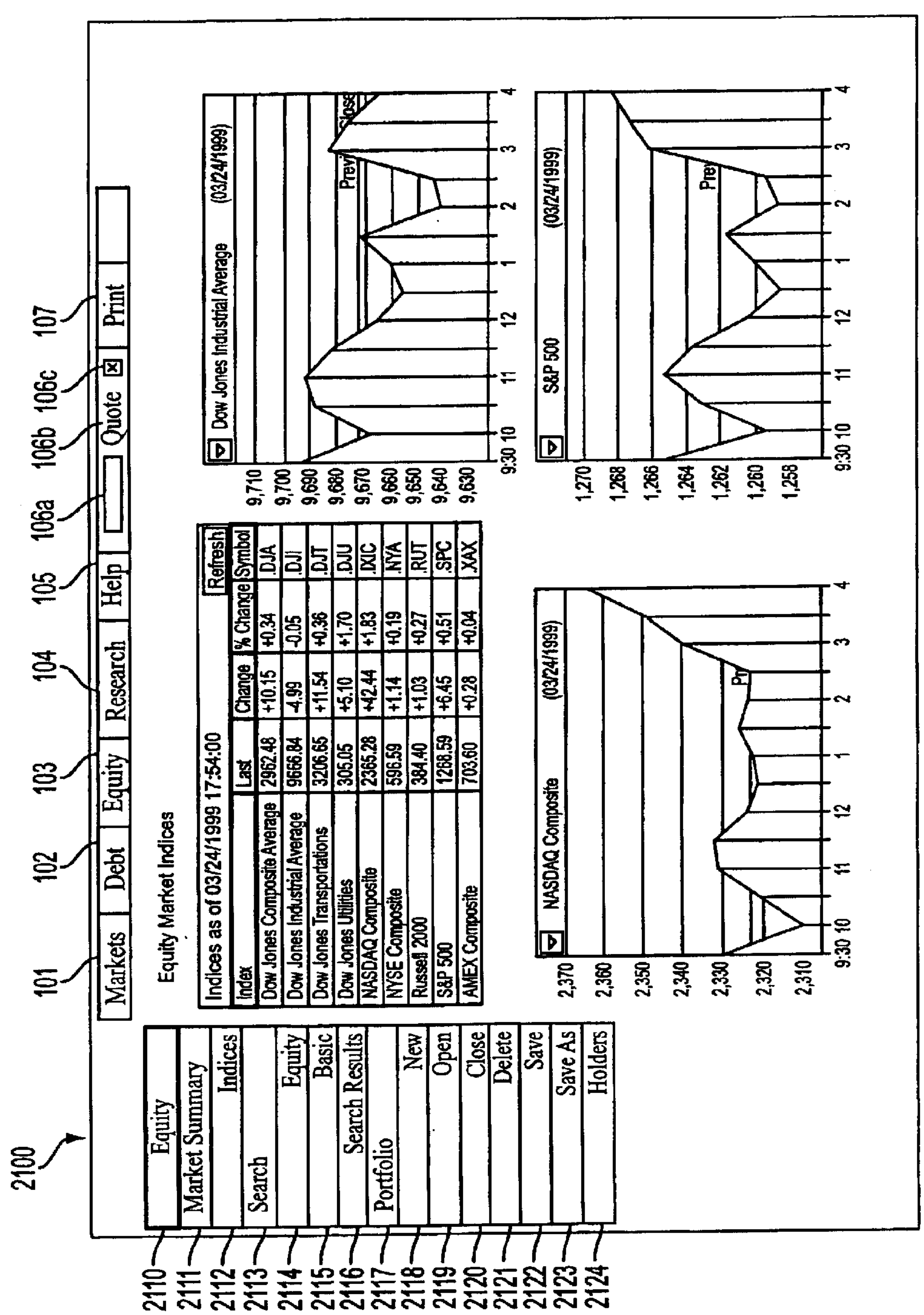
FIG. 41 illustrates a suitable equity page according to the principles of the invention.

Equity Page 2100 may be viewed by selecting equity tab 103. An example of a useful Equity Page 2100 that may be employed according to the principles of the invention is depicted in FIG. 41. Three main topics are displayed: Market Summary heading 2111, Search heading 2113, and Portfolio heading 2117. Below each main topic appears a list of toolbar options 2112, 2214–16, and 2118–24 that connect a user directly to the selected screen when the toolbar option is selected. Grayed items located in the menu may not be used until they become black or green.

Toolbar option Indices 2112 provide the user with current equity information similar to that displayed on Front Page 100, although in greater detail. In a preferred embodiment, the curves for each index are provided. In a further preferred embodiment, each graph contains a pull-down menu that permits a user to select any of a variety of indices including Dow Jones Composite Average, Dow Jones Industrial Average, Dow Jones Transportations, Dow Jones Utilities, NASDAQ Composite, NYSE Composite, Russell 200, S&P 500, and AMEX Composite.

An equity securities search may be conducted by selecting toolbar option Equity 2114. The equity search screen may then be displayed on the user's screen and may be utilized to search for either a specific security or a specific issuer. The equities search is analogous to the debts search. To do so, the user must follow the below steps:

Step 1: Enter the Issuer Name, Ticker, and/or CUSIP. If necessary, the user must click on the Symbol Lookup button to find the appropriate ticker symbol.

Step 2: Indicate whether or not the search should include debt securities. To include debt securities, the user place a checkmark in the Also Retrieve Debt check box.

Step 3: If necessary, limit the number of results by selecting the appropriate number of rows from the pull-down list attached to the Max Rows text box. For example, the user must select 500 rows if the user would like to obtain no more than 500 search results.

Step 4: Indicate whether the search should add the securities to an existing portfolio. To add the securities, the user must place a checkmark in the Append to Result check box.

Step 5: Further define the search criteria by entering the appropriate information into the Main, Financial, and Company text boxes.

Step 6: Click on the Search button to view the results. If necessary, the input fields may cleared by the user clicking on the Clear button; the user may then re-enter the search parameters.

To conduct a basic search the toolbar option Basic 2115 should be selected by the user. The basic search screen, which is the same screen employed by selecting toolbar option Basic 427 in connection with Debt Page 400, may then be displayed on the user's screen and may be utilized to search for either a specific security or a specific issuer. To do so, the user must follow the below steps:

Step 1: Enter the Issuer Name, Ticker and/or CUSIP. If necessary, the user must click on the Symbol Lookup button to find the appropriate ticker symbol.

Step 2: Use the mouse to select the appropriate Security Type from the list of available options:

All (debt and equity)

Debt Only

Equity Only

Step 3: If necessary, limit the number of results by selecting the appropriate number of rows from the pull-down list attached to the Max Rows text box. For example, the user must select 500 rows if the user would like to obtain no more than 500 search results.

Step 4: Indicate whether you would like to search for only active securities or if you would like to search for both active and inactive (retired) securities. To search for active securities only, the user must use the mouse to place a check mark in the Active Security Only check box.

Step 5: Indicate whether or not the user would like to add the securities to an existing portfolio. To add the securities, the user must use the mouse to place a checkmark in the Append to Result check box.

Step 6: Click on the Search button to view the results. If necessary, the input fields may cleared by the user clicking on the Clear button; the user may then re-enter the search parameters.

The search results may be sorted using the information contained in the various columns. For example, the user may want to sort the debt securities by the Option Adjusted Spread (bps). To do so, the user must place the mouse pointer in the title cell of this column. The user must then left-click to sort the information from A-to-Z and right-click to sort the information from Z-to-A. The following tab options: debt, convertible, preferred and equity, are available to view the search results.

To create a portfolio the user may employ Equity Portfolio tab 145. The user may then search for equity securities based on criteria that the user specifies. There is additional help for the Search function that can be found by clicking on Help tab 105 located at the top of the application followed by Context and Index.

After a user runs a search, the search results window indicates the securities identified with the criteria specified. The user then selects some or all of the securities, and hits the Add to Portfolio button. Finally, the user selects Portfolio, Save As, and then gives the portfolio a name to save it. Once this has been completed the user may select the Equity Portfolio tab 145 to place the portfolio in the Markets section (the user must then hit the Refresh button 143 on Front Page 100 to see the changes reflected).

Research tab 104 allows a user to view a list of sites and links that can be used to get fixed income or equity information on topics relating to finance and the marketplace. More information about the Research tab 104 information may be obtained by selecting Help tab 105 or toolbar option Help 132.

Selection of the help tab 105 provides explanations and contact numbers for any questions that a user may have regarding any aspect of the system 10. A menu of options is provided which permits a user to identify information on how to contact a technical support group for questions concerning the system 10. Information is also provided regarding downloading the system 10, agreements, release notes, and other system information.

In a preferred embodiment, a user may customize Front Page 100 to display equity tickers based on the stocks selected in the equity portfolios created by the user. The equity ticker may be displayed on the right side of the Front Page 100. A user may click on the Equity Portfolio tab 145 to view the entire portfolio.

What is claimed is:

1. A system for processing data regarding securities, comprising:

a computer-readable memory for storing data for access by a computer;

an application program executable by the computer; and a data structure stored in said computer-readable memory, said data structure including information regarding the securities for processing by the computer in accord with said application program, the information regarding the securities including:

a plurality of price fields;

a plurality of option adjusted spread fields;

a plurality of volatility fields; and a plurality of initial coupon fields; wherein:

at least some of said fields contain values, said application program calculates values of one of the fields based upon the values of one or more of the fields other than the one field, and a user may execute trades of one or more of the securities based on information generated by said application program.

2. The system of claim 1, wherein the data structure further includes a plurality of settlement date fields.

3. A system for evaluating processing data regarding securities, comprising:

a computer-readable memory for storing data for access by a computer;

an application program executable by the computer; and a data structure stored in said computer-readable memory, said data structure including information regarding the securities for processing by the computer in accord with said application program, the information regarding the securities including:

a plurality of treasury yield fields;

a plurality of spread fields; and a plurality of corporate yield fields;

wherein said application program calculates contents of the corporate yield fields based upon said plurality of treasury yield fields and said plurality of spread fields, and said application program enables a user to selectively execute trades of one or more of the securities based on information generated by said application program.

4. The system of claim 3, wherein said plurality of spread fields comprises a plurality of parallel shift fields.

5. The system of claim 3, wherein said plurality of spread fields comprises a plurality of pivoting shift fields.

6. The system of claim 3, wherein said plurality of spread fields comprises a plurality of two-point tilting fields.

7. A system for processing data regarding securities, comprising:

a computer-readable memory for storing data for access by a computer;

an application program executable by the computer; and a data structure stored in said computer-readable memory, said data structure including information regarding the securities for processing by the computer in accord with said application program, the information regarding the securities including:

a plurality of term fields;

a plurality of treasury yield fields; and a plurality of spread fields;

wherein said application program calculates values for cost of fund fields regarding a plurality of the securities based on said plurality of term fields, said plurality of treasury yield fields and said plurality of spread fields, and said application program enables a user to selectively execute trades of one or more of the securities based on information generated by said application program.

* * * * *